US011736598B2

(12) United States Patent
Lee et al.

(10) Patent No.: US 11,736,598 B2
(45) Date of Patent: Aug. 22, 2023

(54) ELECTRONIC DEVICE INCLUDING PLURALITY OF ANTENNAS AND OPERATING METHOD THEREOF

(71) Applicant: Samsung Electronics Co., Ltd., Suwon-si (KR)

(72) Inventors: Taeyun Lee, Suwon-si (KR); Janghyun Nam, Suwon-si (KR); Hyoseok Na, Suwon-si (KR); Hanyeop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/422,001

(22) PCT Filed: Jun. 29, 2021

(86) PCT No.: PCT/KR2021/008156
§ 371 (c)(1),
(2) Date: Jul. 9, 2021

(87) PCT Pub. No.: WO2022/019508
PCT Pub. Date: Jan. 27, 2022

(65) Prior Publication Data
US 2022/0345557 A1 Oct. 27, 2022

(30) Foreign Application Priority Data
Jul. 23, 2020 (KR) .................. 10-2020-0091835

(51) Int. Cl.
*H04M 1/02* (2006.01)
*H04B 7/0404* (2017.01)
*H04W 52/42* (2009.01)

(52) U.S. Cl.
CPC ........ *H04M 1/0268* (2013.01); *H04B 7/0404* (2013.01); *H04M 1/0214* (2013.01); *H04M 1/0235* (2013.01); *H04W 52/42* (2013.01)

(58) Field of Classification Search
CPC ............ H04M 1/0268; H04M 1/0214; H04M 1/0235; H04M 1/0241; H04B 7/0404;
(Continued)

(56) References Cited

U.S. PATENT DOCUMENTS 10,230,826 B1 * 3/2019 Liu ..................... H01Q 1/243
10,833,397 B2 11/2020 Lee et al.
(Continued)

FOREIGN PATENT DOCUMENTS

CN            110113459 A      8/2019
KR   10-2017-0066944 A      6/2017
(Continued)

OTHER PUBLICATIONS

International Search Report dated Oct. 15, 2021, issued in International Application No. PCT/KR2021/008156.

*Primary Examiner* — Ankur Jain
(74) *Attorney, Agent, or Firm* — Jefferson IP Law, LLP

(57) ABSTRACT

An electronic device is provided. The electronic device includes a housing, a plurality of first antennas, at least one second antenna, at least one sensor, and at least one processor. The at least one processor is configured to perform a multi input multi output (MIMO) operation by using the plurality of first antennas in first status, detect that the electronic device in the first status is changed to be in second status, by folding or sliding of at least one of the first housing or the second housing, and disable at least one, which is adjacent to the at least one second antenna, of the plurality of first antennas and perform a single input single output (SISO) operation by using remaining antennas of the plu- (Continued)

rality of first antennas, when a frequency band or a channel of a signal transmitted by the plurality of first antennas is adjacent to or partially overlapped with that of a signal received by the at least one second antenna.

15 Claims, 32 Drawing Sheets

(58) Field of Classification Search
CPC .. H04B 7/0413; H04B 17/345; H04B 17/354; H04W 52/42; H01Q 1/24; H01Q 1/38; H01Q 1/243

See application file for complete search history.

(56) References Cited

U.S. PATENT DOCUMENTS

| | | | |
|---|---|---|---|
| 10,848,603 | B2 | 11/2020 | Liu et al. |
| 11,075,469 | B2 | 7/2021 | Huh et al. |
| 2018/0366813 | A1* | 12/2018 | Kim ......................... H01Q 9/04 |
| 2020/0076062 | A1* | 3/2020 | Lee ......................... H01Q 1/243 |
| 2020/0194904 | A1* | 6/2020 | Huh ......................... H01Q 21/24 |
| 2021/0105351 | A1 | 4/2021 | Liu et al. |
| 2021/0219437 | A1* | 7/2021 | Kim ..................... H05K 5/0017 |
| 2021/0377372 | A1* | 12/2021 | Jung ..................... H01Q 1/243 |

FOREIGN PATENT DOCUMENTS

| | | |
|---|---|---|
| KR | 10-2019-0143029 A | 12/2019 |
| KR | 10-2020-0027734 A | 3/2020 |
| KR | 10-2020-0038535 A | 4/2020 |
| KR | 10-2020-0046399 A | 5/2020 |
| KR | 10-2020-0074411 A | 6/2020 |

* cited by examiner

ELECTRONIC DEVICE INCLUDING PLURALITY OF ANTENNAS AND OPERATING METHOD THEREOF

CROSS-REFERENCE TO RELATED APPLICATION(S)

This application is a U.S. National Stage application under 35 U.S.C. § 371 of an International application number PCT/KR2021/008156, filed on Jun. 29, 2021, which is based on and claims priority of a Korean patent application number 10-2020-0091835, filed on Jul. 23, 2020, in the Korean Intellectual Property Office, the disclosure of which is incorporated by reference herein in its entirety.

BACKGROUND

1. Field

The disclosure relates to an electronic device including a plurality of antennas and an operating method thereof. More particularly, the disclosure relates to an electronic device that reduces the signal interference between the plurality of antennas by controlling at least one of the plurality of antennas.

2. Description of Related Art

Recently, as an electronic device is implemented with various functions and in a smaller size, an electronic device having various form factors has been employed. The electronic device having the various form factors may be, for example, referred to as a foldable electronic device and/or a rollable electronic device.

A plurality of antennas included in the electronic device having the various form factors may be designed to be spaced apart from each other by a sufficient long distance, in one form of the electronic device. For example, a plurality of antennas of the foldable devices are spaced apart from each other in an unfolding status and may be disposed in an upper housing or a lower housing.

The above information is presented as background information only to assist with an understanding of the disclosure. No determination has been made, and no assertion is made, as to whether any of the above might be applicable as prior art with regard to the disclosure.

SUMMARY

In one form of the electronic device, the plurality of antennas may be designed to be spaced apart from each other such that antenna isolation is ensured. The antenna isolation between the plurality of antennas may be changed depending on the change in the forms of the electronic device. As the positions of the antennas of the electronic device are changed, the distance between the antennas may be shorter or longer. For example, when the foldable electronic device in the unfolding status is folded, a first housing and a second housing (e.g., the upper housing and the lower housing, or a left housing and a right housing) of the foldable electronic device are overlapped with each other. Accordingly, the distance between the antennas positioned in the first housing and the second housing may be shorter, or the antennas positioned in the first housing and the second housing may be overlapped with each other.

Signal interference may be caused, when a plurality of antennas are not spaced apart from each other by a sufficient long distance, or the frequency bands or channels of signals transmitted or received to or from the antennas are adjacent to each other or partially overlapped with each other, as the form of the electronic device is changed.

According to various embodiment of the disclosure, the electronic device may reduce the signal interference between the plurality of antennas by controlling at least one of the plurality of antennas, even though the distance between the plurality of distances is not sufficiently ensured.

Aspects of the disclosure are to address at least the above-mentioned problems and/or disadvantages and to provide at least the advantages described below. Accordingly, an aspect of the disclosure is to provide an electronic device including a plurality of antennas and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first housing and a second housing, a plurality of first antennas disposed in the first housing, at least one second antenna disposed in the second housing, at least one sensor, and at least one processor. The at least one processor is configured to perform a multi input multi output (MIMO) operation by using the plurality of first antennas in a first status of the electronic device, sense, through the at least one sensor, that the electronic device in the first status is changed to be in a second status, as at least one of the first housing or the second housing is folded or slid, and make at least one, which is adjacent to the at least one second antenna, of the plurality of first antennas, disable, and perform a single input single output (SISO) operation by using remaining antennas of the plurality of first antennas, when a frequency band or a channel of a signal transmitted by the plurality of first antennas is adjacent to or partially overlapped with a frequency band or a channel of a signal received by the at least one second antenna. The plurality of first antennas may be spaced apart from the at least one second antenna by a first distance, in the first status, and the at least one, which is adjacent to the at least one second antenna, of the plurality of first antennas may be spaced apart from the at least one second antenna by a second distance shorter than the first distance, in the second status.

In accordance with another aspect of the disclosure, an electronic device is provided. The electronic device includes a housing including a first housing and a second housing, at least one first antenna disposed in the first housing, at least one second antenna disposed in the second housing, at least one sensor, and at least one processor. The at least one processor is configured to make communication by using the at least one first antenna and the at least one second antenna in a first status of the electronic device, sense, through the at least one sensor, that the electronic device in the first status is changed to be in a second status, as at least one of the first housing or the second housing is folded or slid, and perform a back-off operation for power of a signal transmitted by at least one first antenna adjacent to the at least one second antenna, when a frequency band or a channel of the signal transmitted by the at least one first antenna is adjacent to or at least partially overlapped with a frequency band or a channel of a signal received by the at least one second antenna. The at least one first antenna may be spaced apart from the at least one second antenna by a first distance, in the first status, and the at least one first antenna adjacent to the at least one second antenna may be spaced apart from the at least one second antenna by a second distance shorter than the first distance, in the second status.

In accordance with another aspect of the disclosure, an electronic device is provided. The electronic device includes a housing including a first housing and a second housing, a plurality of first antennas disposed in the first housing, at least one second antenna disposed in the second housing, at least one sensor, and at least one processor. The at least one processor is configured to perform a carrier aggregation (CA) operation by using the plurality of first antennas in a first status of the electronic device, sense, through the at least one sensor, that the electronic device in the first status is changed to be in a second status, as at least one of the first housing or the second housing is folded or slid, and make at least one, which is adjacent to the at least one second antenna, of the plurality of first antennas, disable to deactivate the CA operation, when a frequency band or a channel of a signal transmitted by the plurality of first antennas is adjacent to or partially overlapped with a frequency band or a channel of a signal received by the at least one second antenna. The plurality of first antennas may be spaced apart from the at least one second antenna by a first distance, in the first status, and at least one of the plurality of first antennas may be spaced apart from the at least one second antenna by a second distance shorter than the first distance, in the second status.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
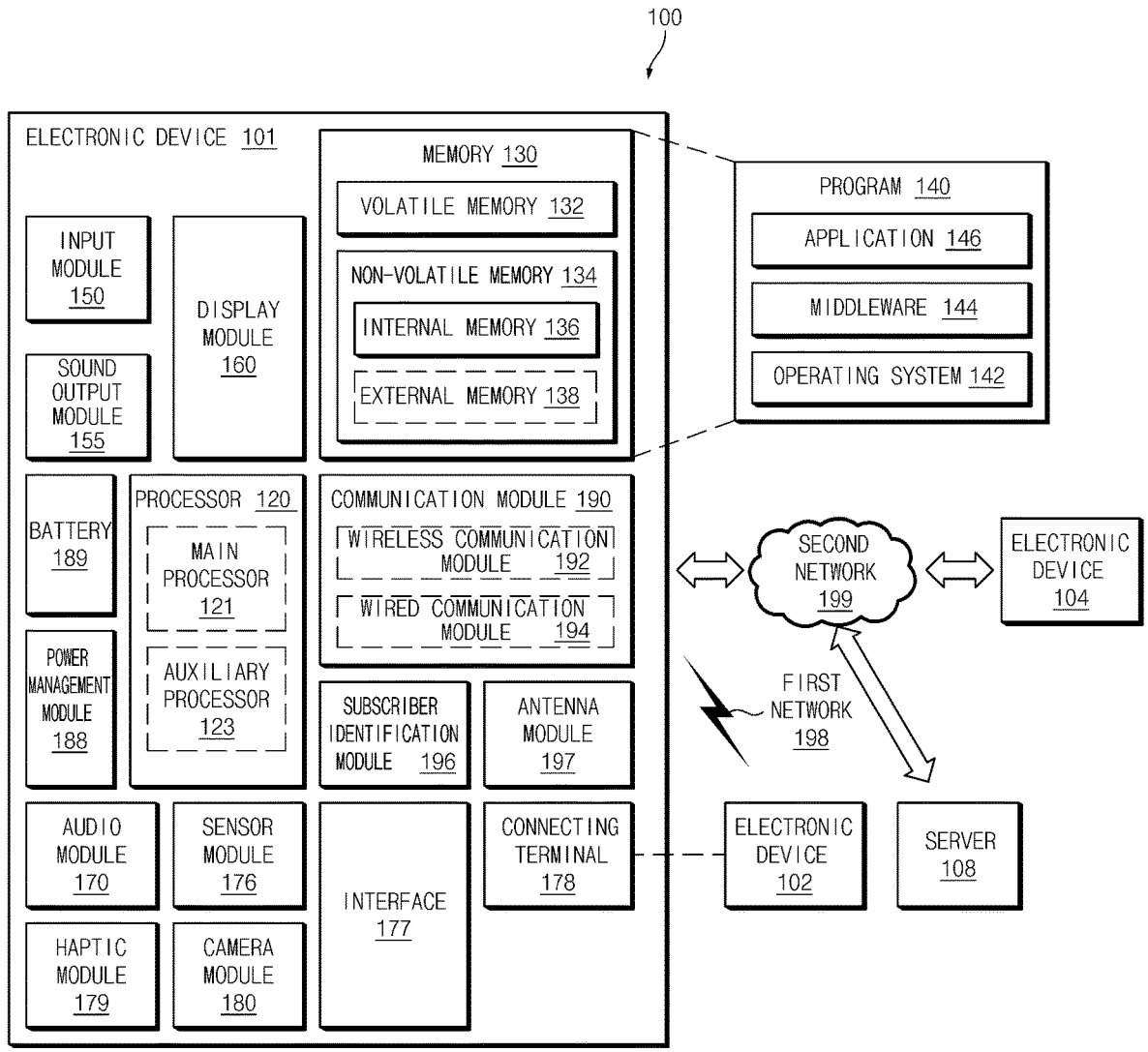
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
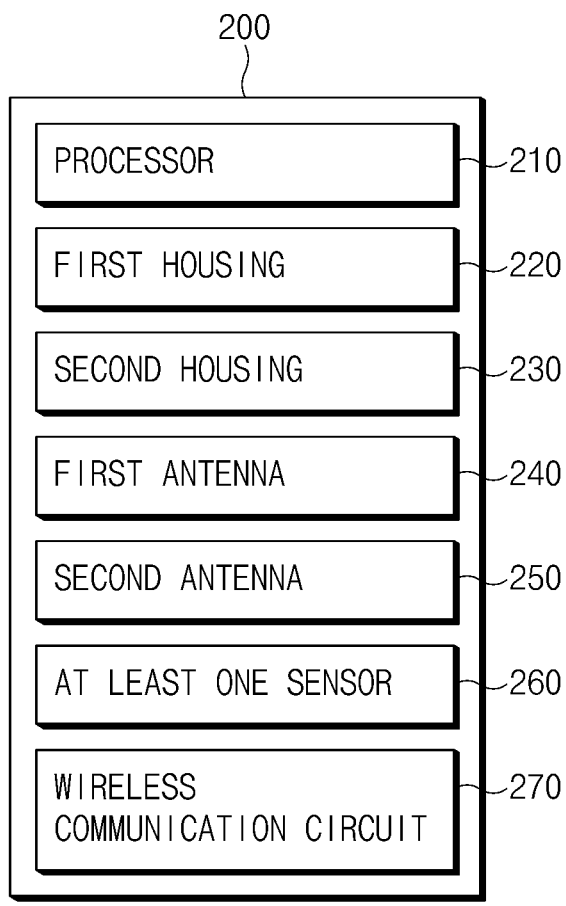
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, according to an embodiment of the disclosure, an electronic device 200 (e.g., the electronic device 101 of FIG. 1) may include a processor 210, a first housing 220, a second housing 230, a first antenna 240, a second antenna 250, at least one sensor 260, and/or a wireless communication circuit 270.

According to an embodiment of the disclosure, the form of the electronic device 200 may be physically changed depending on the relative positions of the first housing 220 and the second housing 230. For example, when the first housing 220 and the second housing 230 are placed on the same plane, the electronic device 200 may be referred to be in an unfolding status. When the first housing 220 and the second housing 230 are overlapped with each other about at least one axis of the electronic device 200, the electronic device 200 may be referred to be in a folding status. For another example, when the first housing 220 or the second housing 230 moves about at least one axis of the electronic device 200, the physical position of the first housing 220 or the second housing 230 may be changed. For example, the electronic device 200 may be in the unfolding status or the folding status. A user may manipulate the form of the electronic device 200 by folding or unfolding the electronic device 200. Although the description of the change in the form of the electronic device 200 is provided for the illustrative purpose, an embodiment of the disclosure is not limited thereto. The description of the change in the form of the electronic device 200 may make reference to the description made with reference to FIGS. 3 and 4. Hereinafter, it is assumed that the electronic device 200 is a third electronic device 101C of FIG. 3 for the convenience of explanation.

According to an embodiment of the disclosure, the first antenna 240 (e.g., the antenna module 197 of FIG. 1) and the second antenna 250 (e.g., the antenna module 197 of FIG. 1) may transmit or receive a signal or power to the outside (e.g., the external electronic device) or from the outside. According to an embodiment of the disclosure, the first antenna 240 and the second antenna 250 may include an antenna including a radiator having a conductor or a conductive pattern formed on a substrate (e.g., a printed circuit board (PCB)). According to an embodiment of the disclosure, the first antenna 240 and the second antenna 250 may include a plurality of antennas (e.g., array antennas).

According to an embodiment of the disclosure, the first antenna 240 and the second antenna 250 may be disposed at mutually different positions in a housing (e.g., the first housing 220 and the second housing 230) of the electronic device 200 while being spaced apart from each other. For example, the first antenna 240 may be disposed in the first housing 220 and the second antenna 250 may be disposed in the second housing 230. The first antenna 240 and the second antenna 250 may be spaced apart from each other by a first distance when the electronic device 200 is in the unfolding status. According to an embodiment of the disclosure, when the electronic device 200 in the unfolding status is folded, the distance between the first antenna 240 and the second antenna 250 may be changed. For example, when the electronic device 200 is in the folding status, the first antenna 240 and the second antenna 250 may be spaced apart from each other by a second distance. The second distance may be shorter than the first distance. According to an embodiment of the disclosure, the processor 210 may support mutually different communication protocols through the first antenna 240 and the second antenna 250. For example, the first antenna 240 may transmit and/or receive a signal for wireless fidelity (WiFi) communication. For example, the second antenna 250 may transmit and/or receive a signal for cellular communication. According to an embodiment of the disclosure, the processor 210 may support the same communication protocol through the first antenna 240 and the second antenna 250. According to an embodiment of the disclosure, frequency bands or channels of signals transmitted and/or received by the first antenna 240 and the second antenna 250 may be adjacent to each other or partially overlapped with each other.

According to an embodiment of the disclosure, the processor 210 (e.g., the processor 120 of FIG. 1) may execute, for example, software (e.g., the program 140 of FIG. 1) to control at least one different component (e.g., a hardware or software component) of the electronic device 200 linked to the processor 210 and to process or compute various data. For example, the processor 210 may be operatively connected with the first antenna 240, the second antenna 250, at least one sensor 260 and/or a wireless communication circuit 270. According to an embodiment of the disclosure, the processor 210 may include a main processor (e.g., the main processor 121 of FIG. 1; a central processing unit or an application processor) or an auxiliary processor (e.g., the auxiliary processor 123 of FIG. 1; a communication processor) operable independently from the main processor or together with the main processor. The auxiliary processor 123 may be implemented separately form the main processor 121 or as a portion of the main processor 121. According to an embodiment of the disclosure, the auxiliary processor 123 (e.g., the communication processor) may be implemented as a portion of a different component (e.g., the communication module 190 of FIG. 1) operatively associated with the auxiliary processor 123.

According to an embodiment of the disclosure, the processor 210 may sense an operating status of the electronic device 200 or an external environmental status by using at least one sensor 260 (e.g., the sensor module 176 of FIG. 1). According to an embodiment of the disclosure, the at least one sensor 260 may include, for example, a gesture sensor, a gyro sensor, an acceleration sensor, and/or a grip sensor. For example, the processor 210 may sense the movement of the first housing 220 and the second housing 230 by using the at least one sensor 260 to determine whether the electronic device 200 is in the folding status or the unfolding status. According to an embodiment of the disclosure, the at least one sensor 260 may further include a hall sensor. For example, the processor 210 may sense the change in the intensity of a magnetic field by using the at least one sensor 260 (e.g., a hall sensor). For example, the processor 210 may sense the change in the intensity of a magnetic field, which results from the movement of the first housing 220 and the second housing 230, by using the at least one sensor 260 to determine whether the electronic device 200 is in the folding status or the unfolding status.

According to an embodiment of the disclosure, the processor 210 may perform short-range communication including cellular communication and/or WiFi communication by using at least one wireless communication circuit 270 (e.g., the communication module 190 of FIG. 1). According to an embodiment of the disclosure, the at least one wireless communication circuit 270 operates independently from the processor 210 and may include one or more communication processors to support direct (e.g., wired) communication or wireless communication. The at least one wireless communication circuit 270 may make communication with an external electronic device (e.g., the electronic device 104 of FIG. 1) through a first network (e.g., the first network 198 of FIG. 1; a short-range communication network for Bluetooth, wireless fidelity (WiFi), or infrared data association (IrDa)) or a second network (e.g., the second network 199 of FIG. 1; a long-range communication network for a legacy cellular network, a 5G network, a next generation communication network, the Internet, or a computer network (e.g., LAN or WAN)). The at least one wireless communication circuit 270 may be integrated into one component (e.g., a single chip) or may be implemented with mutually different components (e.g., a plurality of chips). The at least one wireless communication circuit 270 may identify or authenticate the electronic device 200 over a communication network, such as the first network 198 or the second network 199 by using subscriber information (e.g., international Mobile Subscriber Identifier (IMSI)) stored in the subscriber identifying module 196.

According to an embodiment of the disclosure, the processor 210 may reduce antenna interference by controlling the first antenna 240 and/or the second antenna 250, as the form of the electronic device 200 is changed. Hereinafter, a method for operating an antenna by the processor 210 will be described, as the form of the electronic device 200 is changed.

Figure 3:
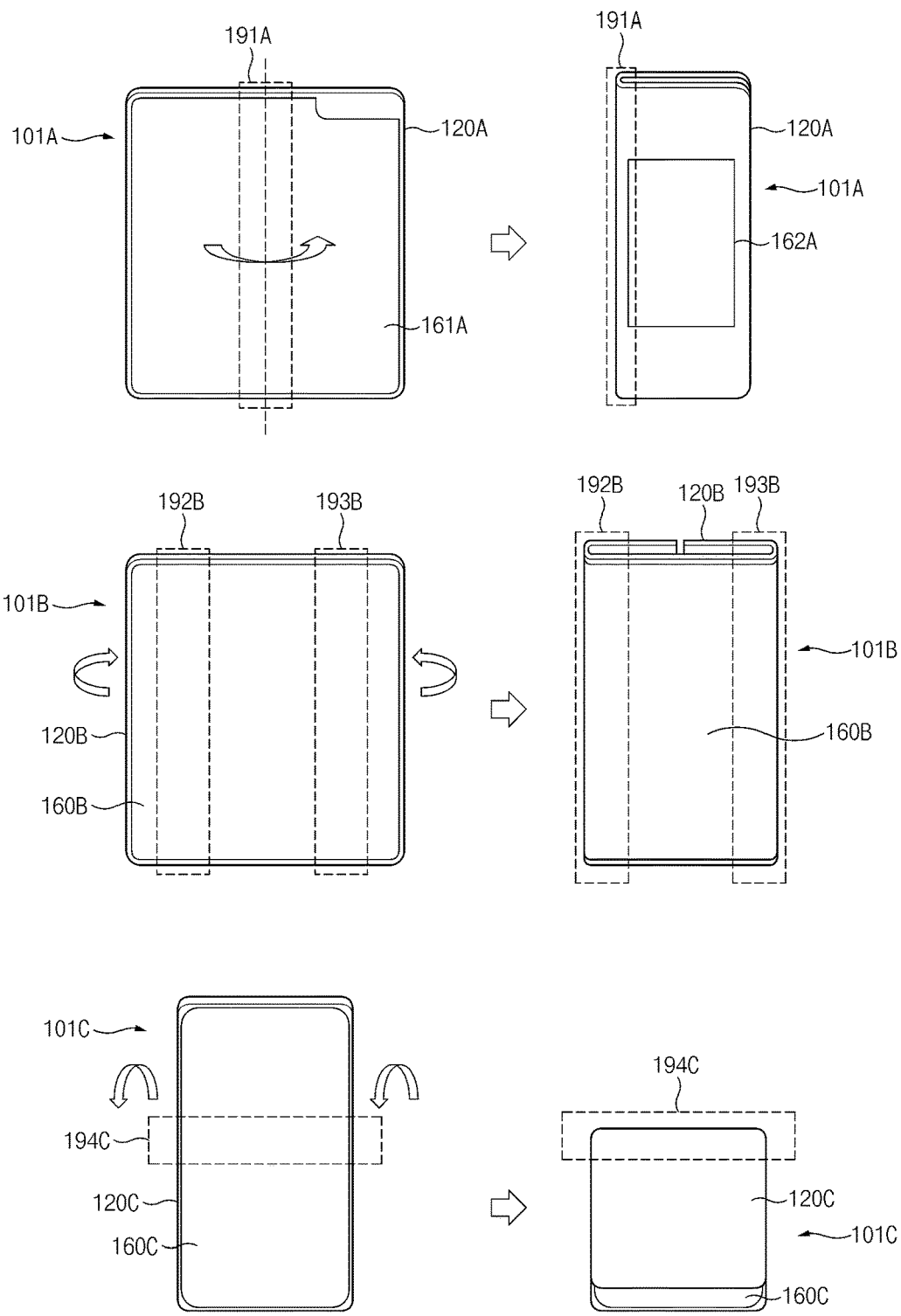
FIG. 3 illustrates electronic devices having forms changed according to an embodiment of the disclosure.

FIG. 3 illustrates electronic devices having forms changed according to an embodiment of the disclosure.

Referring to FIG. 3, according to various embodiments of the disclosure, the form of an electronic device 101A, 101B, or 101C (e.g., the electronic device 200 of FIG. 2) may be physically changed depending on folding/unfolding statuses. For example, the electronic device 101A, 101B, or 101C may include a flexible display in at least a portion of the electronic device 101A, 101B, or 101C. The electronic device may be folded (e.g., closed) or unfolded (e.g., open) about a folding part of the electronic device. For example, the folding part of the electronic device may be referred to as a hinge part. The folding part, which is referred to a part (e.g., a hinge) or an area for changing the form of the electronic device, is not limited to a specific structure.

According to an embodiment of the disclosure, the first electronic device 101A (e.g., the electronic device 101 of FIG. 1) may be folded left and right. In FIG. 3, a left direction may be referred to as a −X axis direction and a right direction may be referred to as a +X axis direction. For example, the first electronic device 101A may be folded about at least one folding part 191A. For example, the first electronic device 101A may include a flexible first display 161A (e.g., the display module 160 of FIG. 1). The first electronic device 101A may be folded or unfolded about the folding part 191A. The first electronic device 101A may include a second display 162A (e.g., the display module 160 of FIG. 1) disposed on an opposite surface of one surface where the display 161A disposed. Although FIG. 3 illustrates that the first electronic device 101A is an in-fold electronic device in which the first display 161A is folded inward, embodiments of the disclosure are not limited thereto. For example, the first electronic device 101A may be an out-folded electronic device in which the first display 161A is folded outward or an electronic device to support both the in-fold manner and the out-fold manner. For another example, although the first display 161A is illustrated as a single display, embodiments of the disclosure are not limited thereto. The first electronic device 101A may include a plurality of displays divided about the folding part 191A. A housing 120A may include a plurality of housings (e.g., the first housing 220 and the second housing 230 of FIG. 2) divided about the folding part 191A. For another example, the first electronic device 101A may be the combination of a plurality of electronic devices coupled to each other to be folded about the folding part 191A. In this case, a plurality of electronic devices may be coupled to each other through separate structures (e.g., a housing; a hinge).

According to an embodiment of the disclosure, the second electronic device 101B (e.g., the electronic device 101 of FIG. 1) may be folded about a plurality of axes. For example, the second electronic device 101B may include a flexible display 160B (e.g., the display module 160 of FIG. 1). For example, the second electronic device 101B may be folded left and right about a second folding part 192B and a third folding part 193B. Although FIG. 3 illustrates that the second electronic device 101B is an out-fold electronic device in which the flexible display 160B is folded outward, embodiments of the disclosure are not limited thereto. For example, the second electronic device 101B may be in-folded about the second folding part 192B and/or the third folding part 193B. For another example, although the flexible display 160B is illustrated as a single display, embodiments of the disclosure are not limited thereto. The second electronic device 101B may include a plurality of displays divided along at least one of the second folding part 192B and the third folding part 193B. A housing 120B may include a plurality of housings (e.g., the first housing 220 and the second housing 230 of FIG. 2) divided about at least one of the second folding part 192B and the third folding part 193B. For another example, the second electronic device 101B may be the combination of a plurality of electronic devices coupled to each other to be folded about the second folding part 192B and the third folding part 193B. In this case, for example, a plurality of electronic devices may be coupled to each other through separate structures (e.g., a housing; a hinge).

According to an embodiment of the disclosure, the third electronic device 101C (e.g., the electronic device 101 of FIG. 1) may be folded. For example, the third electronic device 101C may include a flexible display 160C (e.g., the display module 160 of FIG. 1). For example, the third electronic device 101C may be folded up and down about a fourth folding part 194C. Although FIG. 3 illustrates that the third electronic device 101C is an in-fold electronic device in which the flexible display 160C is folded inward, embodiments of the disclosure are not limited thereto. For example, the third electronic device 101C may be out-folded or may be both in-folded and out-folded. For another example, although the flexible display 160C is illustrated as a display, embodiments of the disclosure are not limited thereto. The third electronic device 101C may include a plurality of displays divided about the fourth folding part 194C. A housing 120C may include a plurality of housings (e.g., the first housing 220 and the second housing 230 of FIG. 2) divided about the folding part 194C. For another example, the third electronic device 101C may be the combination of a plurality of electronic devices coupled to each other to be folded about the fourth folding part 194C. In this case, a plurality of electronic devices may be coupled to each other through separate structures (e.g., a housing; a hinge).

Although the physical change in the forms of electronic devices 101A, 101B, and 101C illustrated in FIG. 3 are provided for the illustrative purpose, the embodiments of the disclosure are not limited thereto. For example, the electronic device 200 may be folded or unfolded about any axis.

Figure 4:
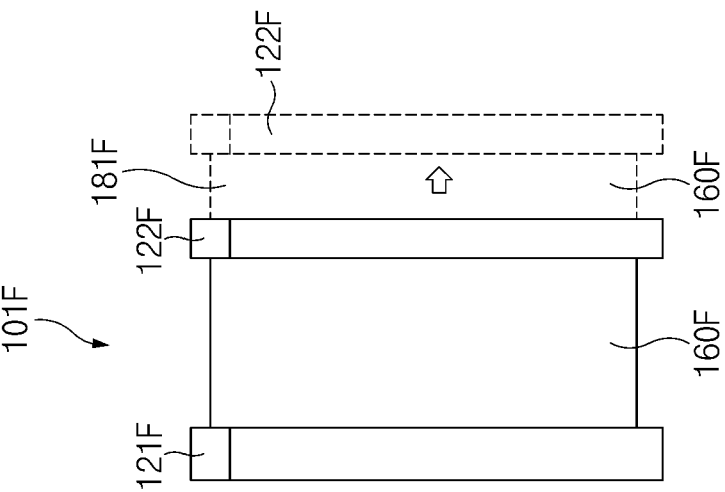
FIG. 4 illustrates electronic devices having forms changed according to an embodiment of the disclosure.
Figure 4:
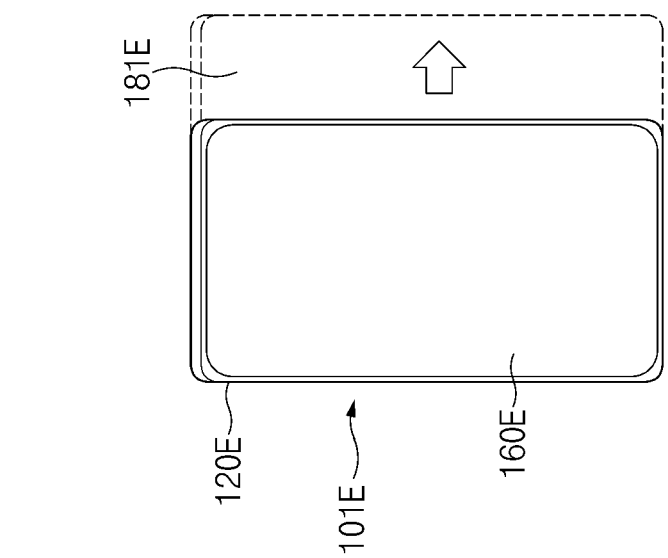
Figure 4:
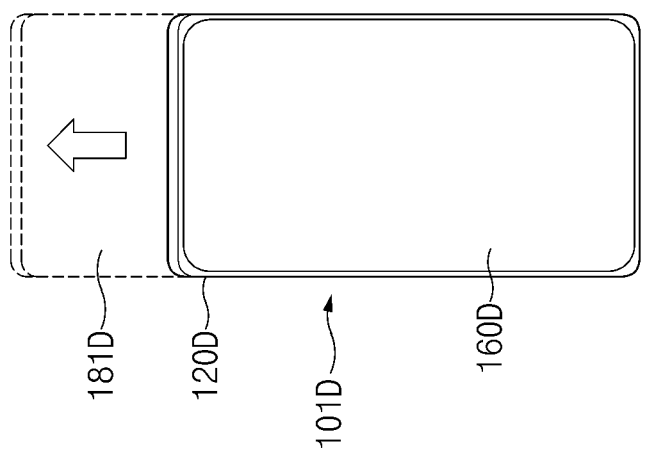

FIG. 4 illustrates electronic devices having forms changed according to an embodiment of the disclosure.

Referring to FIG. 4, according to various embodiments of the disclosure, the form of an electronic device 101D, 101E, or 101F (e.g., the electronic device 200 of FIG. 2) may be physically changed, as a housing of the electronic device may be physically extended/retracted. For example, the electronic device may include a housing and/or a display having at least some extendable portions. For example, as a portion of the electronic device may be slid or rolled, the electronic device may be extended (e.g., opened) or retracted (closed). When the form of the electronic device is changed from the first form to the second form, an extending part may be referred to as a part or an area corresponding to the difference between the first form and the second form, but is not limited to a specific structure.

According to an embodiment of the disclosure, the fourth electronic device 101D (e.g., the electronic device 101 of FIG. 1) may include an extending part 181D which extends or retracts in a vertical direction. For example, at least a portion of a housing 120D of the fourth electronic device 101D may include the extending part 181D which may extend upward of the fourth electronic device 101D. For example, the extending part 181D, which is a part of the housing 120D, may move upward to be higher than another part of the housing 120D, such that the housing 120D of the fourth electronic device 101D is extended. The extending part 181D and the housing 120D may correspond to the first housing 220 and the second housing 230 of FIG. 2. The extending part 181D may move independently from the display 160D (e.g., the display module 160 of FIG. 1). For example, the extending part 181D may move upward to be higher than the display 160D. For another example, the extending part 181D may be positioned lower than the display 160D. According to an embodiment of the disclosure, the extending part 181D may include a camera module. For example, the camera module may be set to rotate, as the extending part 181D moves.

According to an embodiment of the disclosure, the fifth electronic device 101E (e.g., the electronic device 101 of FIG. 1) may include an extending part 181E which extends or retracts left or right. For example, at least a portion of a housing 120E of the fifth electronic device 101E may include the extending part 181E which may extend in a right direction of the fifth electronic device 101E. The extending part 181E and the housing 120E may correspond to the first housing 220 and the second housing 230 of FIG. 2. The extending part 181E may move independently from a display 160E (e.g., the display module 160 of FIG. 1). In this case, the display 160E may be extended by moving the extending part 181E toward one side of the housing 120E. For another example, the extending part 181E may move together with the display 160E. In this case, the display 160E may be expanded, as the extending part 181E moves to one side of the housing 120E together with the display 160E. According to an embodiment of the disclosure, the extending part 181E may include a camera module. For example, the camera module may be set to rotate, as the extending part 181E moves.

According to an embodiment of the disclosure, the sixth electronic device 101F (e.g., the electronic device 101 of FIG. 1) may include an extending part 181F which extends or retracts left or right. For example, a display 160F of the sixth electronic device 101F may include a flexible display (e.g., the display module 160 of FIG. 1). For example, at least a portion of the display 160F may be rolled and received in a first housing 121F. For example, the display 160F is unrolled to be extended between the first housing 121F (e.g., the first housing 220 in FIG. 2) and a second housing 122F (e.g., the second housing 230 of FIG. 2). The extending part 181F may include a rolling part of the display 160F.

Although the physical change in the forms of the electronic devices 101D, 101E, and 101F illustrated in FIG. 4 are provided for the illustrative purpose, embodiments of the disclosure are not limited thereto. For example, the electronic device may be extended or retracted in any direction.

The changes to the various forms of the electronic devices have been made with respect to the first electronic device 101A, the second electronic device 101B, the third electronic device 101C, the fourth electronic device 101D, the fifth electronic device 101E, or the sixth electronic device 101F of FIGS. 3 and 4. Although the changes to various forms are provided for the illustrative purpose, embodiments of the disclosure are not limited thereto.

Figure 5:
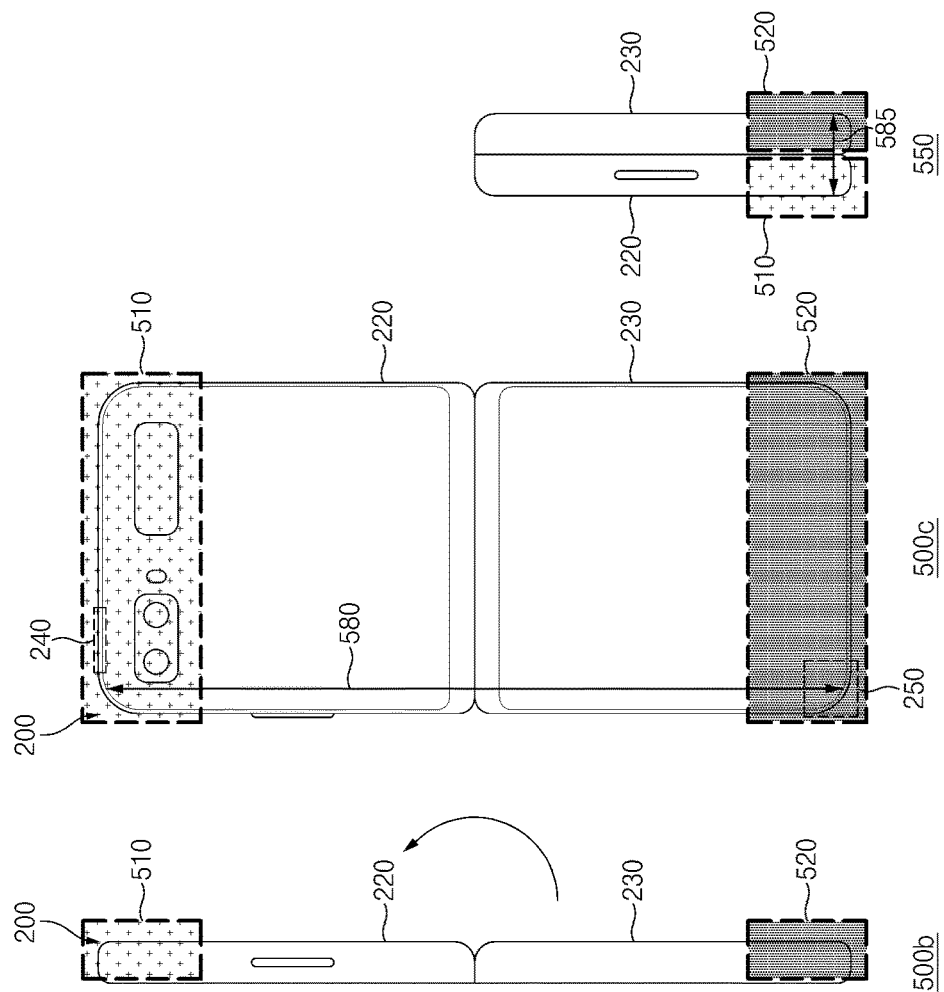
FIG. 5 illustrates a relative position of an antenna, which results from a change in a form of an electronic device, according to an embodiment of the disclosure.
Figure 5:
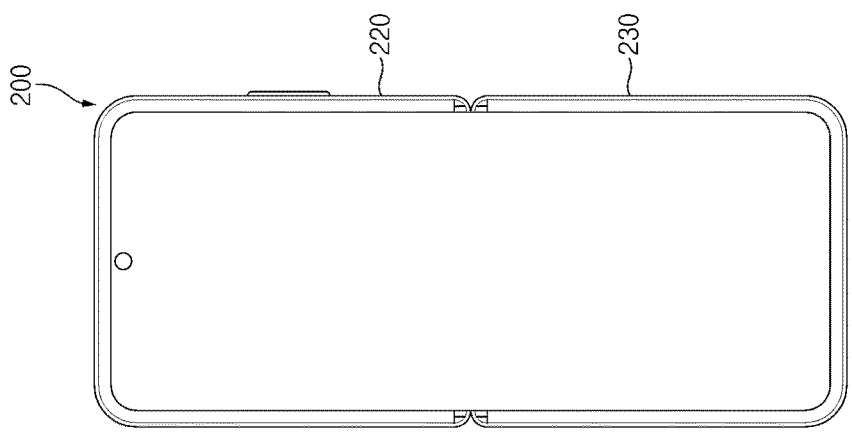
Figure 5:
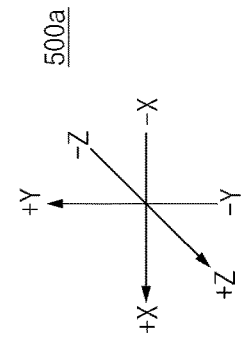

FIG. 5 illustrates a relative position of an antenna, which results from a change in a form of an electronic device, according to an embodiment of the disclosure.

Referring to FIG. 5, when the electronic device 200 is in the unfolding status, reference numeral 500a illustrates a front surface of the electronic device 200 (e.g., in the +Z axis direction). Reference numeral 500b illustrates the electronic device 200, when the electronic device 200 in reference numeral 500a is viewed in an −X axis direction, and reference numeral 500c illustrates the electronic device 200, when the electronic device 200 in reference numeral 500a is viewed in the −Z axis direction. Reference numeral 550 illustrates the electronic device 200 which is in the folding status and viewed in the −X axis direction when the electronic device 200 in the reference number 500a is in the folding status.

According to an embodiment of the disclosure, the electronic device 200 may include the first housing 220 (e.g., the first housing 220 of FIG. 2) and the second housing 230 (e.g., the second housing 230 of FIG. 2). According to an embodiment of the disclosure, the first antenna 240 (e.g., the first antenna 240 of FIG. 2) may be disposed at an edge of the first housing 220 positioned in the +Y axis direction, and the second antenna 250 (e.g., the second antenna 250 of FIG. 2) may be disposed at an edge of the second housing 230 positioned in the −Y axis direction. For example, the first antenna 240 may be disposed in at least a portion of a first area 510. For example, the second antenna 250 may be disposed in at least a portion of a second area 520. Although FIG. 5 illustrates an embodiment in which the first antenna 240 and/or the second antenna 250 includes a metal portion of the first housing 220 and the second housing 230, the first antenna 240 and/or the second antenna 250 may include a conductive pattern (e.g., laser direct structuring (LDS)) formed on a PCB or an antenna carrier inside the housing according to other embodiments.

According to an embodiment of the disclosure, when the electronic device 200 (e.g., reference numerals 500a, 500b, and 500c) is in the unfolding status, the first antenna 240 and the second antenna 250 may be spaced apart from each other by a first distance 580. For example, the first distance 580 may be understood as a distance allowing the processor 210 to stably receive a signal through the second antenna 250, as the first antenna 240 and the second antenna 250 are spaced apart from each other by a sufficiently long distance. For example, when the first antenna 240 and the second antenna 250 are spaced apart from each other by the first distance 580, the interference between a signal transmitted by the first antenna 240 and a signal received by the second antenna 250 may be minimized.

According to an embodiment of the disclosure, when the electronic device 200 is in the folding status 550, the first antenna 240 and the second antenna 250 may be spaced apart from each other by a second distance 585. The second distance 585, which is provided for the illustrative purpose, may be formed to be shorter or longer depending on the positions of the first antenna 240 and the second antenna 250. For another example, the second distance 585 may be a distance to cause the interference between a signal transmitted by one of the first antenna 240 and the second antenna 250 and a signal received by a remaining one of the first antenna 240 and the second antenna 250. The first area 510 of the first housing 220 and the second area 520 of the second housing 230 are adjacent to each other in the folding status (see reference numeral 550) or the distance between the first area 510 and the second area 520 in the folding status is shorter than the distance between the first area 510 and the second area 520 in the unfolding status. Accordingly, when the electronic device 200 is in the folding status (see reference number 550), the first antenna 240 may be disposed adjacent to the second antenna 250. According to an embodiment of the disclosure, when a frequency band or a channel of a signal (transmit signal) transmitted by the first antenna 240 and a frequency band or a channel of a signal (receive signal) received by the second antenna 250 are adjacent to each other or partially overlapped each other in the folding status (see reference numeral 550), the receive signal of the second antenna 250 may be influenced by the transmit signal of the first antenna 240. In this case, signal receiving performance of the second antenna 250 may be deteriorated. The description on that a frequency band or a channel of a signal transmitted by the first antenna 240 is adjacent to or partially overlapped with a frequency band or a channel of a signal received by the second antenna 250 may make reference to the description made with respect to FIG. 6.

Figure 6:
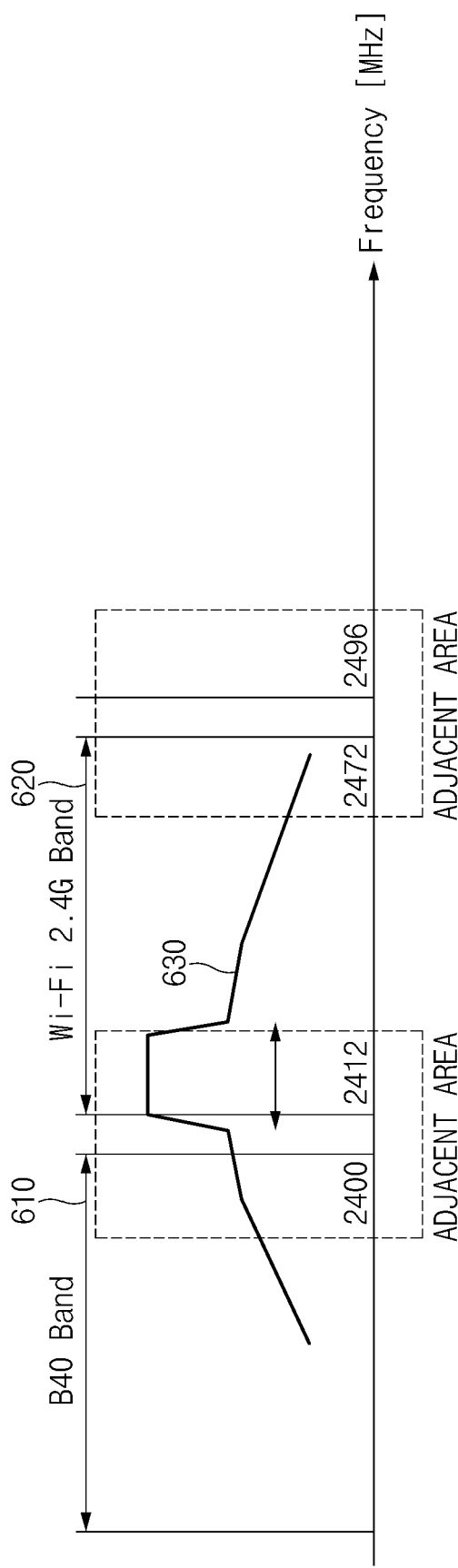
FIG. 6 illustrates signal interference between adjacent frequency bands or adjacent channels according to an embodiment of the disclosure.

FIG. 6 illustrates signal interference between adjacent frequency bands or adjacent channels according to an embodiment of the disclosure.

Referring to FIG. 6, according to an embodiment of the disclosure, the processor (e.g., the processor 210 of FIG. 2) may make second communication by using a first antenna (e.g., the first antenna 240 of FIG. 2) and first communication by using a second antenna (e.g., the second antenna 250 of FIG. 2). For example, the first communication or the second communication may include WiFi communication or cellular communication. For example, a frequency band transmitted or received, by the first antenna 240, to make the second communication may be referred to as a second band 620. The second band 620 may include, for example, a WiFi 2.4G frequency band (or 2.4 GHz), or the frequency band of about 2.4 GHz. For example, a frequency band transmitted or received, by the second antenna 250, to make the first communication may be referred to as a first band 610. The first band 610 may include, for example, a WiFi B40 frequency band or the frequency band of about 2.3 GHz.

According to an embodiment of the disclosure, the first band 610 and the second band 620 may be understood as frequency bands adjacent to each other. Each of the first band 610 and the second band 620 may include a plurality of channels. According to an embodiment of the disclosure, the processor 210 may transmit and receive a signal in a lower frequency channel (e.g., about 2412 MHz) of the second band 620 by using the first antenna 240. According to an embodiment of the disclosure, the processor 210 may transmit and receive a signal in a higher frequency channel (e.g., about 2400 MHz) of the first band 610 by using the second antenna 250. For example, the signal transmitted by the first antenna 240 by using the lower frequency channel of the second band 620 may be referred to as a transmit signal 630. The signal received by the second antenna 250 by using the higher frequency channel of the first band 610 may be influenced (interference) by at least a portion of a component of the transmit signal 630. In this case, signal receiving performance of the second antenna 250 may be deteriorated.

Although the number of first antennas 240, the number of second antennas 250, and a transmit frequency or a receive frequency are provided for the illustrative purpose, an embodiment of the disclosure is not limited thereto. The following description will be made regarding a method for operating an antenna (e.g., the first antenna 240 and the second antenna 250) by the processor 210 to prevent the antenna from being deteriorated.

Figure 7:
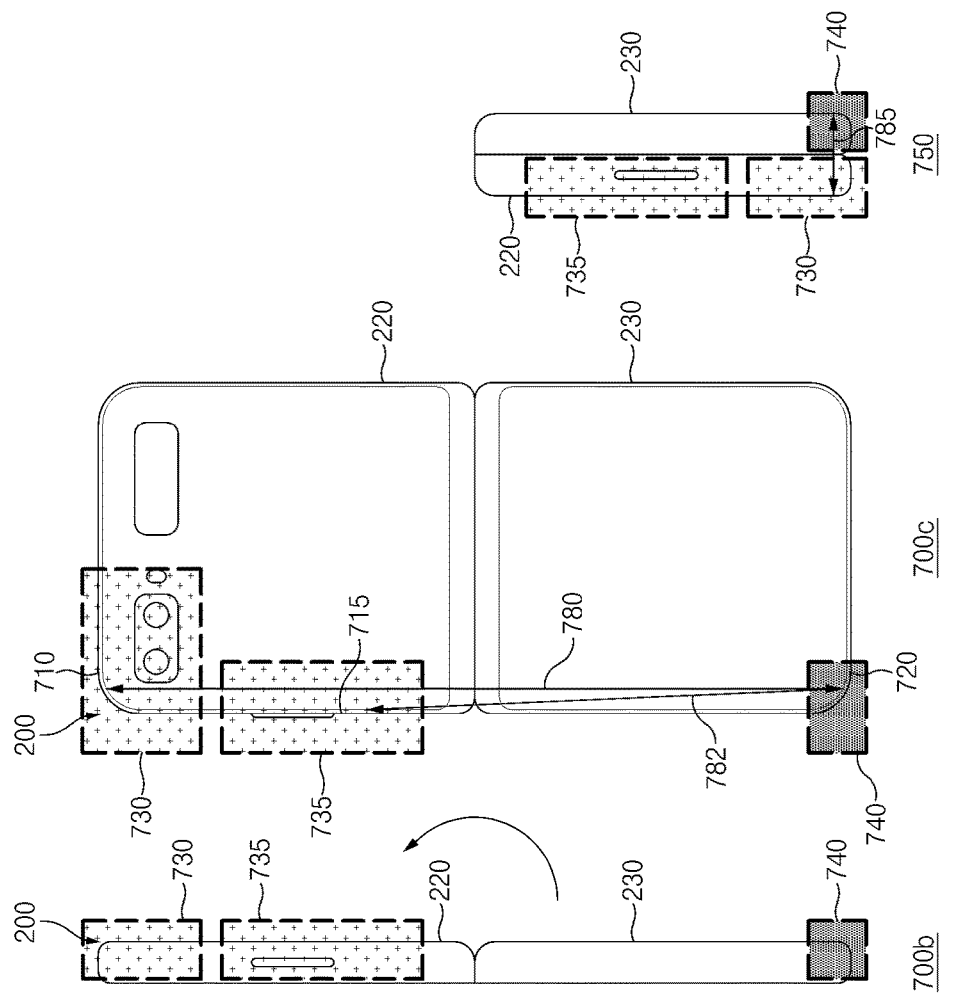
FIG. 7 illustrates an electronic device to perform a multi input multi output (MIMO) operation according to an embodiment of the disclosure.

FIG. 7 illustrates an electronic device to perform a MIMO operation according to an embodiment of the disclosure.

Referring to FIG. 7, when the electronic device (e.g., the electronic device 200 of FIG. 2) is in the unfolding status, reference numeral 700a illustrates the front surface of the electronic device 200. Reference numeral 700b illustrates the electronic device 200, when the electronic device 200 in reference numeral 700a is viewed in an −X axis direction, and reference numeral 700c illustrates the electronic device 200, when the electronic device 200 in reference numeral 700a is viewed from the −Z axis direction. Reference numeral 750 illustrates the electronic device 200 which is in the folding status and viewed in the −X axis direction, when the electronic device 200 in reference numeral 700a is in the folding status.

According to an embodiment of the disclosure, a plurality of first antennas 710 and 715 (e.g., the first antenna 240 of FIG. 2) may include a (1-1)-th antenna 710 and a (1-2)-th antenna 715. The (1-1)-th antenna 710 may be disposed at an edge (e.g., an upper end) of the first housing 220 positioned in the +Y axis direction, and the (1-2)-th antenna 715 may be disposed at an edge (e.g., the side surface) of the first housing 220 positioned in the +X axis direction. A second antenna 720 (e.g., the second antenna 250 of FIG. 2) may be disposed at an edge (e.g., a lower end) of the second housing 230 positioned in the −Y axis direction. For example, the (1-1)-th antenna 710 may be disposed in at least a portion of a (1-1)-th area 730, and the (1-2)-th antenna 715 is disposed in at least a portion of a (1-2)-th area 735. For example, the second antenna 720 may be disposed in at least a portion of a second area 740. Although FIG. 7 illustrates an embodiment in which the (1-1)-th antenna 710, the (1-2)-th antenna 715, and/or the second antenna 720 includes a metal portion included in the first housing 220 and the second housing 230, the (1-1)-th antenna 710, the (1-2)-th antenna 715, and/or the second antenna 720 may include a conductive pattern (e.g., LDS) formed on a PCB inside the housing or an antenna carrier, according to another embodiment.

According to an embodiment of the disclosure, the (1-1)-th antenna 710 and the (1-2)-th antenna 715 may transmit and receive a signal in a WiFi 2.4 G band (e.g., WiFi 2.4G band 620 in FIG. 6). The processor (e.g., the processor 210 of FIG. 2) may perform a multiple input multiple output (MIMO) operation using the (1-1)-th antenna 710 and the (1-2)-th antenna 715. According to an embodiment of the disclosure, the second antenna 720 may transmit and receive a signal in a B40 band (e.g., the B40 band 610 in FIG. 6).

According to an embodiment of the disclosure, when the electronic device 200 (e.g., reference numerals 700a, 700b, and 700c) is in the unfolding status, the plurality of first antennas 710 and 715 and the second antenna 720 may be spaced apart from each other by a (1-1)-th distance 780 and a (1-2)-th distance 782, respectively. For example, the (1-1)-th distance 780 and the (1-2)-th distance 782 may be understood as distances allowing the processor 210 to stably receive a signal through the second antenna 720 in the unfolding status. For example, when the first antennas 710 and 715 and the second antenna 720 are spaced apart from each other by the (1-1)-th distance 780 and the (1-2)-th distance 782, the interference between a signal transmitted by the first antennas 710 and 715 and a signal received by the second antenna 720 may be reduced.

According to an embodiment of the disclosure, a frequency band or a channel of the signal transmitted by the plurality of antennas 710 and 715 may be adjacent to or partially overlapped with a frequency band or a channel of the signal received by the second antenna 720. The details thereof will make reference to the description made with reference to FIG. 6.

According to an embodiment of the disclosure, when the electronic device 200 is in the folding status 750, the (1-1)-th antenna 710 of the plurality of first antennas 710 and 715 and the second antenna 720 may be spaced apart from each other by a second distance 785. The second distance 785, which is provided for the illustrative purpose, may be formed to be shorter or longer depending on the positions of the (1-1)-th antenna 710 and the second antenna 720. For another example, the second distance 785 may be a distance to cause the interference between a signal transmitted by one of the (1-1)-th antenna 710 and the second antenna 720 and a signal received by a remaining one of the (1-1)-th antenna 710 and the second antenna 720. The (1-1)-th area 730 of the first housing 220 and the second area 740 of the second housing 230 are adjacent to each other in the folding status or the distance between the (1-1)-th area 730 and the second area 740 in the folding status is shorter than the distance between the (1-1)-th area 730 and the second area 740 in the unfolding status. Accordingly, when the electronic device 200 is in the folding status, the (1-1)-th antenna 710 may be disposed adjacent to the second antenna 720. According to an embodiment of the disclosure, when a frequency band or a channel of a signal transmitted by the (1-1)-th antenna 710 is adjacent to or partially overlapped with a frequency band or a channel of a signal received by the second antenna 720 in the folding status (see reference numeral 750), the signal receiving performance of the second antenna 720 may be deteriorated. The details thereof will make reference to the description made with reference to FIG. 6.

According to an embodiment of the disclosure, for example, when the electronic device 200 is in the folding status (see reference numeral 750) and when the signal receiving performance of the second antenna 720 is deteriorated, the processor 210 may make an antenna, which is adjacent to the second antenna 720, of the plurality of antennas 710 and 715, disable. For example, the processor 210 may make the (1-1)-th antenna 710 disable. In this case, the processor 210 may perform a single input single output (SISO) operation by using the (1-2)-th antenna 715.

Figure 8A:
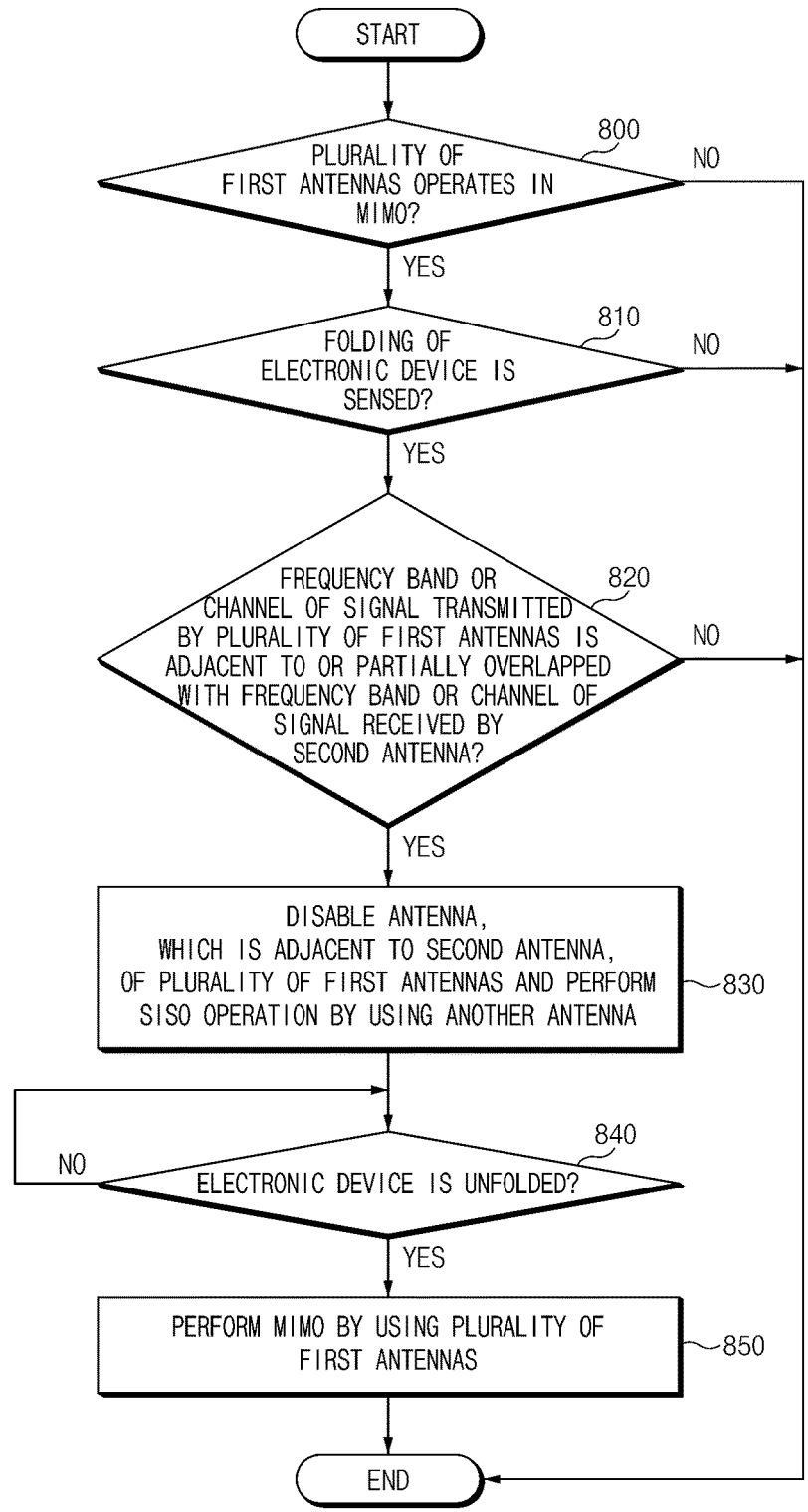
FIGS. 8A and 8B are flowcharts illustrating a method for operating an antenna by an electronic device illustrated in FIG. 7 according to various embodiments of the disclosure.
Figure 8B:
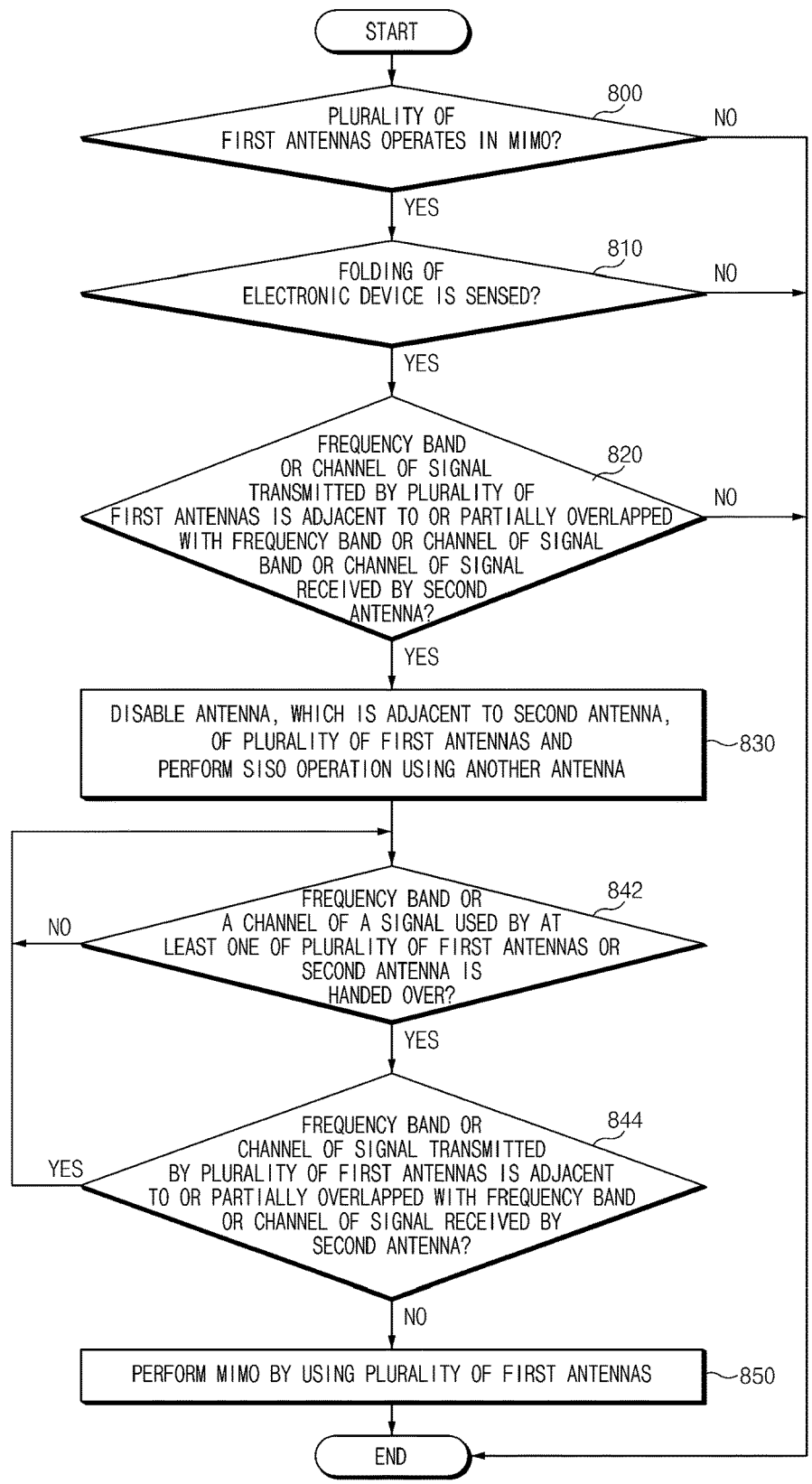

FIGS. 8A and 8B are flowcharts illustrating a method for operating an antenna by an electronic device illustrated in FIG. 7 according to various embodiments of the disclosure.

Referring to FIG. 8A, in operation 800, the processor 210 may determine whether the plurality of first antennas 710 and 715 are operating in MIMO. While the plurality of first antennas 710 and 715 are operating in MIMO, the processor 210 may proceed to operation 810. When the plurality of first antennas 710 and 715 do not operate in MIMO in operation 800, the processor 210 may terminate the operation.

In operation 810, the processor 210 may sense the folding status of the electronic device 200 by using the at least one sensor 260. For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 820. When folding is not sensed in operation 810, the processor 210 may terminate the operation.

In operation 820, the processor 210 may determine whether a frequency band or a channel of a signal transmitted by the plurality of first antennas 710 and 715 is adjacent to or partially overlapped with a frequency band or a channel of a signal received by the second antenna 720. The details thereof will make reference to the description made with reference to FIG. 6. According to an embodiment of the disclosure, when a frequency band or a channel of the signal transmitted by the plurality of first antennas 710 and 715 is adjacent to or partially overlapped with a frequency band or a channel of the signal received by the second antenna 720, the signal transmitted by the plurality of first antennas 710 and 715 may exert an influence on signal receiving performance of the second antenna 720. In this case, the processor 210 may proceed to operation 830. In operation 820, when the frequency band or the channel of the signal transmitted by the plurality of first antennas 710 and 715 is not adjacent to or not partially overlapped with the frequency band or the channel of the signal received by the second antenna 720 in the frequency band or the channel, the processor 210 may terminate the operation.

In operation 830, the processor 210 may make an antenna, which is adjacent to the second antenna 720, of the plurality of antennas 710 and 715, disable. The processor 210 may perform a single input single output (SISO) operation by using another antenna (e.g., the (1-2)-th antenna 715) of the plurality of antennas 710 and 715.

In operation 840, according to an embodiment of the disclosure, the processor 210 may sense the unfolding status of the electronic device 200 by using the at least one sensor 260. When the electronic device 200 is maintained in the folding status ("NO" in operation 840), the processor 210 may return to operation 840 and may repeat operation 840. For another example, when the electronic device 200 is maintained in the folding status ("NO" in operation 840), the processor 210 may return to the operation 820 and may perform the operations subsequent to operation 820.

When the electronic device 200 is in the unfolding status ("YES" in operation 840), the processor 210 may proceed to operation 850. In operation 850, the processor 210 may activate the (1-1)-th antenna 710 and may perform the MIMO operation by using the plurality of first antennas 710 and 715.

The description of a reference numeral of reference numerals in FIG. 8B, which is the same as reference numerals in FIG. 8A may be understood by making reference to the description made with respect to FIG. 8A.

Referring to FIG. 8B, in operation 842, the processor 210 may determine whether a frequency band or a channel of a signal used by at least one of the plurality of first antennas 710 and 715 or the second antenna 720 is handed over. When the frequency band or the channel of the signal used by at least one of the plurality of first antennas 710 and 715 or the second antenna 720 is not handed over ("NO" in operation 842), the processor 210 may return to operation 842 and may repeat operation 842.

When the frequency band or the channel of the signal used by at least one of the plurality of first antennas 710 and 715 or the second antenna 720 is handed over ("YES" in operation 842), the processor 210 may proceed to operation 844. In operation 844, the processor 210 may determine whether a frequency band or a channel of a signal transmitted by the plurality of first antennas 710 and 715 is adjacent to or partially overlapped with a frequency band or a channel of a signal received by the second antenna 720.

When the frequency band or the channel of the signal transmitted by the plurality of first antennas 710 and 715 is adjacent to or partially overlapped with the frequency band or the channel of the signal received by the second antenna 720 ("YES" in operation 844), the processor 210 may return to operation 842 and may perform operation 842.

When the frequency band or the channel of the signal transmitted by the plurality of first antennas 710 and 715 is not adjacent to or not partially overlapped with the frequency band or the channel of the signal received by the second antenna 720 ("NO" in operation 844), the processor 210 may proceed to operation 850.

The operations of the antennas in FIGS. 8A and 8B are provided for the illustrative purpose, and the operations of the plurality of first antennas 710 and 715 may be performed interchangeably with the operation of the second antenna 720.

Figure 8C:
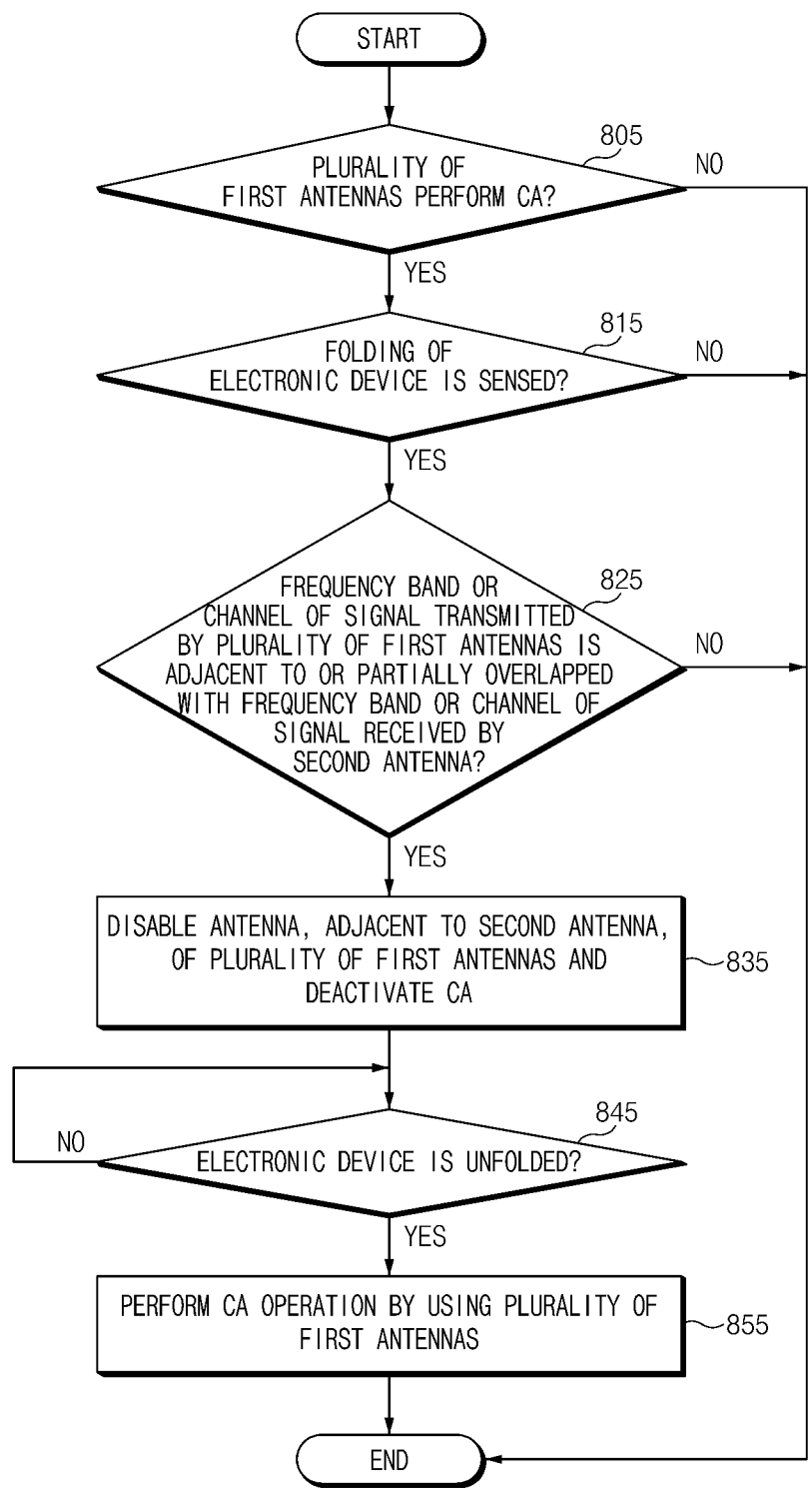
FIGS. 8C and 8D are flowcharts illustrating a method for operating an antenna by an electronic device illustrated in FIG. 7 according to various embodiments of the disclosure.
Figure 8D:
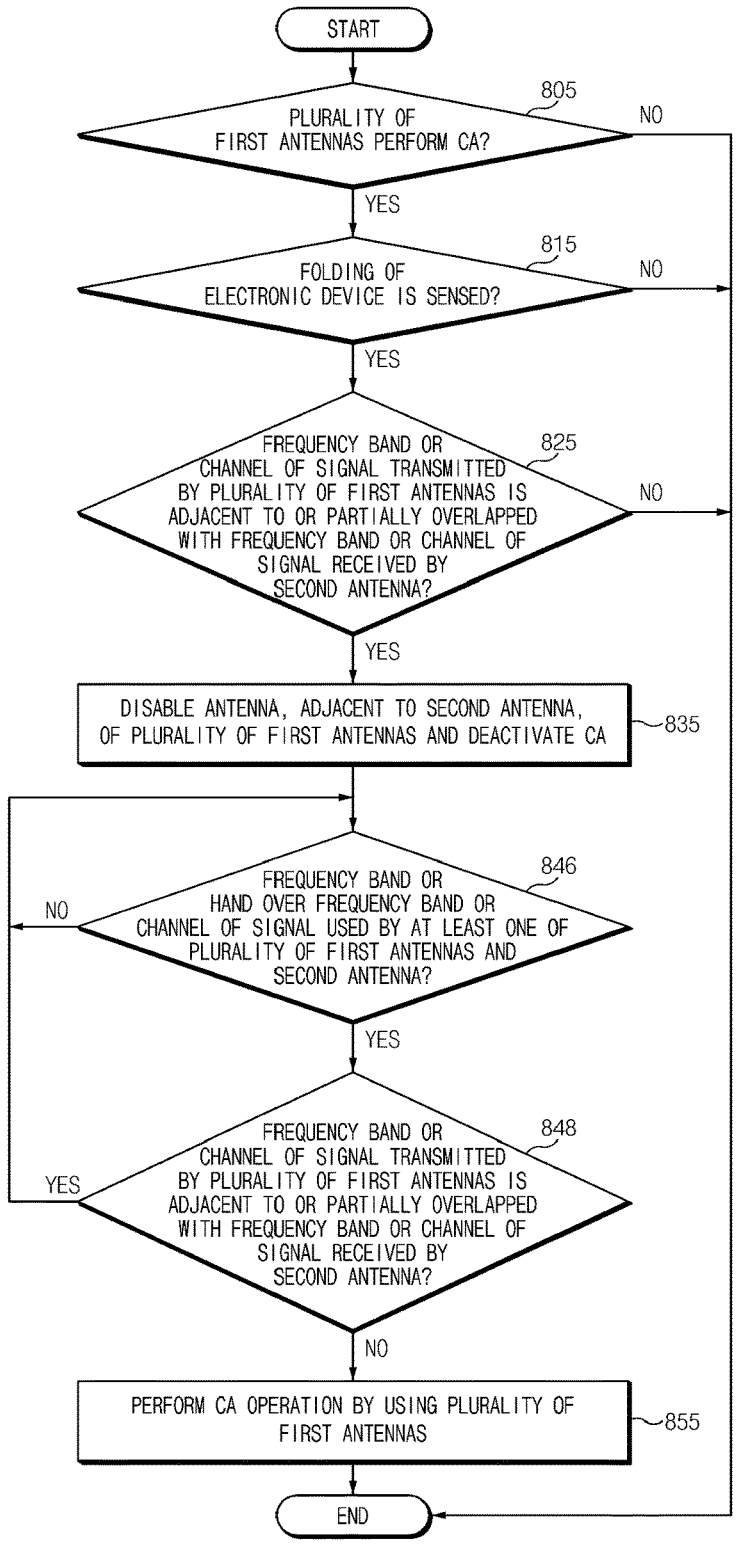

FIGS. 8C and 8D are flowcharts illustrating a method for operating an antenna by an electronic device illustrated in FIG. 7 according to various embodiments of the disclosure.

Referring to FIG. 8C, in operation 805, the processor 210 may determine whether the plurality of first antennas 710 and 715 are performing a carrier aggregation (CA) operation. While the plurality of first antennas 710 and 715 are performing the CA operation, the processor 210 may proceed to operation 815. When the plurality of first antennas 710 and 715 do not perform the CA operation in operation 805, the processor 210 may terminate the operation.

In operation 815, the processor 210 may sense the folding status of the electronic device 200 by using the at least one sensor 260. For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 825. When folding is not sensed in operation 815, the processor 210 may terminate the operation.

In operation 825, the processor 210 may determine whether a frequency band or a channel of a signal transmitted by the plurality of first antennas 710 and 715 is adjacent to or partially overlapped with a frequency band or a channel of a signal received by the second antenna 720. The details thereof will make reference to the description made with reference to FIG. 6. According to an embodiment of the disclosure, when the frequency band or the channel of the signal transmitted by the plurality of first antennas 710 and 715 is adjacent to or partially overlapped with the frequency band or the channel of the signal received by the second antenna 720, the signal transmitted by the plurality of first antennas 710 and 715 may exert an influence on signal receiving performance of the second antenna 720. In this case, the processor 210 may proceed to operation 835. In operation 825, when the frequency band or the channel of the signal transmitted by the plurality of first antennas 710 and 715 is not adjacent to or not partially overlapped with the frequency band or the channel of the signal received by the second antenna 720, the processor 210 may terminate an operation.

In operation 835, the processor 210 may make an antenna, which is adjacent to the second antenna 720, of the plurality of first antennas 710 and 715, disable. In addition, the processor 210 may deactivate the CA operation.

In operation 845, according to an embodiment of the disclosure, the processor 210 may sense the unfolding status of the electronic device 200 by using the at least one sensor 260. When the electronic device 200 is maintained in the folding status ("NO" in operation 845), the processor 210 may return to operation 845 and may perform operation 845.

When the electronic device 200 is unfolded ("YES" in operation 845), the processor 210 may proceed to operation 855. In operation 855, the processor 210 may activate the first antenna 710 and may perform the CA operation by using the plurality of first antennas 710 and 715.

The description of a reference numeral of reference numerals in FIG. 8D, which is the same as the reference numeral in FIG. 8C, may be understood by making reference to the description made with respect to FIG. 8C.

Referring to FIG. 8D, in operation 846, the processor 210 may determine whether a frequency band or a channel of a signal used by at least one of the plurality of first antennas 710 and 715 or the second antenna 720 is handed over.

When the frequency band or the channel of the signal used by at least one of the plurality of first antennas 710 and 715 or the second antenna 720 is not handed over ("NO" in operation 846), the processor 210 may return operation 846 and may repeat operation 846.

When the frequency band or the channel of the signal used by at least one of the plurality of first antennas 710 and 715 or the second antenna 720 is handed over ("YES" in operation 846), the processor 210 may proceed to operation 848. In operation 848, the processor 210 may determine whether a frequency band or a channel of a signal transmitted by the plurality of first antennas 710 and 715 is adjacent to or partially overlapped with a frequency band or a channel of a signal received by the second antenna 720.

When the frequency band or the channel of the signal transmitted by the plurality of first antennas 710 and 715 is adjacent to or partially overlapped with the frequency band or the channel of the signal received by the second antenna 720 ("YES" in operation 848), the processor 210 may return to operation 846 and may perform operation 846.

When the frequency band or the channel of the signal transmitted by the plurality of first antennas 710 and 715 is not adjacent to or not partially overlapped with the frequency band or the channel of the signal received by the second antenna 720 in the frequency band or the channel ("NO" in operation 848), the processor 210 may proceed to operation 855.

The operations of the antennas in FIGS. 8C and 8D are provided for the illustrative purpose, and the operations of the plurality of first antennas 710 and 715 may be performed interchangeably with the operation of the second antenna 720.

Figure 8E:
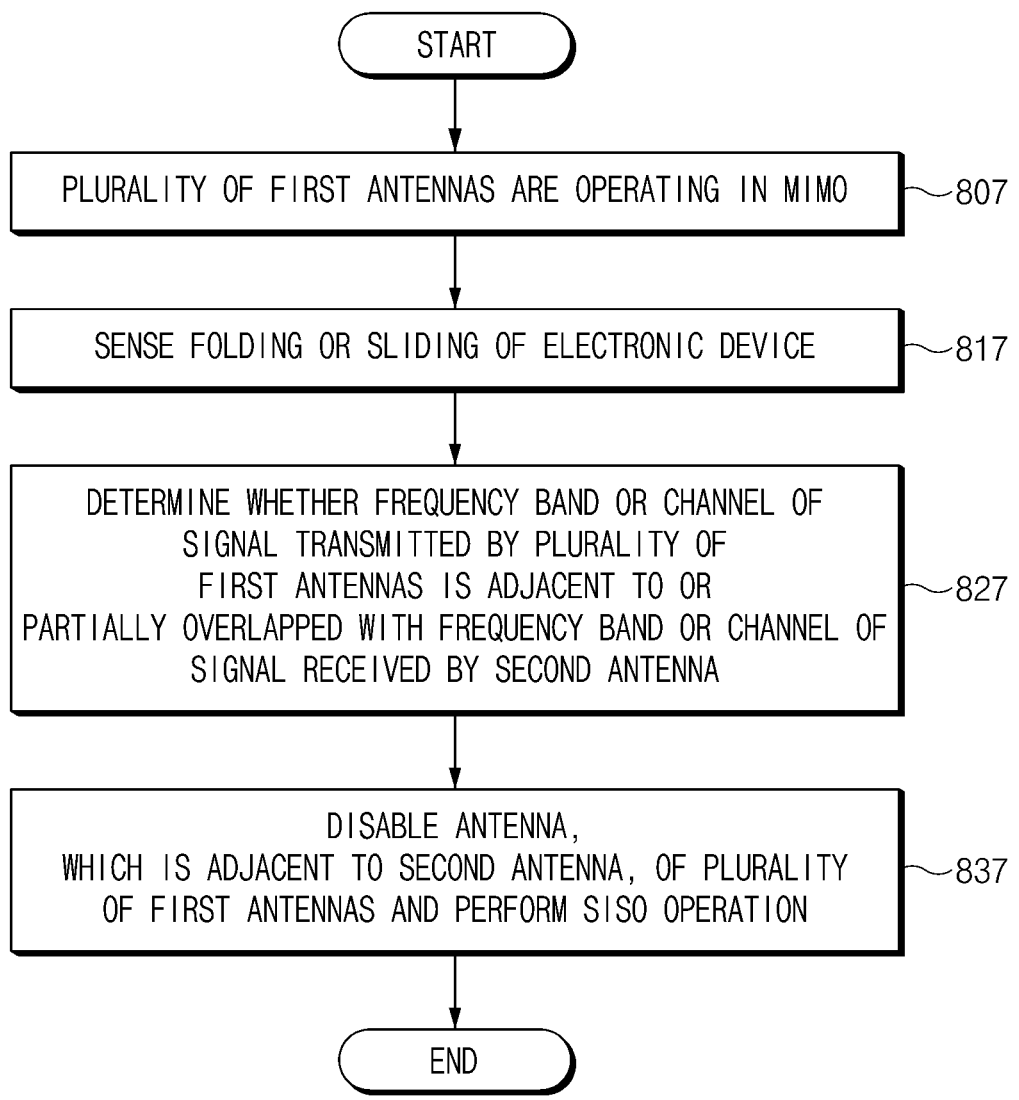
FIG. 8E is a flowchart illustrating a method for operating an antenna by an electronic device according to an embodiment of the disclosure.

FIG. 8E is a flowchart illustrating a method for operating an antenna of an electronic device according to an embodiment of the disclosure.

Referring to FIG. 8E, in operation 807, the processor (e.g., reference numeral 210 of FIG. 2) may determine that the plurality of first antennas 710 and 715 are operating in MIMO. While the plurality of first antennas 710 and 715 are operating in MIMO, the processor 210 may proceed to operation 817.

In operation 817, the processor 210 may sense the folding or the sliding of the electronic device 200 by using the at least one sensor 260. When the electronic device 200 is folded or slid, the processor 210 may proceed to operation 827.

In operation 827, the processor 210 may determine that a frequency band or a channel of a signal transmitted by the plurality of first antennas 710 and 715 is adjacent to or partially overlapped with a frequency band or a channel of a signal received by the second antenna 720. When the frequency band or the channel of the signal transmitted by the plurality of first antennas 710 and 715 is adjacent to or partially overlapped with the frequency band or the channel of the signal received by the second antenna 720, the processor 210 may proceed to operation 837.

In operation 837, the processor 210 may make an antenna, which is more adjacent to the second antenna 720, of the plurality of antennas 710 and 715 disable, and may perform a single input single output (SISO) operation by using another antenna of the plurality of antennas 710 and 715.

Figure 9A:
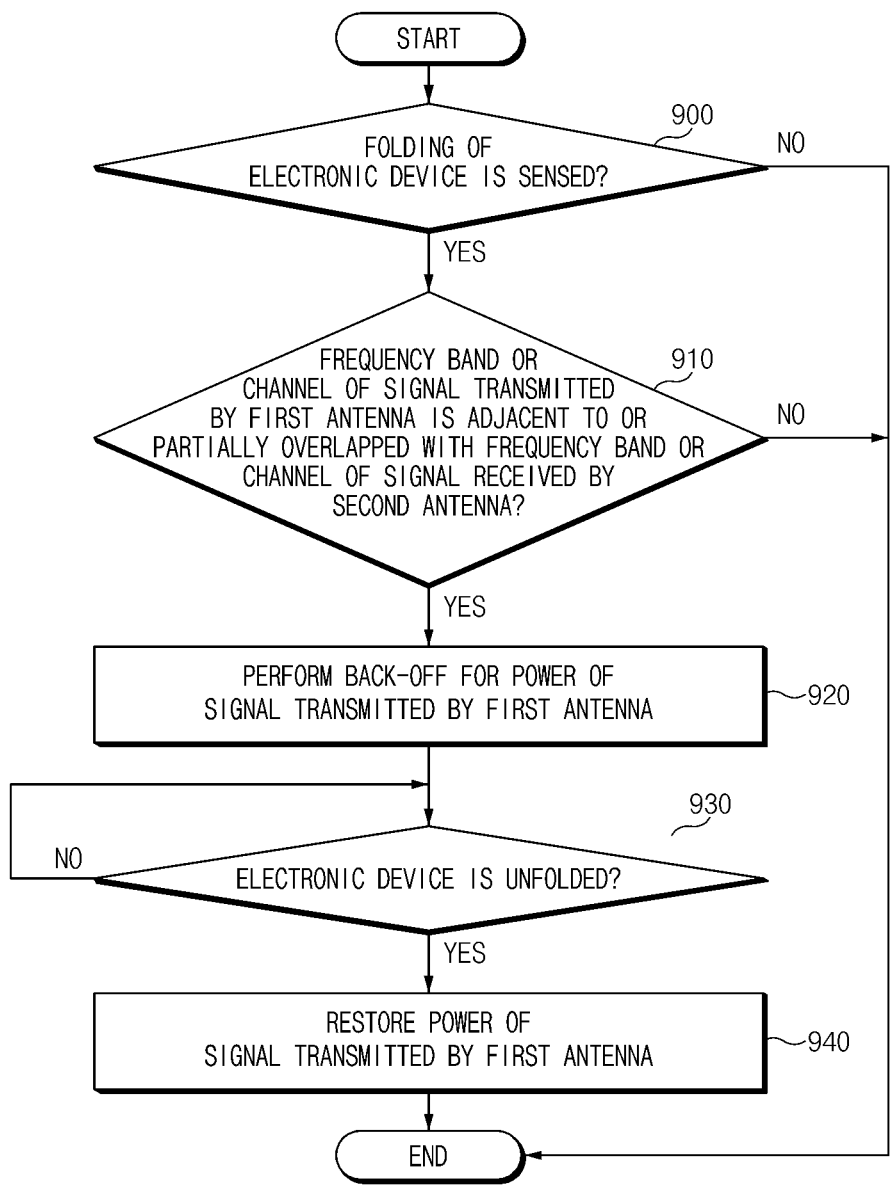
FIGS. 9A and 9B are flowcharts illustrating a method for operating an antenna by an electronic device of FIG. 5 according to various embodiments of the disclosure.
Figure 9B:
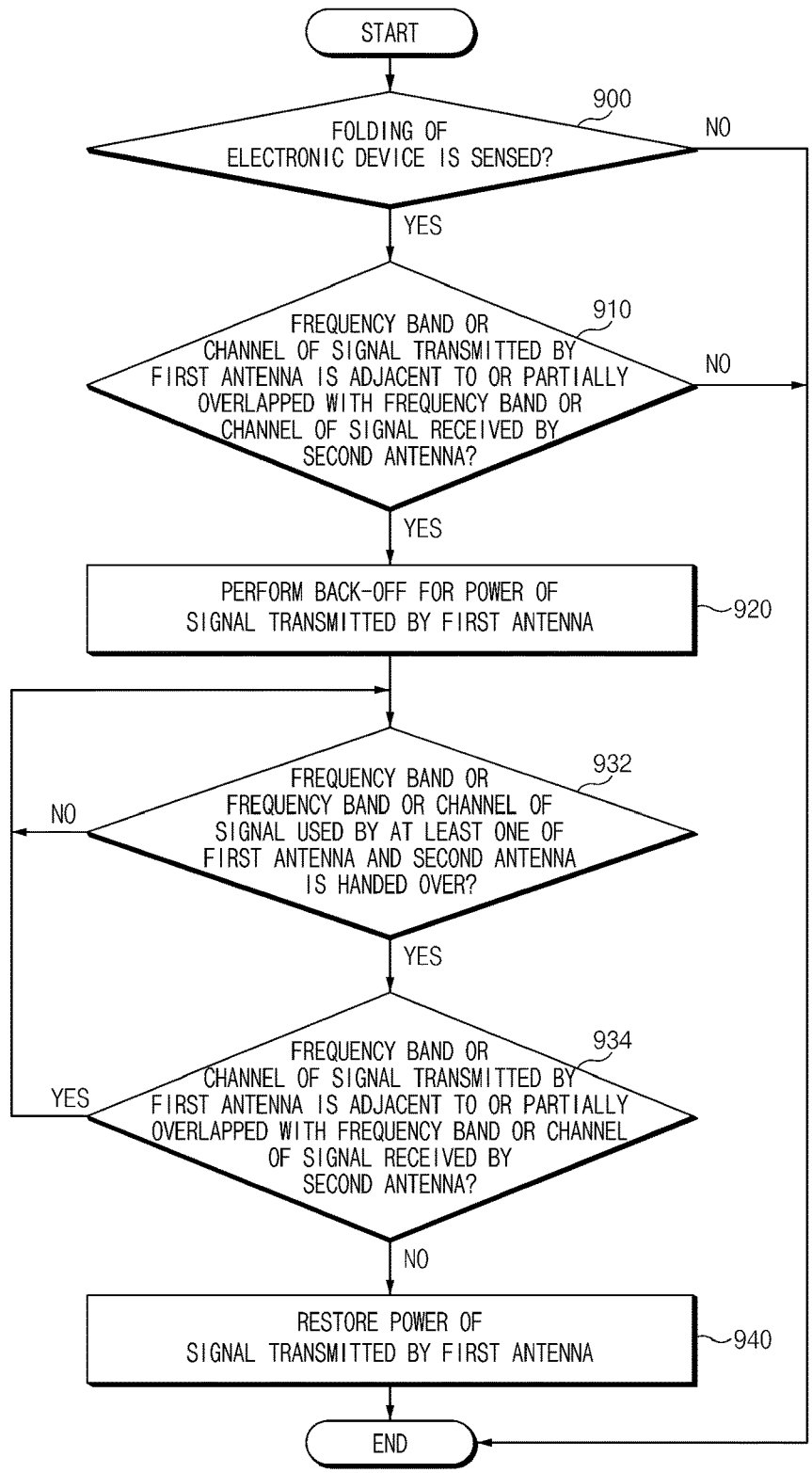

FIGS. 9A and 9B are flowcharts illustrating an operation of an antenna by an electronic device of FIG. 5 according to various embodiments of the disclosure.

Referring to FIG. 9A, in operation 900, the processor 210 may sense the folding status of the electronic device 200 by using the at least one sensor 260. For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 910. When folding is not sensed in operation 900, the processor 210 may terminate the operation.

In operation 910, the processor 210 may determine whether a frequency band or a channel of a signal transmitted by the first antenna 240 is adjacent to or partially overlapped with a frequency band or a channel of a signal received by the second antenna 250. The details thereof will make reference to the description made with reference to FIG. 6. According to an embodiment of the disclosure, when the frequency band or the channel of the signal transmitted by the first antenna 240 is adjacent to or partially overlapped with the frequency band or the channel of the signal received by the second antenna 250, the signal transmitted by the first antenna 240 may exert an influence on signal receiving performance of the second antenna 250. In this case, the processor 210 may proceed to operation 920. In operation 910, when the frequency band or the channel of the signal transmitted by the first antenna 240 is not adjacent to or not partially overlapped with the frequency band or the channel of the signal received by the second antenna 250, the processor 210 may terminate the operation.

In operation 920, the processor 210 may perform power back-off with respect to the transmit signal of the first antenna 240.

In operation 930, the processor 210 may sense the unfolding status of the electronic device 200 by using the at least one sensor 260. When the electronic device 200 is maintained in the folding status ("NO" in operation 930), the processor 210 may return to operation 930 and may perform operation 930. For another example, when the electronic device 200 is maintained in the folding status ("NO" in operation 930), the processor 210 may return to operation 910 and may perform the operations subsequent to operation 910. When the electronic device 200 is unfolded ("YES" in operation 930), the processor 210 may proceed to operation 940.

In operation 940, the processor 210 may restore the power of the transmit signal of the first antenna 240.

The description of a reference numeral of reference numerals in FIG. 9B, which is the same as a reference numeral in FIG. 9A, may be understood by making reference to the description made with respect to FIG. 9A.

Referring to FIG. 9B, in operation 932, the processor 210 may determine whether a frequency band or a channel of a signal used by at least one of the first antenna 240 or the second antenna 250 is handed over.

When the frequency band or the channel of the signal used by at least one of the first antenna 240 or the second antenna 250 is not handed over ("NO" in operation 932), the processor 210 may return to operation 932 and may repeat operation 932.

When the frequency band or the channel of the signal used by at least one of the first antenna 240 or the second antenna 250 is handed over ("YES" in operation 932), the processor 210 may proceed to operation 934. In operation 934, the processor 210 may determine whether a frequency band or a channel of a signal transmitted by the first antenna 240 is adjacent to or partially overlapped with a frequency band or a channel of a signal received by the second antenna 250.

When the frequency band or the channel of the signal transmitted by the first antenna 240 is adjacent to or partially overlapped with the frequency band or the channel of the signal received by the second antenna 250 ("YES" in operation 934), the processor 210 may return to operation 932 and may perform operation 932.

When the frequency band or the channel of the signal transmitted by the first antenna 240 is not adjacent to or not partially overlapped with the frequency band or the channel of the signal received by the second antenna 250 ("NO" in operation 934), the processor 210 may proceed to operation 940.

The operations of the antennas in FIGS. 9A and 9B are provided for the illustrative purpose, and the operations of the first antenna 240 may be performed interchangeably with the operation of the second antenna 250.

Figure 10A:
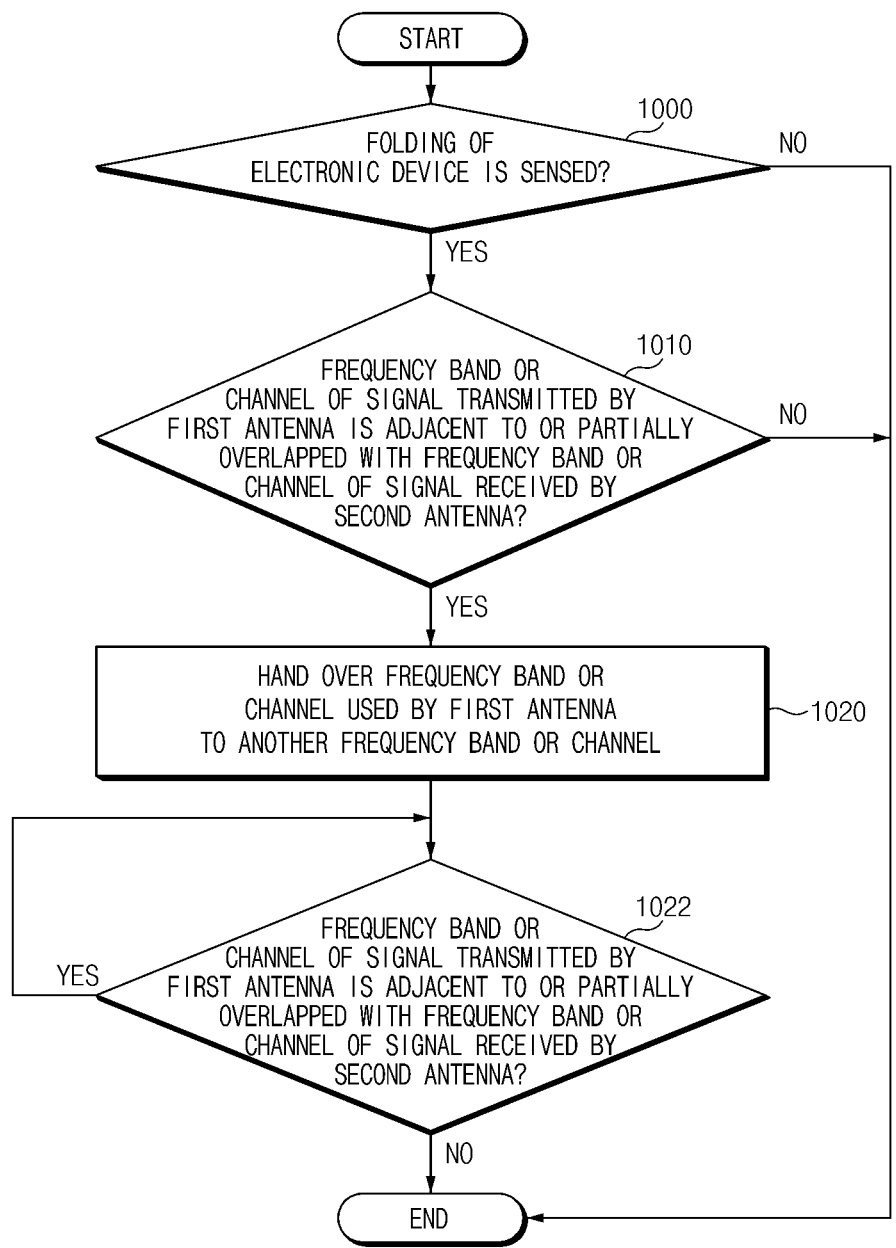
FIGS. 10A, 10B, and 10C are flowcharts illustrating a method for operating an antenna by an electronic device of FIG. 5 according to various embodiments of the disclosure.
Figure 10B:
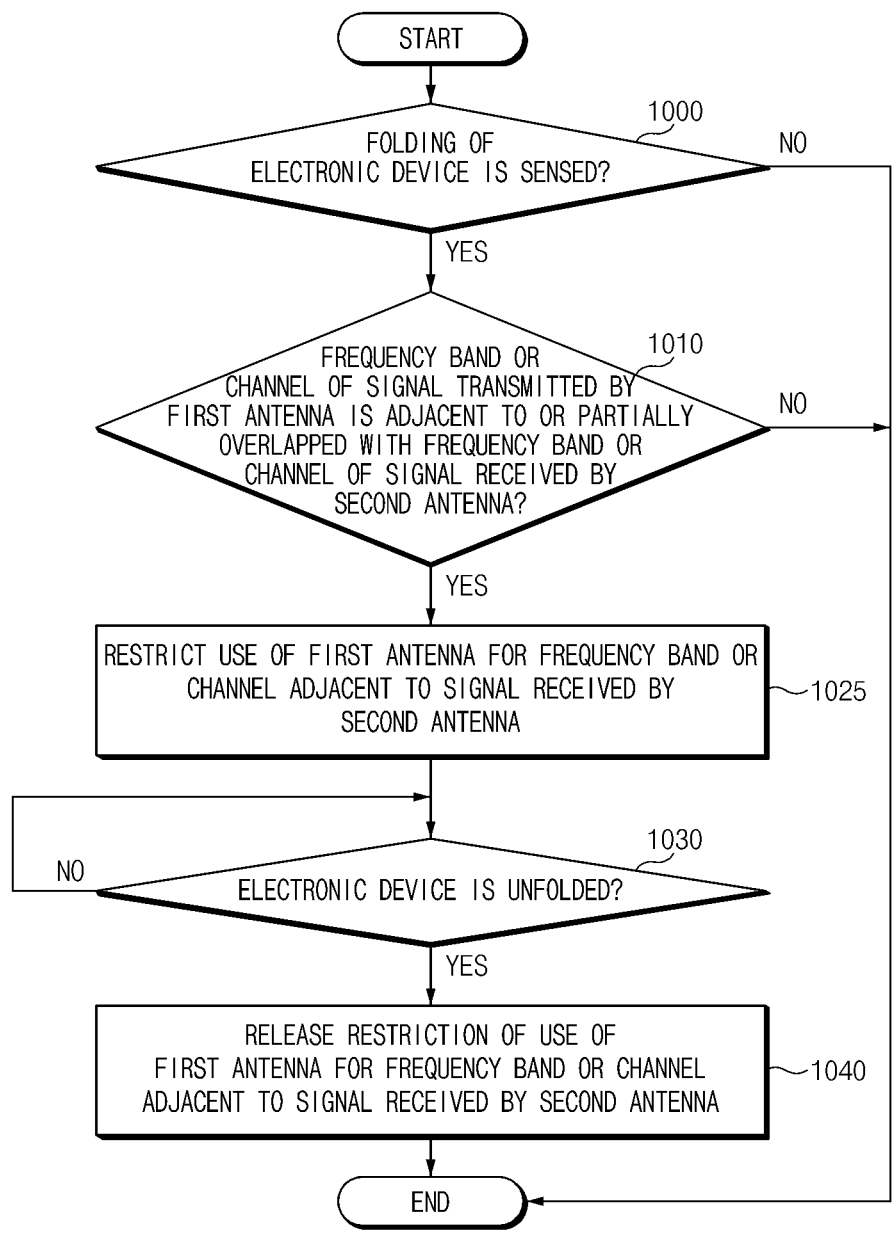
Figure 10C:
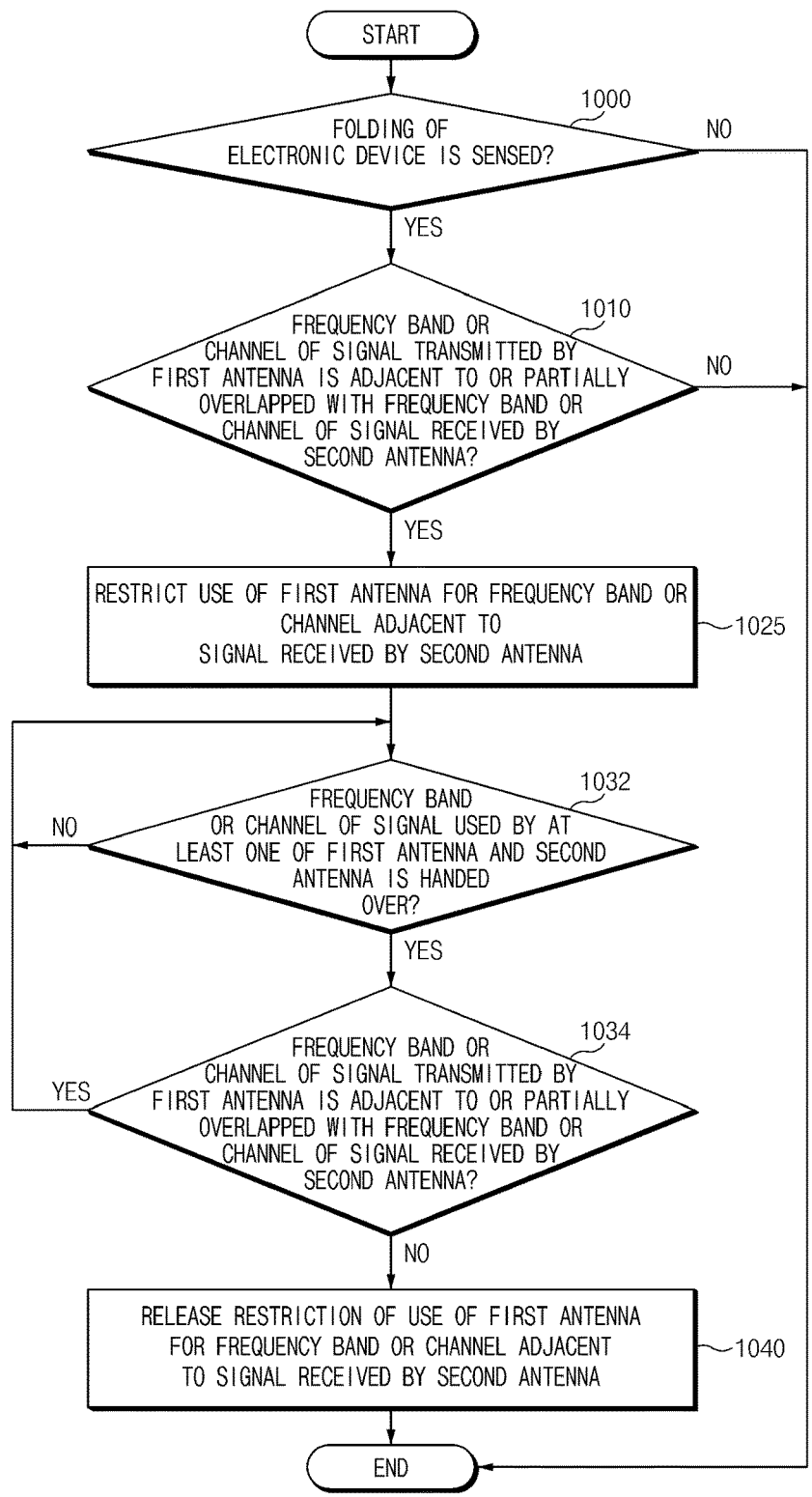

FIGS. 10A, 10B, and 10C are flowcharts illustrating a method for operating an antenna by an electronic device of FIG. 5 according to various embodiments of the disclosure.

Referring to FIG. 10A, in operation 1000, the processor 210 may sense the folding status of the electronic device 200 by using the at least one sensor 260. For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 1010. When folding is not sensed in operation 1000, the processor 210 may terminate the operation.

In operation 1010, the processor 210 may determine whether a frequency band or a channel of a signal transmitted by the first antenna 240 is adjacent to or partially overlapped with a frequency band or a channel of a signal received by the second antenna 250. The details thereof will make reference to the description made with reference to FIG. 6. According to an embodiment of the disclosure, when the frequency band or the channel of the signal transmitted by the first antenna 240 is adjacent to or partially overlapped with the frequency band or the channel of the signal received by the second antenna 250, the signal transmitted by the first antenna 240 may exert an influence on signal receiving performance of the second antenna 250. In this case, the processor 210 may proceed to operation 1020. In operation 1010, when the frequency band or the channel of the signal transmitted by the first antenna 240 is not adjacent to or not partially overlapped with the frequency band or the channel of the signal received by the second antenna 250, the processor 210 may terminate the operation.

In operation 1020, according to an embodiment of the disclosure, the processor 210 may hand over a frequency band or a channel used by the first antenna 240 to another frequency band or another channel.

In operation 1022, the processor 210 may determine whether a frequency band or a channel of a signal transmitted by the first antenna 240 is adjacent to or partially overlapped with a frequency band or a channel of a signal received by the second antenna 250.

When the frequency band or the channel of the signal transmitted by the first antenna 240 is adjacent to or partially overlapped with the frequency band or the channel of the signal received by the second antenna 250 ("YES" in operation 1022), the processor 210 may return to operation 1022 and may perform operation 1022.

When the frequency band or the channel of the signal transmitted by the first antenna 240 is not adjacent to or not partially overlapped with the frequency band or the channel of the signal received by the second antenna 250 in the frequency band or the channel ("NO" in operation 1022), the processor 210 may terminate the operation.

The description of a reference numeral of reference numerals in FIG. 10B, which is the same as a reference numeral in FIG. 10A, may be understood by making reference to the description made with respect to FIG. 10A.

Referring to FIG. 10B, in operation 1025, the processor 210 may restrict the use of the first antenna 240 for the frequency band or the channel adjacent to the frequency band or the channel of the signal received by the second antenna 250.

In operation 1030, the processor 210 may sense the unfolding status of the electronic device 200 by using the at least one sensor 260. When the electronic device 200 is maintained in the folding status ("NO" in operation 1030), the processor 210 may return to operation 1030 and may perform operation 1030. For another example, when the electronic device 200 is maintained in the folding status ("NO" in operation 1030), the processor 210 may return to the operation 1010 and may perform the operations subsequent to operation 1010. When the electronic device 200 is unfolded ("YES" in operation 1030), the processor 210 may proceed to operation 1040.

In operation 1040, the processor 210 may release the restriction of the use of the first antenna 240 for the frequency band or the channel adjacent to the frequency band or the channel of the signal received by the second antenna 250.

The description of a reference numeral of reference numerals in FIG. 10C, which is the same as a reference numeral in FIGS. 10A and 10B, may be understood by making reference to the description made with respect to FIGS. 10A and 10B.

Referring to FIG. 10C, in operation 1032, the processor 210 may determine whether a frequency band or a channel of a signal used by at least one of the first antenna 240 or the second antenna 250 is handed over.

When the frequency band or the channel of the signal used by at least one of the first antenna 240 or the second antenna 250 is not handed over ("NO" in operation 1032), the processor 210 may return to operation 1032 and may repeat operation 1032.

When the frequency band or the channel of the signal used by at least one of the first antenna 240 or the second antenna 250 is handed over ("YES" in operation 1032), the processor 210 may proceed to operation 1034. In operation 1034, the processor 210 may determine whether a frequency band or a channel of a signal transmitted by the first antenna 240 is adjacent to or partially overlapped with a frequency band or a channel of a signal received by the second antenna 250.

When the frequency band or the channel of the signal transmitted by the first antenna 240 is adjacent to or partially overlapped with the frequency band or the channel of the signal received by the second antenna 250 ("YES" in operation 1034), the processor 210 may return to operation 1032 and may perform operation 1032.

When the frequency band or the channel of the signal transmitted by the first antenna 240 is not adjacent to or not partially overlapped with the frequency band or the channel of the signal received by the second antenna 250 ("NO" in operation 1034), the processor 210 may proceed to operation 1040.

The operations of the antennas in FIGS. 10A to 10C are provided for the illustrative purpose, and the operation of the first antenna 240 may be performed interchangeably with the operation of the second antenna 250.

Figure 11:
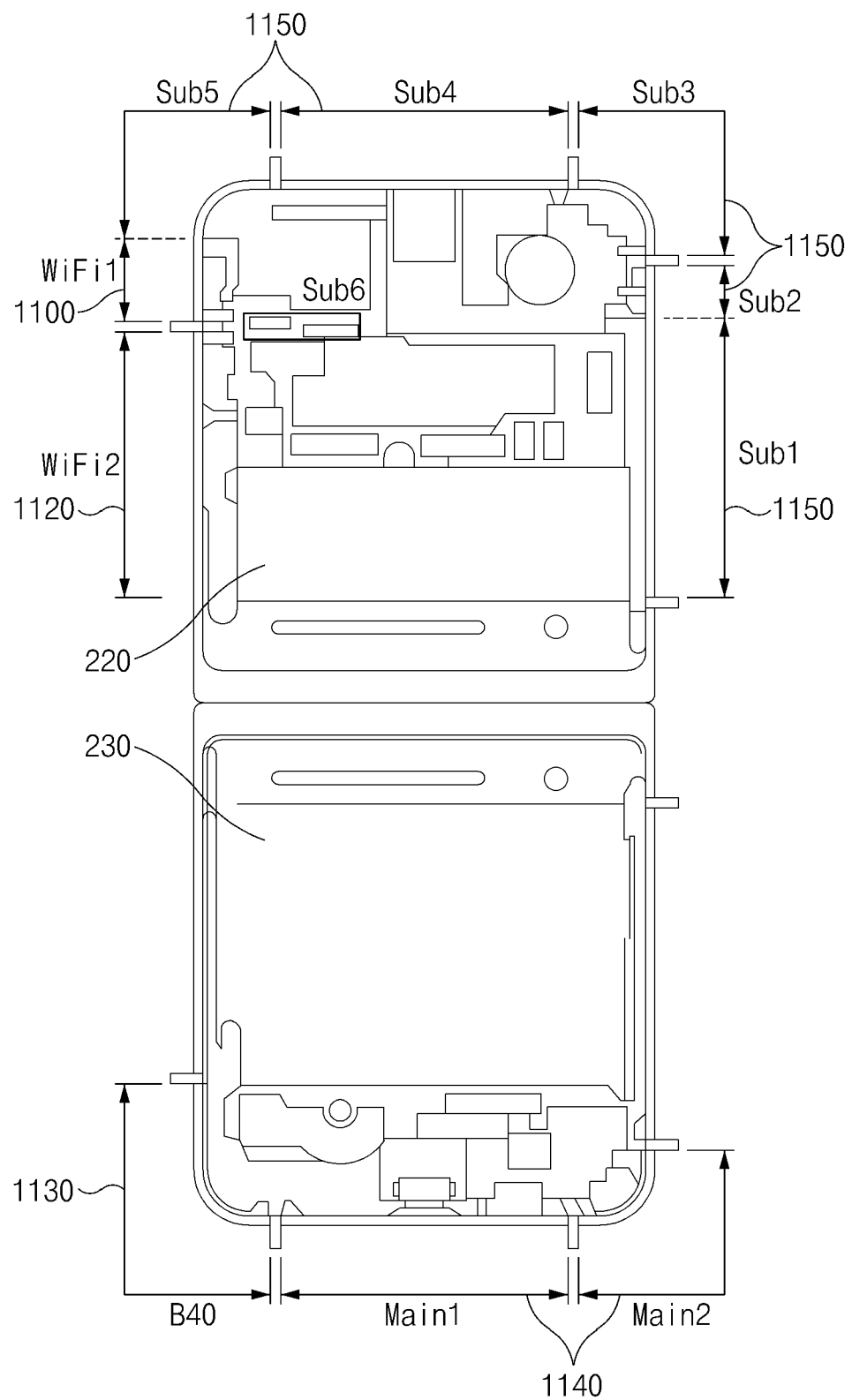
FIG. 11 illustrates an antenna design of an electronic device illustrated in FIGS. 5 to 10C according to an embodiment of the disclosure.

FIG. 11 illustrates an antenna design of an electronic device of FIG. 5 to FIG. 10C according to an embodiment of the disclosure.

Referring to FIG. 11, an electronic device (e.g., the electronic device 200 of FIG. 2) may include a first WiFi antenna 1100, a second WiFi antenna 1120, a B40 band antenna 1130, a plurality of sub-antennas 1150, and/or a plurality of main antennas 1140. According to an embodiment of the disclosure, the first WiFi antenna 1100, the second WiFi antenna 1120, and/or the plurality of sub-antennas 1150 may be disposed on the first housing 220 (e.g., the first housing 220 of FIG. 2) of the electronic device 200, and the B40 band antenna 1130 and/or the plurality of main antennas 1140 may be disposed on the second housing 230 (e.g., the second housing 230 of FIG. 2) of the electronic device 200.

According to an embodiment of the disclosure, the first WiFi antenna 1100, the second WiFi antenna 1120, the B40 band antenna 1130, the plurality of sub-antennas 1150, and/or the plurality of main antennas 1140 may include a conductive portion included in the side surface of the first housing 220 or the side surface of the second housing 230, or may include a conductive pattern disposed inside the first housing 220 or the second housing 230.

According to an embodiment of the disclosure, the processor (e.g., the processor 210 of FIG. 2) may support WiFi communication by using the first WiFi antenna 1100 and/or the second WiFi antenna 1120. For example, the first WiFi antenna 1100 and/or the second WiFi antenna 1120 may be understood as the plurality of first antennas 710 and 715 of FIG. 7 or the first antenna 240 of FIG. 5. According to an embodiment of the disclosure, the processor 210 may support cellular communication by using the B40 band antenna 1130. For example, the B40 band antenna 1130 may be understood as the second antenna 720 of FIG. 7 or the second antenna 250 of FIG. 5.

According to an embodiment of the disclosure, the processor 210 may perform cellular communication by using the plurality of main antennas 1140. For example, the plurality of main antennas 1140 may use a frequency band different from a frequency band of the B40 band antenna 1130. According to an embodiment of the disclosure, although the plurality of main antennas 1140 are designed as including a metal portion of the second housing 230 in FIG. 11, the plurality of main antennas 1140 may be designed as including an LDS pattern disposed inside the second housing 230, which is different from that in accompanying drawings. According to an embodiment of the disclosure, the processor 210 may support various communication protocols (e.g., a ultra-wide band (UWB) communication protocol or a Bluetooth communication protocol) by using the plurality of sub-antennas 1150. According to an embodiment of the disclosure, the plurality of sub-antennas 1150 may include a conductive portion included in the first housing 220 or the second housing 230 and/or a conductive pattern disposed inside the first housing 220 or the second housing 230, and may be designed in various forms.

According to an embodiment of the disclosure, the processor 210 may perform WiFi communication by using at least one of the plurality of sub-antennas 1150, instead of the second WiFi antenna 1120. For example, the processor 210 may perform a MIMO operation by using at least one of the first WiFi antenna 1100 or the plurality of sub-antennas 1150. The first WiFi antenna 1100 and at least one of the plurality of sub-antennas 1150 performing the MIMO operation may be controlled according to the embodiment of FIG. 8A.

According to an embodiment of the disclosure, although the description of the antenna structure is provided for the illustrative purpose, the embodiment of the disclosure is not limited thereto. For example, when the form of the electronic device 200 is changed, when the distance between antennas is changed, and when the transmit signal by the antenna deteriorates the signal receiving performance of another antenna, the operation of the antenna illustrated in FIGS. 5 to 10C may be applied.

Figure 12:
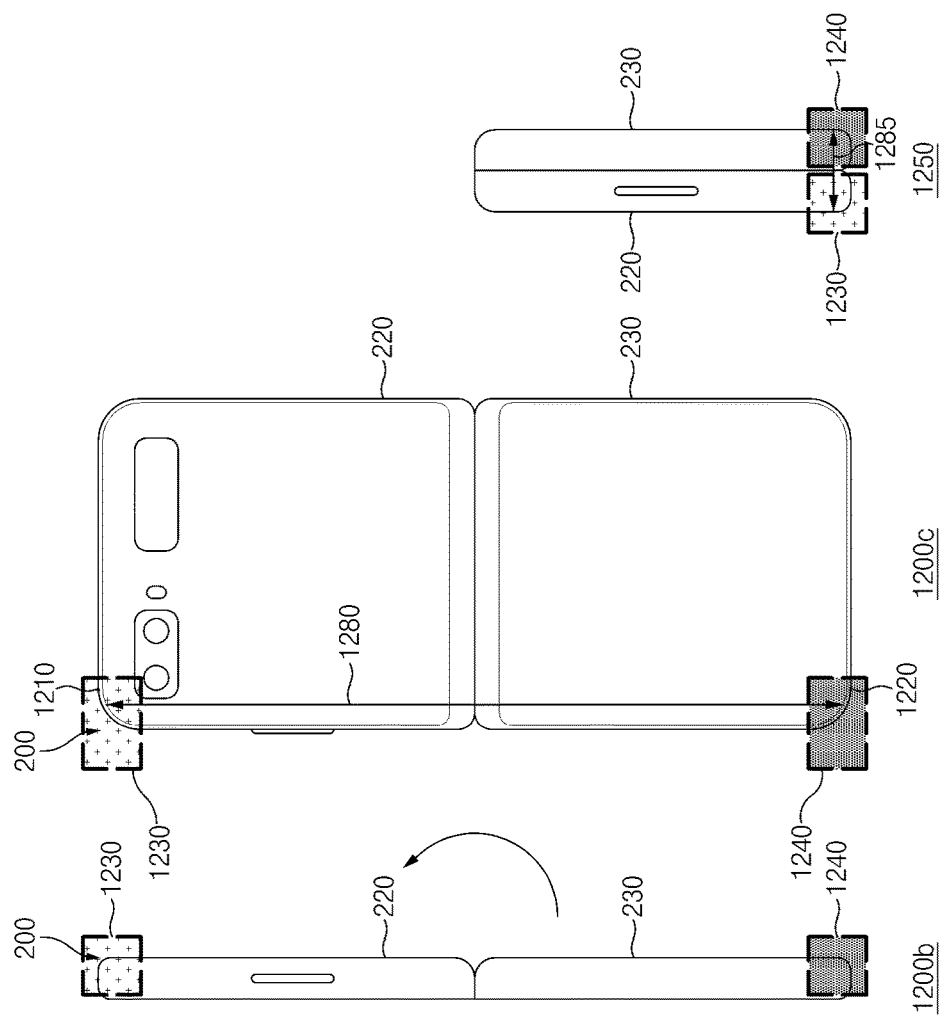
FIG. 12 illustrates an operating method of an electronic device to perform a MIMO operation according to an embodiment of the disclosure.
Figure 12:
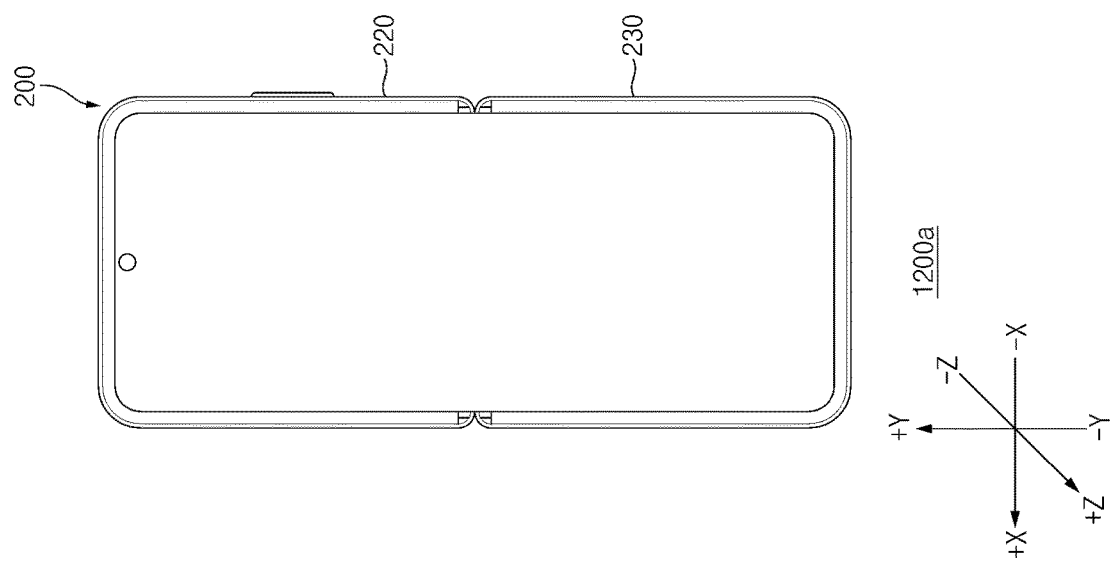

FIG. 12 illustrates an operation method of an electronic device to perform a MIMO operation according to an embodiment of the disclosure.

Referring to FIG. 12, when the electronic device 200 (e.g., the electronic device 200 of FIG. 2) is in the unfolding status, reference numeral 1200a illustrates the front surface of the electronic device 200. Reference numeral 1200b illustrates the electronic device 200, when the electronic device 200 in reference numeral 1200a is viewed in an −X axis direction, and reference numeral 1200c illustrates the electronic device 200, when the electronic device 200 in reference numeral 1200a is viewed from the −Z axis direction. Reference numeral 1250 illustrates the electronic device 200 which is in the folding status and viewed in the −X axis direction, when the electronic device 200 in reference numeral 1200a is in the folding status.

According to an embodiment of the disclosure, a first antenna 1210 (e.g., the first antenna 240 of FIG. 2) may be disposed at an edge (e.g., an upper end) of the first housing 220 (e.g., the first housing 220 of FIG. 2) positioned in the +Y axis direction, and a second antenna 1220 (e.g., the second antenna 250 of FIG. 2) may be disposed at an edge of the second housing 230 (e.g., the second housing 230 of FIG. 2) positioned in the —Y axis direction. For example, the first antenna 1210 may be disposed in at least a portion of a first area 1230. For example, the second antenna 1220 may be disposed in at least a portion of a second area 1240. Although FIG. 12 illustrates an embodiment in which the first antenna 1210 and/or the second antenna 1220 include a metal portion of the first housing 220 and the second housing 230, a plurality of first antennas 1210 and/or the second antenna 1220 may include a conductive pattern (e.g., laser direct structuring (LDS)) formed on a PCB or an antenna carrier inside the housing according to other embodiments.

According to an embodiment of the disclosure, the first antenna 1210 may transmit and receive a signal in a WiFi 2.4G band (e.g., reference numeral 620 in FIG. 6). According to an embodiment of the disclosure, the second antenna 1220 may transmit and receive a signal in the same frequency band as that of the first antenna 1210. According to an embodiment of the disclosure, the processor (e.g., the processor 210 of FIG. 2) may perform a multiple input multiple output (MIMO) operation by using the first antenna 1210 and the second antenna 1220.

According to an embodiment of the disclosure, when the electronic device 200 (e.g., reference numerals 1200a, 1200b, and 1200c) is in the unfolding status, the first antenna 1210 and the second antenna 1220 may be spaced apart from each other by a first distance 1280. For example, the first distance 1280 may be understood as a distance allowing the processor 210 to stably receive a signal through the second antenna 1220. For example, when the first antenna 1210 and the second antenna 1220 are spaced apart from each other by the first distance 1280, the interference between a signal transmitted by the first antenna 1210 and a signal received by the second antenna 1220 may be reduced. According to an embodiment of the disclosure, the first antenna 1210 and the second antenna 1220 may use adjacent channels within the same frequency band.

According to an embodiment of the disclosure, when the electronic device 200 is in the folding status, the first antenna 1210 and the second antenna 1220 may be spaced apart from each other by a second distance 1285. The second distance 1285, which is provided for the illustrative purpose, may be formed to be shorter or longer depending on the positions of the first antenna 1210 and the second antenna 1220. For another example, the second distance 1285 may be a distance to cause the interference between a signal transmitted by one of the first antenna 1210 and the second antenna 1220 and a signal received by a remaining one of the first antenna 1210 and the second antenna 1220. The first area 1230 of the first housing 220 and the second area 1240 of the second housing 230 are adjacent to each other in the folding status (see reference numeral 1250) or the distance between the first area 1230 and the second area 1240 in the folding status is shorter than the distance between the first area 1230 and the second area 1240 in the unfolding status. Accordingly, when the electronic device 200 is in the folding status (see reference number 1250), the first antenna 1210 may be disposed adjacent to the second antenna 1220. According to an embodiment of the disclosure, when the first antenna 1210 and the second antenna 1220 use adjacent channels within the same frequency band in the folding state (see reference numeral 1250), signal receiving performance of the first antenna 1210 and/or the second antenna 1220 may be deteriorated.

According to an embodiment of the disclosure, for example, when the electronic device 200 is in the folding status (see reference numeral 1250) and when the signal receiving performance of the first antenna 1210 or the second antenna 1220 is deteriorated, the processor 210 may operate only an antenna, which represents more excellent performance, of the first antenna 1210 or the second antenna 1220 and may make another antenna of the first antenna 1210 or the second antenna 1220 disable. For example, the processor 210 may compare a signal received by the first antenna 1210 with a signal received by the second antenna 1220 in terms of received signal strength indicator (RSSI) value and may make an antenna (e.g., the second antenna 1220), which represents a lower RSSI value, disable. The processor 210 may perform a single input single output (SISO) operation by using the another antenna (e.g., the first antenna 1210).

Figure 13A:
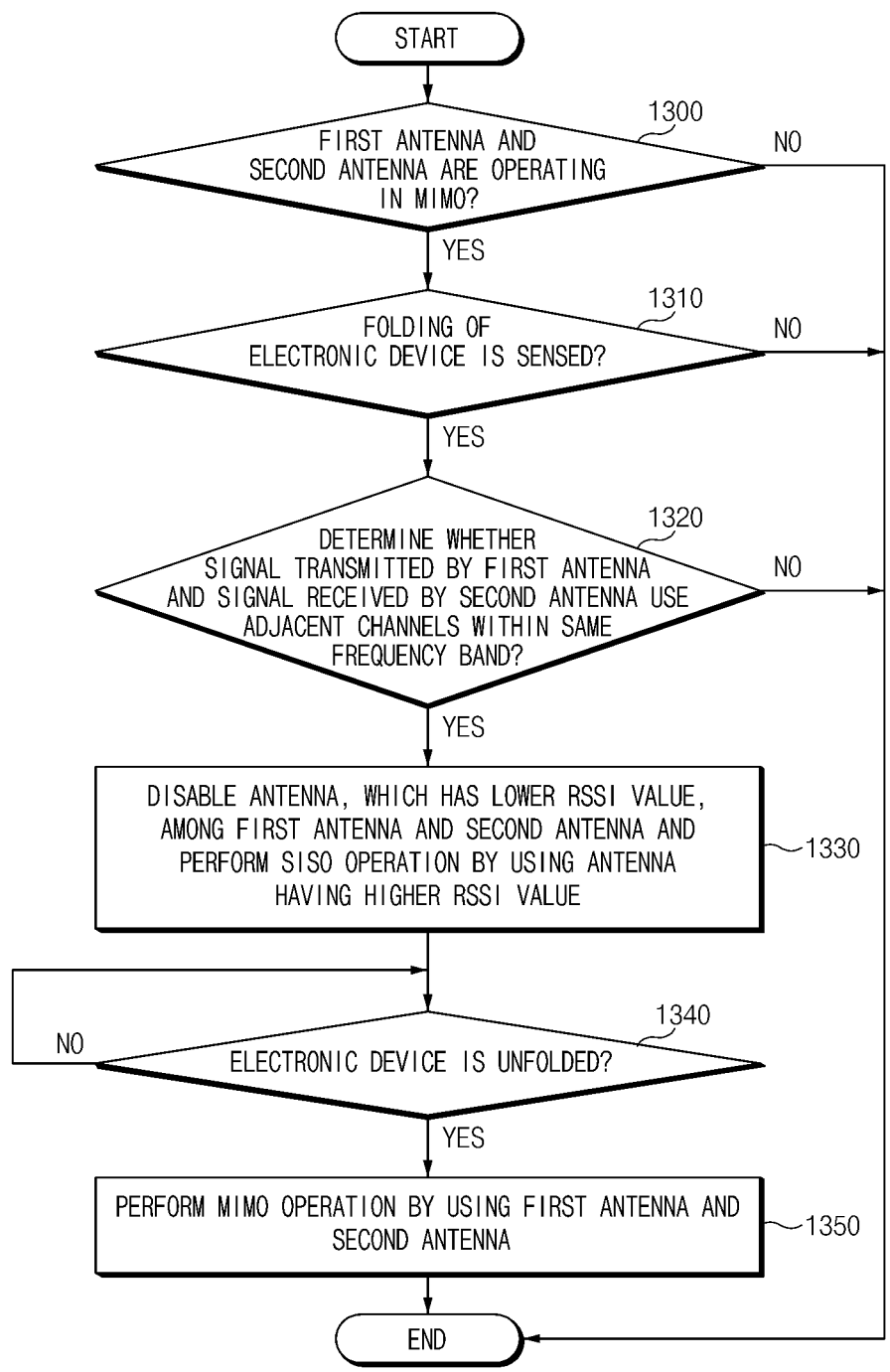
FIGS. 13A and 13B are flowcharts illustrating a method for operating an antenna by an electronic device of FIG. 12 according to various embodiments of the disclosure.
Figure 13B:
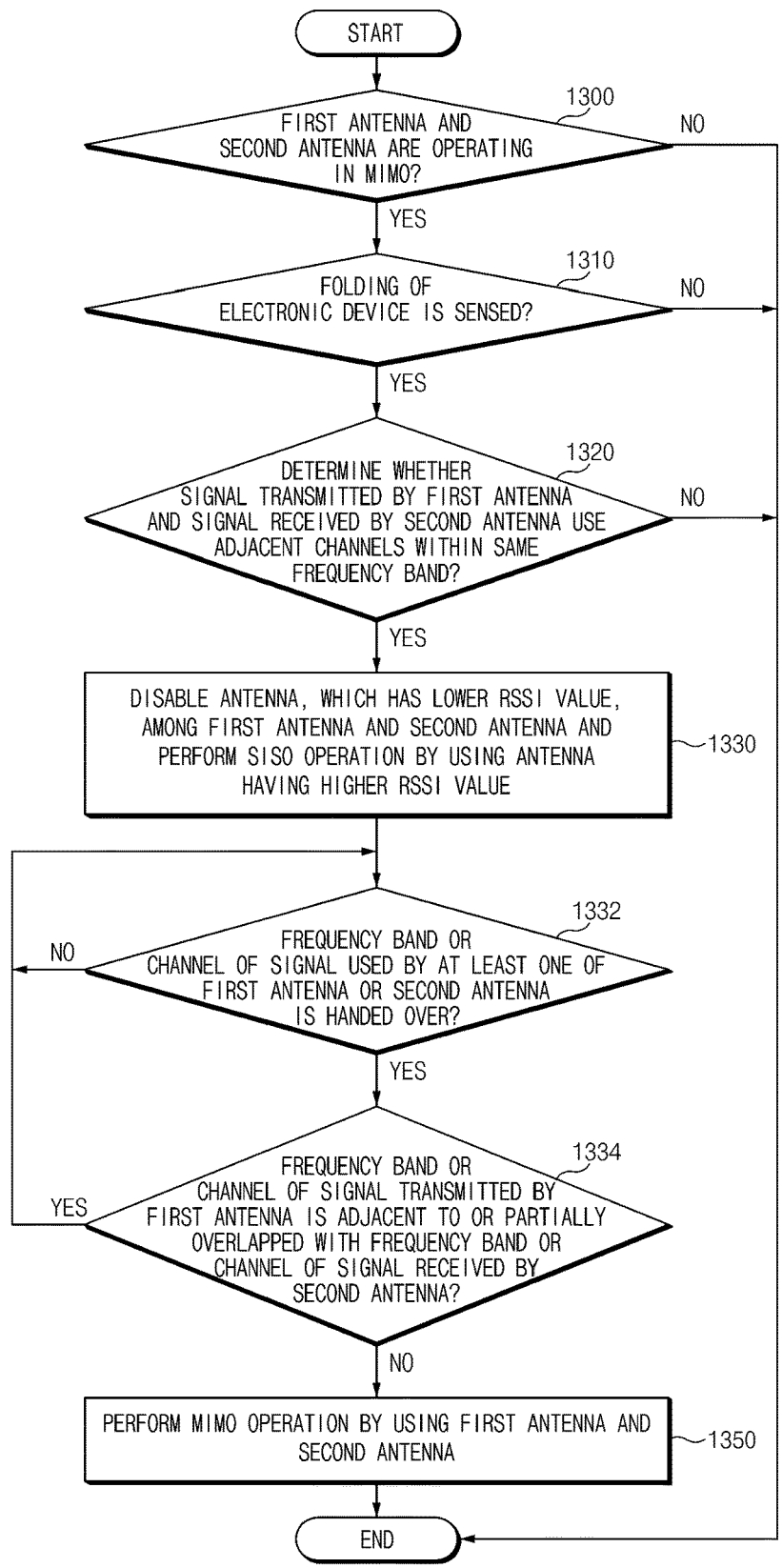

FIGS. 13A and 13B are flowcharts illustrating a method for operating an antenna by an electronic device illustrated in FIG. 12 according to various embodiments of the disclosure.

Referring to FIG. 13A, in operation 1300, a processor (e.g., the processor 210 of FIG. 2) may determine whether a first antenna (e.g., the first antenna 1210 of FIG. 12) and a second antenna (e.g., the second antenna 1220 of FIG. 12) are operating in MIMO. When the first antenna 1210 and the second antenna 1220 are operating in MIMO, the processor 210 may proceed to operation 1310.

In operation 1310, the processor 210 may sense the folding status of the electronic device 200 (e.g., the electronic device 200 of FIG. 2) by using at least one sensor (e.g., at least one sensor 260 of FIG. 2). For example, the processor 210 may sense the change in the intensity of a magnetic field, which results from the change in the relative positions of the first housing (e.g., the first housing 220 of FIG. 2) and the second housing (e.g., the second housing 230 of FIG. 2), by using the at least one sensor 260 (e.g., a hall sensor). When the electronic device 200 is folded, the processor 210 may proceed to operation 1320.

In operation 1320, the processor 210 may determine whether the first antenna 1210 and the second antenna 1220 transmit and receive signals by using adjacent channels within the same frequency band. According to an embodiment of the disclosure, when the first antenna 1210 and the second antenna 1220 transmit and receive signals using adjacent channels within the same frequency band, the transmit signal of the first antenna 1210 may exert an influence on receiving a signal by the second antenna 1220. To the contrary, the transmit signal of the second antenna 1220 may exert an influence on receiving a signal by the first antenna 1210. In this case, the processor 210 may proceed to operation 1330.

In operation 1330, the processor 210 may operate only an antenna (e.g., the first antenna 1210), which represents more excellent performance, of the first antenna 1210 or the second antenna 1220. For example, the processor 210 may compare a signal received by the first antenna 1210 with a signal received by the second antenna 1220 in terms of a received signal strength indicator (RSSI) value. According to an embodiment of the disclosure, the processor 210 may make an antenna (e.g., the second antenna 1220), which has a lower RSSI value, disable. The processor 210 may perform a single input single output (SISO) operation by using an antenna (e.g., an antenna having a higher RSSI value; the first antenna 1210) representing more excellent performance.

In operation 1340, according to an embodiment of the disclosure, the processor 210 may sense the unfolding status of the electronic device 200 by using the at least one sensor 260. When the electronic device 200 is maintained in the folding status ("NO" in operation 1340), the processor 210 may return to operation 1340 and may perform operation 1340. When the electronic device 200 is unfolded ("YES" in operation 1340), the processor 210 may proceed to operation 1350. For another example, when the electronic device 200 is maintained in the folding status ("NO" in operation 1340), the processor 210 may return to the operation 1320 and may perform the following operations from operation 1320.

In operation 1350, the processor 210 may perform the MIMO operation again by using the first antenna 1210 and the second antenna 1220.

The description of a reference numeral of reference numerals in FIG. 13B, which is the same as a reference numeral in FIG. 13A, may be understood by making reference to the description made with respect to FIG. 13A.

Referring to FIG. 13B, in operation 1332, the processor 210 may determine whether a frequency band or a channel of a signal used by at least one of the first antenna 1210 or the second antenna 1220 is handed over.

When the frequency band or the channel of the signal used by at least one of the first antenna 1210 or the second antenna 1220 is not handed over ("NO" in operation 1332), the processor 210 may return to operation 1332 and may repeat operation 1332.

When the frequency band or the channel of the signal used by at least one of the first antenna 240 or the second antenna 250 is handed over ("YES" in operation 1332), the processor 210 may proceed to operation 1334. In operation 1334, the processor 210 may determine whether a frequency band or a channel of a signal transmitted by the first antenna 1210 is adjacent to or partially overlapped with a frequency band or a channel of a signal received by the second antenna 1220.

When the frequency band or the channel of the signal transmitted by the first antenna 1210 is adjacent to or partially overlapped with the frequency band or the channel of the signal received by the second antenna 1220 ("YES" in operation 1334), the processor 210 may return to operation 1332 and may perform operation 1332.

When the frequency band or the channel of the signal transmitted by the first antenna 1210 is not adjacent to or not partially overlapped with the frequency band or the channel of the signal received by the second antenna 1220 ("NO" in operation 1334), the processor 210 may proceed to operation 1350.

The operations of the antennas in FIGS. 13A and 13B are provided for the illustrative purpose, and the operations of the first antenna 1210 may be performed interchangeably with the operation of the second antenna 1220.

Figure 14:
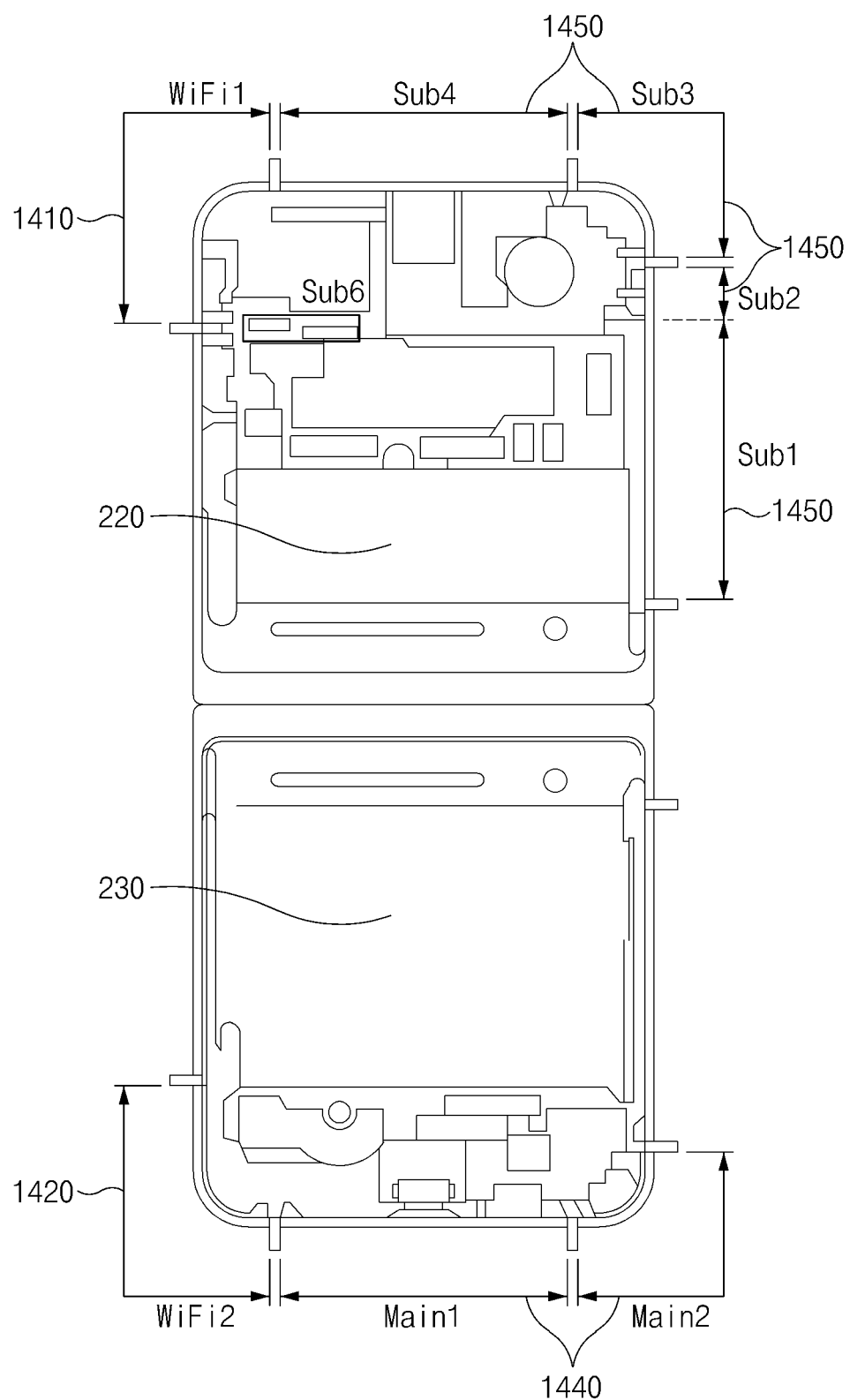
FIG. 14 illustrates an antenna design of an electronic device illustrated in FIGS. 12, 13A, and 13B according to an embodiment of the disclosure.

FIG. 14 illustrates an antenna design of an electronic device illustrated in FIGS. 12, 13A, and 13B according to an embodiment of the disclosure.

Referring to FIG. 14, the description of a reference numeral of reference numerals in FIG. 14, which corresponds to a reference numeral in FIG. 11, may be understood by making reference to the description made with respect to FIG. 11. The following description will be made with reference to FIG. 14 while focusing on the difference between FIG. 14 and FIG. 11.

According to an embodiment of the disclosure, an electronic device (e.g., the electronic device 200 of FIG. 2) may include a first WiFi antenna 1410 (e.g., the first antenna 1210 of FIG. 12), a second WiFi antenna 1420 (e.g., the second antenna 1220 of FIG. 12), a plurality of sub-antennas 1450 (e.g., the plurality of sub-antennas 1150 of FIG. 11), and/or a plurality of main antennas 1440 (e.g., the plurality of main antennas 1140 of FIG. 11). According to an embodiment of the disclosure, the first WiFi antenna 1410 and/or a plurality of sub-antennas 1450 may be disposed in the first housing (e.g., the first housing 220 of FIG. 2) of the electronic device 200, and the second WiFi antenna 1420 and/or the plurality of main antennas 1440 may be disposed in the second housing (e.g., the second housing 230 of FIG. 2) of the electronic device 200.

According to an embodiment of the disclosure, the processor (e.g., the processor 210 of FIG. 2) may support WiFi communication by using the first WiFi antenna 1410 and/or the second WiFi antenna 1420. According to an embodiment of the disclosure, the processor 210 may perform the MIMO operation by using the first WiFi antenna 1410 and the second WiFi antenna 1420. According to an embodiment of the disclosure, the first WiFi antenna 1410 and the second WiFi antenna 1420 may use adjacent channels within the same frequency band.

Figure 15A:
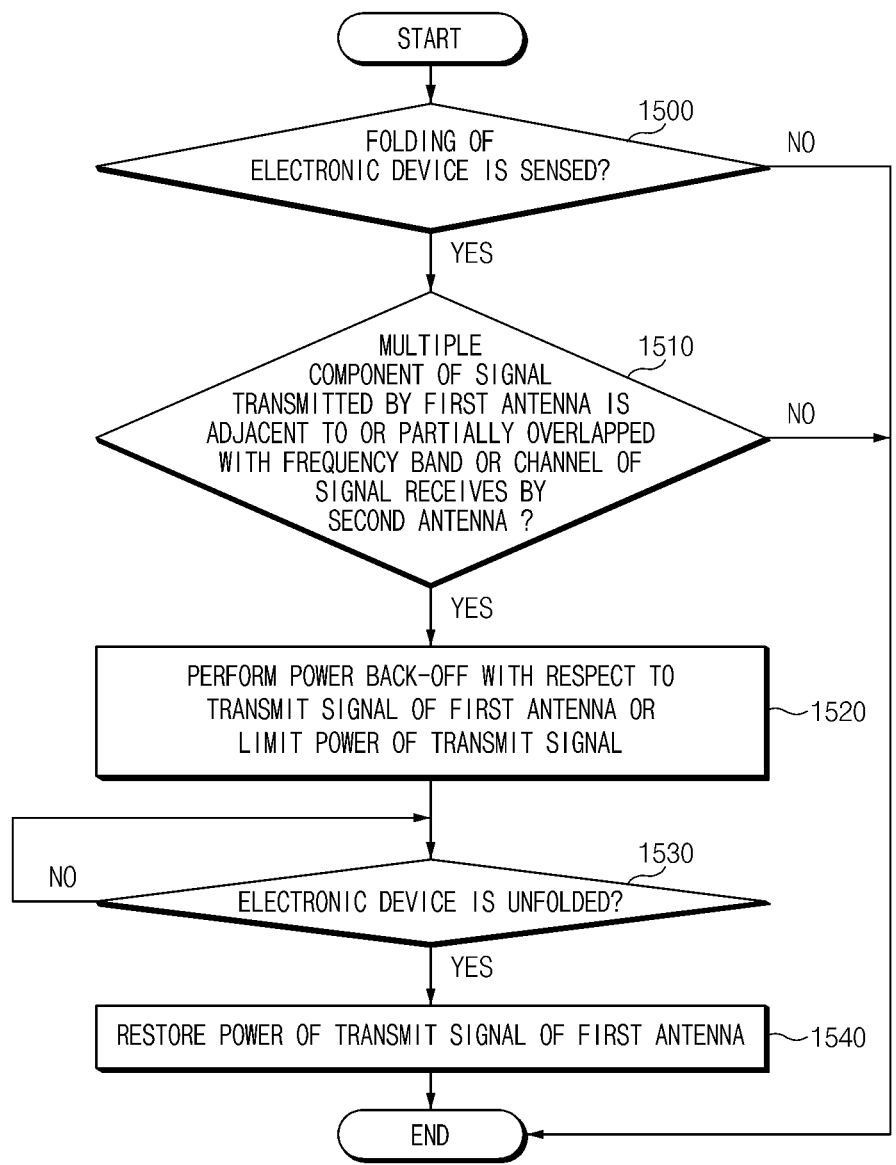
FIGS. 15A and 15B are flowcharts illustrating a method for operating an antenna by an electronic device of FIG. 5 according to various embodiments of the disclosure.
Figure 15B:
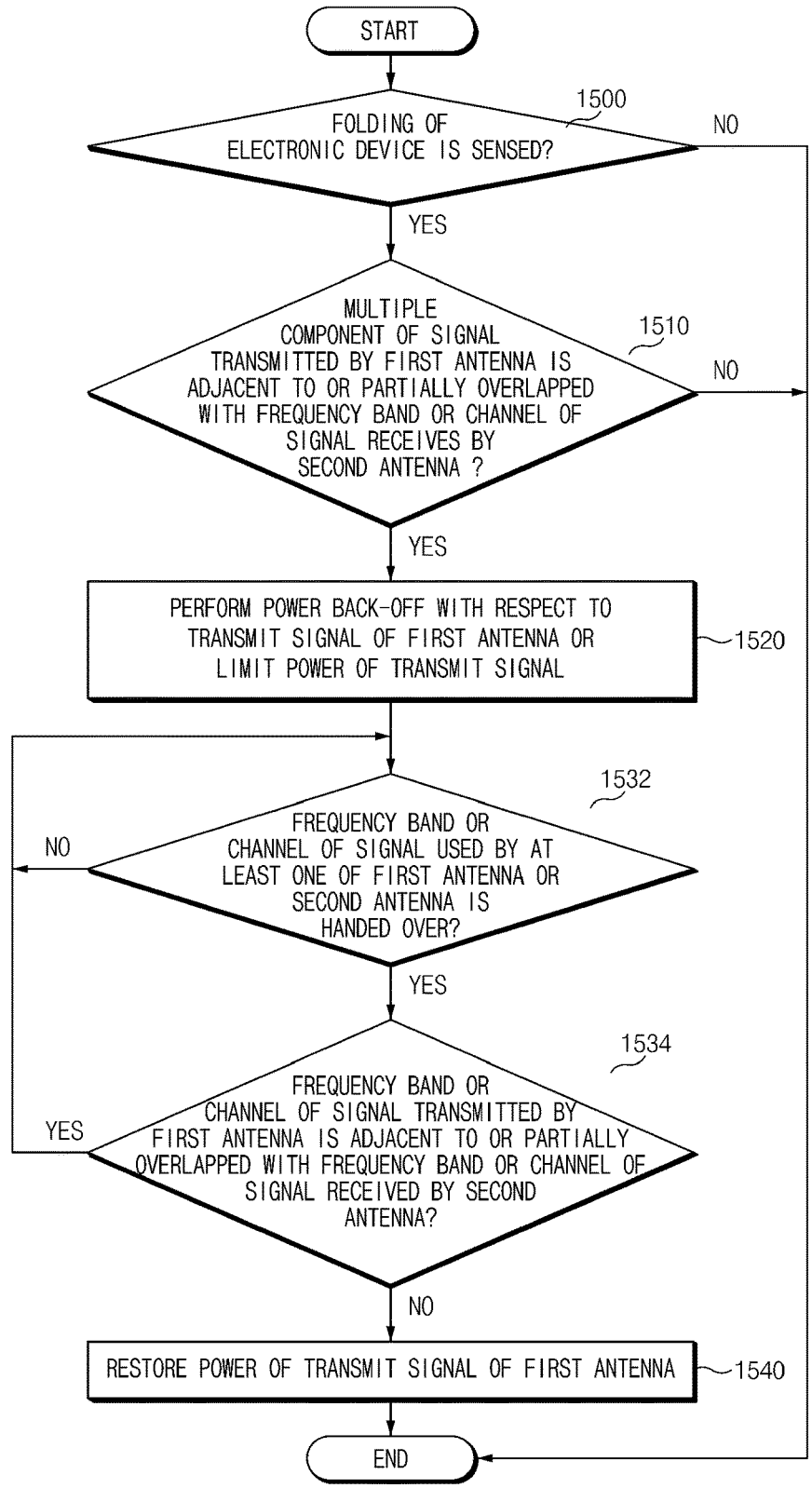

FIGS. 15A and 15B are flowcharts illustrating an operation of an antenna by an electronic device of FIG. 5 according to various embodiments of the disclosure.

Referring to FIG. 15A, in operation 1500, the processor 210 may sense the folding status of the electronic device (e.g., the electronic device 200 of FIG. 2) by using at least one sensor (e.g., the at least one sensor 260 of FIG. 2). For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 1510. When folding is not sensed in operation 1500, the processor 210 may terminate the operation.

In operation 1510, the processor 210 may determine that a multiple component of a signal transmitted by the first antenna (e.g., the first antenna 240 of FIG. 2) is adjacent to or partially overlapped with a signal receives by a second antenna (e.g., the second antenna 250 of FIG. 2) in a frequency band or a channel. The details of the multiple component of the signal transmitted by the first antenna 240 will be described with reference to FIG. 16. According to an embodiment of the disclosure, when the multiple component of the signal transmitted by the first antenna 240 is adjacent to or partially overlapped with a signal received by the second antenna 250, the signal transmitted by the first antenna 240 may exert an influence on signal receiving performance of the second antenna 250. In this case, the processor 210 may proceed to operation 1520. In operation 1510, when the multiple component of the signal transmitted by the first antenna 240 is not adjacent to or not partially overlapped with a frequency band or a channel of the signal received by the second antenna 250, the processor 210 may terminate the operation.

In operation 1520, the processor 210 may perform power back-off with respect to the transmit signal of the first antenna 240.

In operation 1530, the processor 210 may sense the unfolding status of the electronic device 200 by using the at least one sensor 260. When the electronic device 200 is maintained in the folding status ("NO" in operation 1530), the processor 210 may return to operation 1530 and repeat operation 1530. When the electronic device 200 is unfolded ("YES" in 1530), the processor 210 may proceed to operation 1540. For another example, when the electronic device 200 is maintained in the folding status ("NO" in operation 1530), the processor 210 may return to the operation 1510 and may perform the operations subsequent to operation 1510.

In operation 1540, the processor 210 may restore the power of the transmit signal of the first antenna 240.

The description of a reference numeral of reference numerals in FIG. 15B, which is the same as a reference numeral in FIG. 15A, may be understood by making reference to the description made with respect to FIG. 15A.

Referring to FIG. 15B, in operation 1532, the processor 210 may determine whether a frequency band or a channel of a signal used by at least one of the first antenna 240 or the second antenna 250 is handed over.

When the frequency band or the channel of the signal used by at least one of the first antenna 240 or the second antenna 250 is not handed over ("NO" in operation 1532), the processor 210 may return to operation 1532 and may repeat operation 1532.

When the frequency band or the channel of the signal used by at least one of the first antenna 240 or the second antenna 250 is handed over ("YES" in operation 1532), the processor 210 may proceed to operation 1534. In operation 1534, the processor 210 may determine whether a frequency band or a channel of a signal transmitted by the first antenna 240 is adjacent to or partially overlapped with a frequency band or a channel of a signal received by the second antenna 250.

When a frequency band or a channel of the signal transmitted by the first antenna 240 is adjacent to or partially overlapped with the frequency band or the channel of the signal received by the second antenna 250 ("YES" in operation 1534), the processor 210 may return to operation 1532 and may perform operation 1532.

When the frequency band or the channel of the signal transmitted by the first antenna 240 is not adjacent to or not partially overlapped with the frequency band or the channel of the signal received by the second antenna 250 ("NO" in operation 1534), the processor 210 may proceed to operation 1540.

The operations of the antennas in FIGS. 15A and 15B are provided for the illustrative purpose, and the operations of the first antenna 240 may be performed interchangeably with the operation of the second antenna 250.

Figure 16:
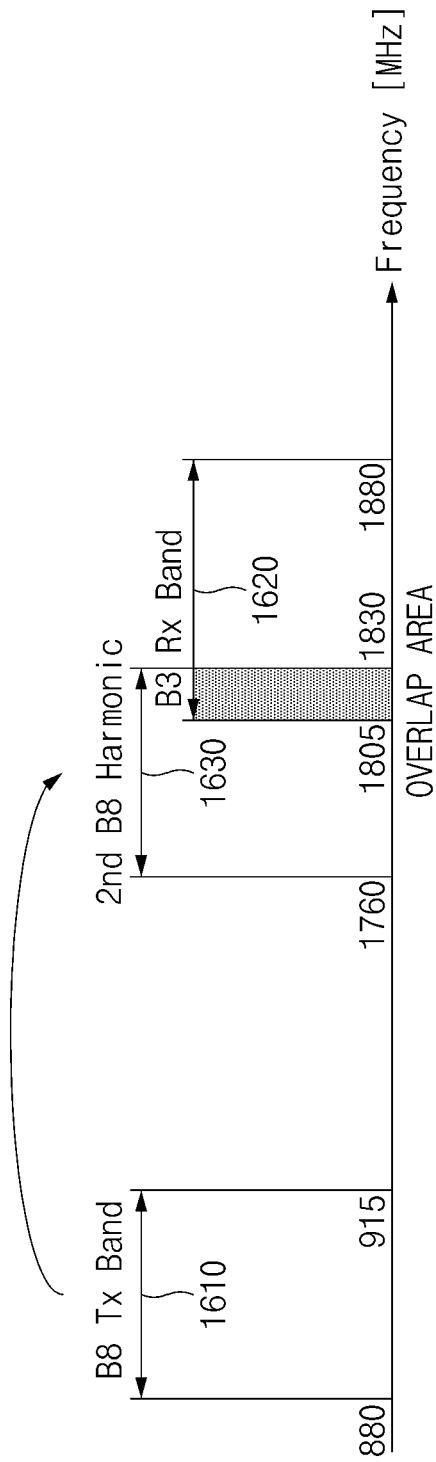
FIG. 16 is a graph illustrating a multiple component of a frequency illustrated in FIGS. 15A and 15B according to an embodiment of the disclosure.

FIG. 16 is a graph illustrating a multiple component of a frequency illustrated in FIGS. 15A and 15B according to an embodiment of the disclosure.

Referring to FIG. 16, according to an embodiment of the disclosure, the processor (e.g., the processor 210 of FIG. 2) may make communication by using a first antenna (e.g., the first antenna 240 of FIG. 2) and a second antenna (e.g., the processor 210 of FIG. 2). For example, a frequency band transmitted or received, by the first antenna 240, to make the communication may be referred to as a first band 1610. The first band 1610 may include, for example, the band of about 900 MHz. For example, a frequency band transmitted or received, by the second antenna 250, to make the communication may be referred to as a second band 1620. The second band 1620 may include, for example, the band of about 1.85 GHz.

According to an embodiment of the disclosure, when the processor 210 makes communication by using the first antenna 240, a signal, which has a multiple frequency band of a frequency transmitted or received by the first antenna 240, may be generated. For example, the multiple frequency band may be referred to as a third band 1630. The third band 1630 may include, for example, the band of about 1.8 GHz. According to an embodiment of the disclosure, the first band 1610 may correspond to a frequency band of about 880 MHz to about 915 MHz, and the third band 1630 may correspond to a frequency band of about 1760 MHz to about 1830 MHz. For example, the frequency of the third band 1630 may be referred to as twice the first band 1610. For example, another multiple frequency band of the first band 1610 may be referred to as n times (n is a constant) of the first band 1610, instead of the third band 1630.

According to an embodiment of the disclosure, the multiple component of a signal transmitted by the first antenna 240 may be adjacent to or partially overlapped with a frequency band or a channel of the signal received by the second antenna 250. For example, when the second band 1620 corresponds to a frequency band of about 1805 MHz to about 1880 MHz, the third band 1630 may be overlapped with the second band 1620 in a frequency band of about 1805 MHz to about 1830 MHz. According to an embodiment of the disclosure, the signal received by the second antenna 250 may be influenced (interference) by the multiple component of the signal transmitted by the first antenna 240. In this case, signal receiving performance of the second antenna 250 may be deteriorated.

The number of first antennas 240, the number of second antennas 250, and a transmit frequency or a receive frequency are provided for the illustrative purpose, and an embodiment of the disclosure is not limited thereto.

Figure 17:
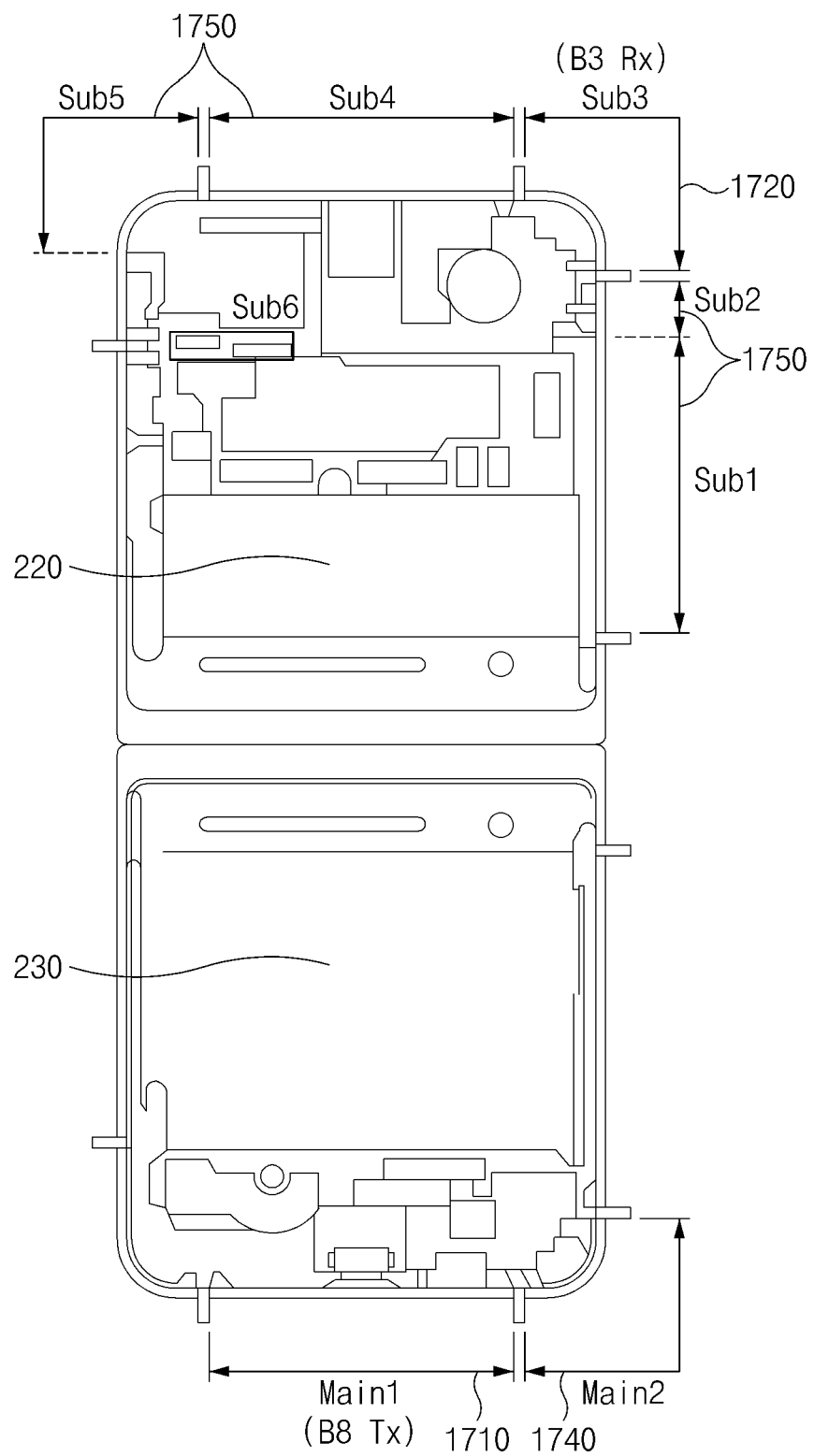
FIG. 17 illustrates an antenna design of an electronic device illustrated in FIGS. 15A, 15B, and 16 according to an embodiment of the disclosure.

FIG. 17 illustrates an antenna design of an electronic device illustrated in FIGS. 15A, 15B, and 16 according to an embodiment of the disclosure.

Referring to FIG. 17, the description of a reference numeral of reference numerals in FIG. 17, which corresponds to a reference numeral in FIG. 11, may be understood by making reference to the description made with respect to FIG. 11. The following description will be made with reference to FIG. 17 while focusing on the difference between FIG. 17 and FIG. 11.

According to an embodiment of the disclosure, an electronic device (e.g., the electronic device 200 of FIG. 2) may include a first band antenna 1710 (e.g., the first antenna 240 of FIG. 5), a second band antenna 1720 (e.g., the second antenna 250 of FIG. 5), a plurality of sub-antennas 1750 (e.g., the plurality of sub-antennas 1150 of FIG. 11), and/or a main antenna 1740 (e.g., the main antenna 1140 of FIG. 11). According to an embodiment of the disclosure, the first band antenna 1710 may be disposed in a second housing (e.g., the second housing 230 of FIG. 2) of the electronic device 200, and the second band antenna 1720 may be disposed in a first housing (e.g., the first housing 220 of FIG. 2) of the electronic device 200.

According to an embodiment of the disclosure, the processor (e.g., the processor 210 of FIG. 2) may support cellular communication by using the first band antenna 1710 and/or the second band antenna 1720. According to an embodiment of the disclosure, a multiple component of a signal transmitted by the first band antenna 1710 may be adjacent to or partially overlapped with a frequency band or a channel of a signal received by the second band antenna 1720, FIG. 18 illustrates an operation of an antenna performing a sounding reference signal (SRS) operation according to an embodiment of the disclosure.

Figure 18:
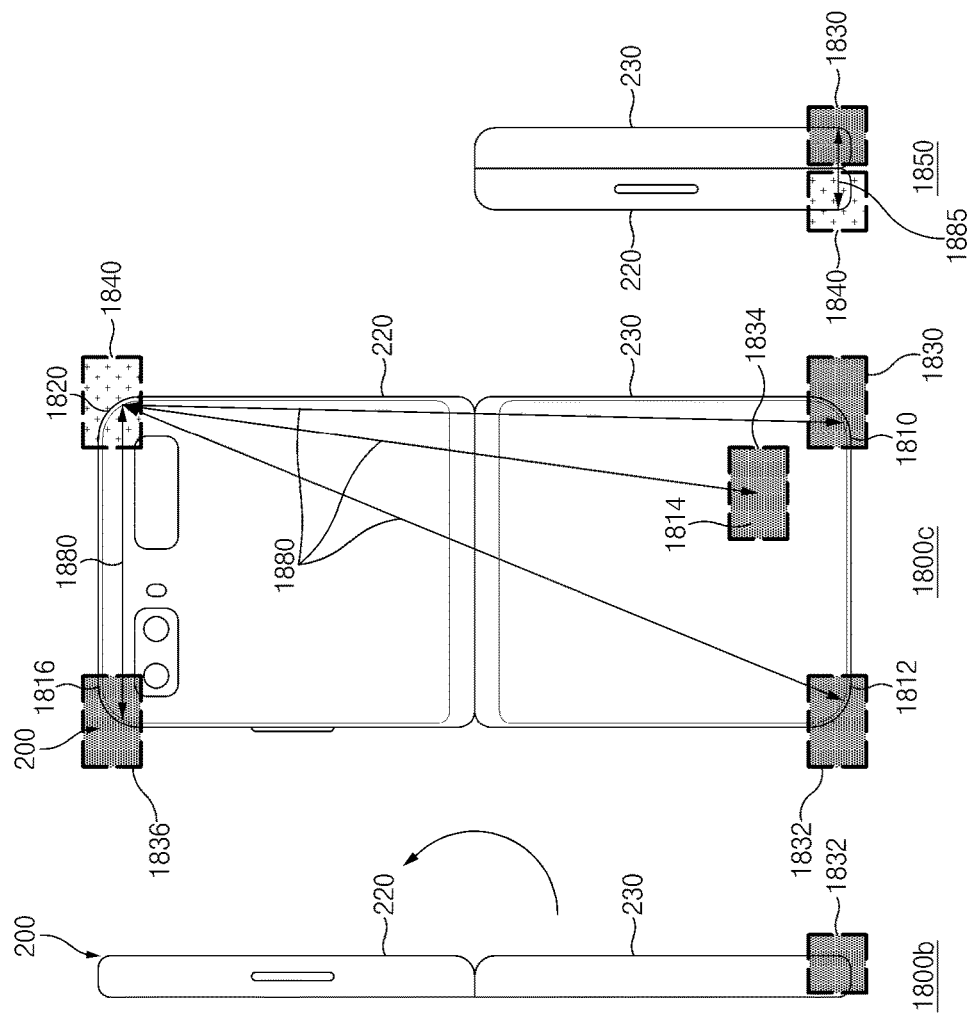
FIG. 18 illustrates an operation of an antenna performing a sounding reference signal (SRS) operation according to an embodiment of the disclosure.
Figure 18:
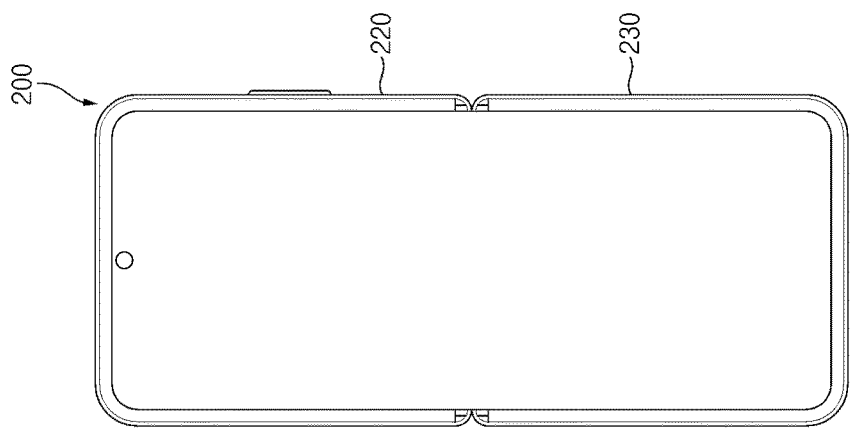
Figure 18:
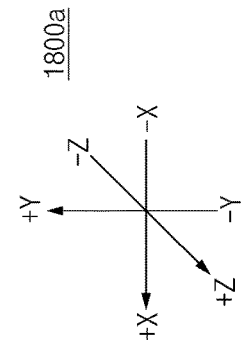

Referring to FIG. 18, when the electronic device 200 (e.g., the electronic device 200 of FIG. 2) is in the unfolding status, reference numeral 1800a illustrates the front surface of the electronic device 200. Reference numeral 1800b illustrates the electronic device 200, when the electronic device 200 in reference numeral 1800a is viewed in an −X axis direction, and reference numeral 1800c illustrates the electronic device 200, when the electronic device 200 in reference numeral 1800a is viewed from the −Z axis direction. Reference numeral 1850 illustrates the electronic device 200 which is in the folding status and viewed in the −X axis direction, when the electronic device 200 in reference numeral 1800a is in the folding status.

According to an embodiment of the disclosure, a plurality of first antennas 1810, 1812, 1814, and 1816 (e.g., the first antenna 240 of FIG. 2) may be disposed in the first housing 220 (e.g., the first housing 220 of FIG. 2) or the second housing 230 (e.g., the second housing 230 of FIG. 2). For example, the first antennas 1810, 1812, 1814, and 1816 may be disposed in at least a portion of the plurality of first areas 1830, 1832, 1834, and 1836. According to an embodiment of the disclosure, the second antenna 1820 (e.g., the second antenna 250 of FIG. 2) may be disposed at a first corner positioned in the +Y axis direction of the first housing 220. For example, the second antenna 1820 may be disposed in at least a portion of the second area 1840. According to an embodiment of the disclosure, the plurality of first antennas 1810, 1812, 1814, and 1816 may include the (1-1)-th antenna 1810, the (1-2)-th antenna 1812, the (1-3)-th antenna 1814, or the (1-4)-th antenna 1816.

According to an embodiment of the disclosure, the plurality of first antennas 1810, 1812, 1814, and 1816 may transmit and receive a signal in a first band. For example, the first band may include a B40 band. According to an embodiment of the disclosure, the second antenna 1820 may transmit and receive a signal in the second band. For example, the second band may include a WiFi 2.4G band.

According to an embodiment of the disclosure, the processor 210 may perform a sounding reference signal (SRS) operation by using the plurality of first antennas 1810, 1812, 1814, and 1816. The SRS operation may be referred to as an operation in which the processor 210 makes communication by using an antenna representing the best signal quality after sequentially transmitting signals in mutually different channels by using the plurality of antennas (e.g., the plurality of first antennas 1810, 1812, 1814, and 1816).

According to an embodiment of the disclosure, when the electronic device 200 (e.g., reference numerals 1800a, 1800b, and 1800c) is in the unfolding status, each of the plurality of first antennas 1810, 1812, 1814, and 1816 and the second antenna 1820 may be spaced apart from each other by a first distance 1880. For example, the first distance 1880 may be referred to as a distance between each of the plurality of first antennas 1810, 1812, 1814, and 1816, and the second antenna 1820. For example, the first distance 1880 may be understood as a distance allowing the processor 210 to stably receive a signal through the second antenna 1820, as the plurality of first antennas 1810, 1812, 1814, and 1816 are spaced apart from the second antenna 1820 by a sufficiently long distance. For example, when the plurality of first antennas 1810, 1812, 1814, and 1816 and the second antenna 1820 are spaced apart from each other by the first distance 1880, the interference between signals transmitted by at least one of the plurality of first antennas 1810, 1812, 1814, and 1816, and a signal received by the second antenna 1820 may be reduced.

According to an embodiment of the disclosure, a frequency band or a channel of a signal transmitted by the plurality of first antennas 1810, 1812, 1814, and 1816 may be adjacent to or partially overlapped with a frequency band or a channel of a signal received by the second antenna 1820. The details thereof will make reference to the description made with reference to FIG. 19.

According to an embodiment of the disclosure, when the electronic device 200 is in the folding status (see reference numeral 1850), at least one (e.g., the (1-1)-th antenna 1810) of the plurality of first antennas 1810, 1812, 1814, and 1816, and the second antenna 1820 may be spaced apart from each other by a second distance 1885. For example, the second distance 1885 may be the shortest distance between distances between the plurality of first antennas 1810, 1812, 1814, and 1816, and the second antenna 1820. For another example, the second distance 1885 may be a distance to cause a signal transmitted by one of the plurality of first antennas 1810, 1812, 1814, and 1816 to interfere with a signal received by the second antenna 1820. The second distance 1885, which is provided for the illustrative purpose, may be formed to be shorter or longer depending on the positions of at least one (e.g., the (1-1)-th antenna 1810) of the plurality of first antennas 1810, 1812, 1814, and 1816 and the second antenna 1820. The second area 1840 of the first housing 220 and the first area 1830 of the second housing 230 are adjacent to each other in the folding status (see reference numeral 1850) or the distance between the second area 1840 and the first area 1830 in the folding status is shorter than the distance between the second area 1840 and the first area 1830 in the unfolding status. Accordingly, when the electronic device 200 is in the folding status (see reference numeral 1850), at least one (e.g., the (1-1)-th antenna 1810) of the plurality of first antennas 1810, 1812, 1814, and 1816 may be disposed adjacent to the second antenna 720. According to an embodiment of the disclosure, when a frequency band or a channel of a signal transmitted by at least one (e.g., the (1-1)-th antenna 1810) of the plurality of first antennas 1810, 1812, 1814, and 1816 is adjacent to or partially overlapped with a frequency band or a channel of a signal received by the second antenna 1820 in the folding status (see reference numeral 1850), the signal receiving performance of the second antenna 1820 may be deteriorated. The details thereof will make reference to the description made with reference to FIG. 19.

According to an embodiment of the disclosure, for example, when the electronic device 200 is in the folding status (see reference numeral 1850) and when the signal receiving performance of the second antenna 1820 is deteriorated, the processor 210 may make the (1-1)-th antenna, which is adjacent to the second antenna 1820, of the plurality of first antennas 1810, 1812, 1814, and 1816, disable. In this case, the processor 210 may perform the SRS operation by using remaining antennas 1812, 1814, and 1816. For another example, when the electronic device 200 is in the folding status (see reference numeral 1850) and when the signal receiving performance of the second antenna 1820 is deteriorated, the processor 210 may make the (1-1)-th antenna 1810 or the (1-3)-th antenna 1814, which is adjacent to the second antenna 1820, of the plurality of first antennas 1810, 1812, 1814, and 1816, disable.

Figure 19:
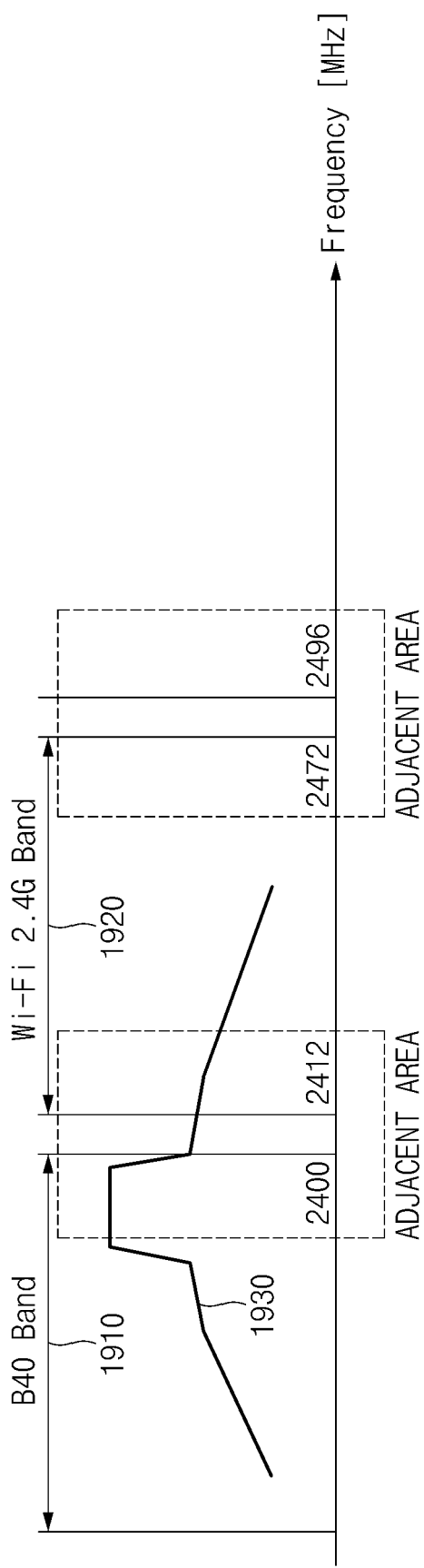
FIG. 19 is a graph illustrating an interference between signals transmitted or received by an antennas of FIG. 18 according to an embodiment of the disclosure.

FIG. 19 is a graph illustrating an interference between signals transmitted or received by antennas of FIG. 18 according to an embodiment of the disclosure.

Referring to FIG. 19, according to an embodiment of the disclosure, a processor (e.g., the processor 210 of FIG. 2) may make first communication by using a plurality of first antennas (e.g., the plurality of first antennas 1810, 1812, 1814, and 1816 of FIG. 18) and second communication by using a second antenna (e.g., the second antenna 1820 of FIG. 18). For example, the first communication or the second communication may include cellular communication or WiFi communication. For example, a frequency band transmitted or received, by the plurality of first antennas 1810, 1812, 1814, and 1816, to make the first communication may be referred to as a first band 1910. The first band 1910 may include, for example, the band of about 2.3 GHz. For example, the first band 1910 may include a B40 band. For example, a frequency band transmitted or received, by the second antenna 1820, to make the second communication may be referred to as a second band 1920 (or 2.4 GHz). The second band 1920 may include, for example, the band of about 2.4 GHz. For example, the second band 1920 may include a WiFi 2.4G band.

According to an embodiment of the disclosure, the first band 1910 and the second band 1920 may be understood as frequency bands adjacent to each other. Each of the first band 1910 and the second band 1920 may include a plurality of channels. According to an embodiment of the disclosure, the processor 210 may use a higher frequency channel (e.g., about 2400 MHz) of the first band 1910 by using the plurality of first antennas 1810, 1812, 1814, and 1816. The processor 210 may use a lower frequency channel (e.g., about 2412 MHz) of the second band 1920 by using the second antenna 1820. For example, the signal transmitted by the plurality of first antennas 1810, 1812, 1814, and 1816 by using the higher frequency channel of the first band 1910 may be referred to as a transmit signal 1930. The signal received by the second antenna 1820 by using the lower frequency channel of the second band 1920 may be influenced (interference) by at least a portion of a component of the transmit signal 1930. In this case, signal receiving performance of the second antenna 1820 may be deteriorated.

The number of the plurality of first antennas 1810, 1812, 1814, and 1816, the number of second antennas 1820, and a transmit frequency or a receive frequency are provided for the illustrative purpose, and an embodiment of the disclosure is not limited thereto.

Figure 20A:
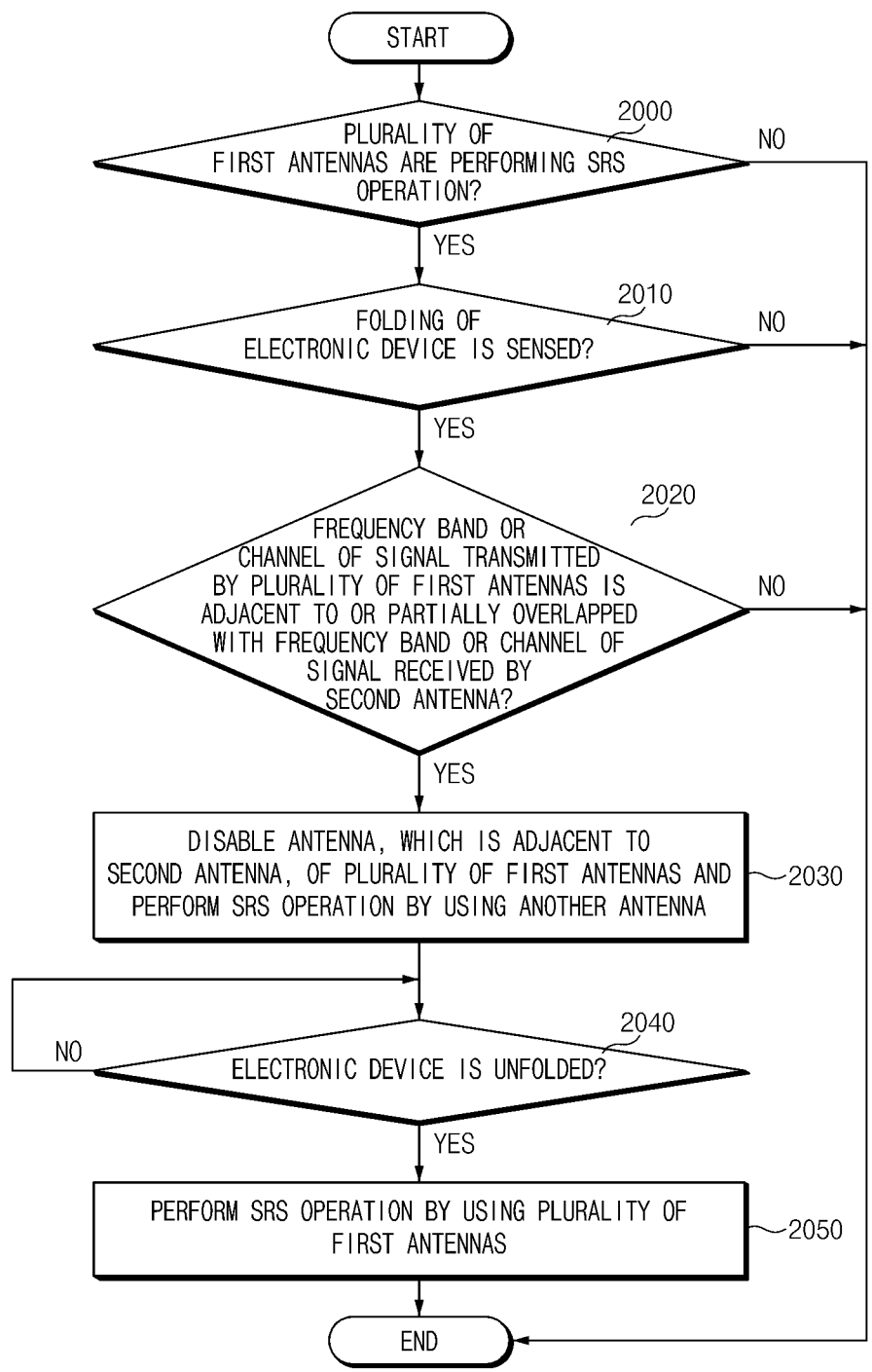
FIGS. 20A and 20B are flowcharts illustrating a method for operating an antenna by an electronic device illustrated in FIG. 18 according to various embodiments of the disclosure.
Figure 20B:
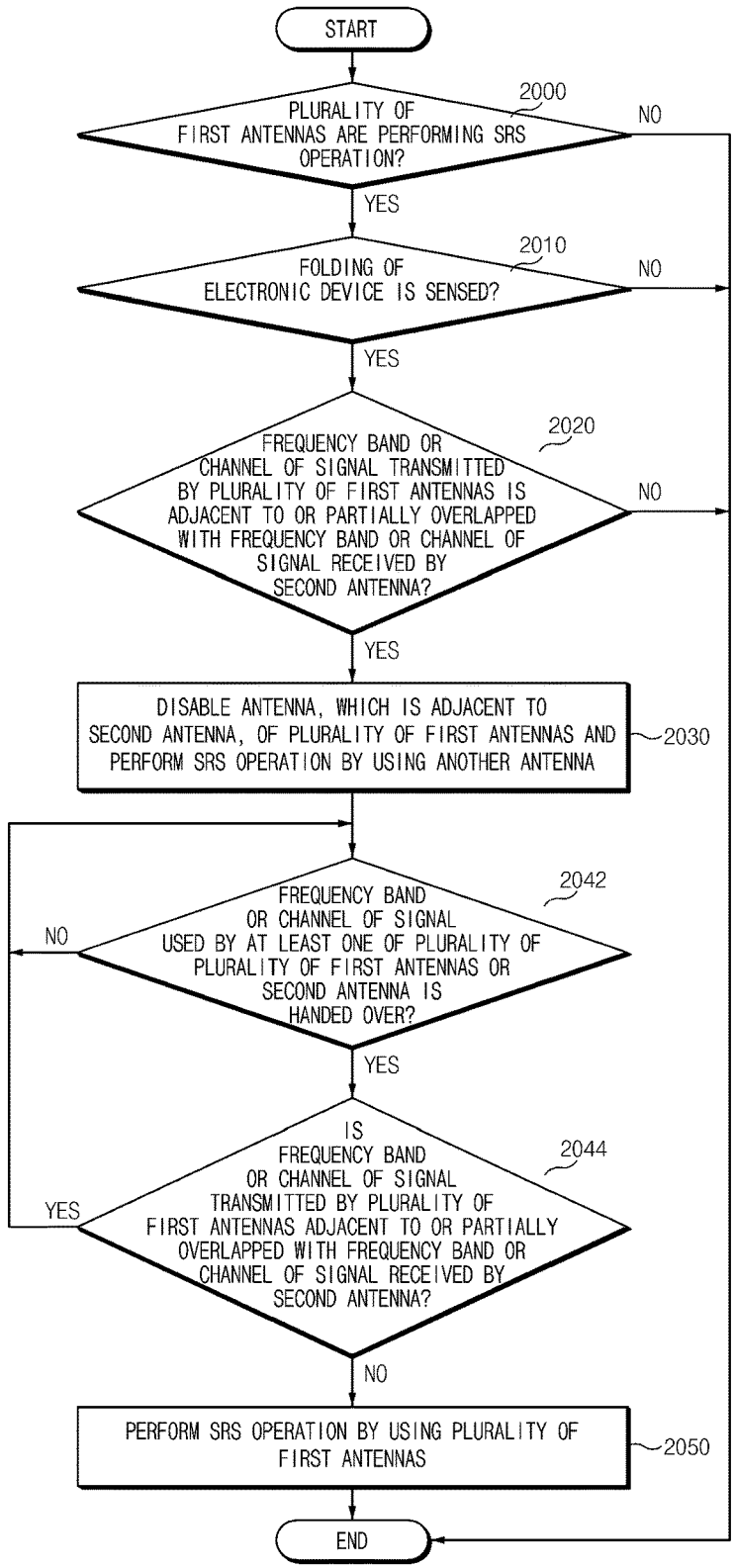

FIGS. 20A and 20B are flowcharts illustrating a method for operating an antenna by an electronic device illustrated in FIG. 18 according to various embodiments of the disclosure.

Referring to FIG. 20A, in operation 2000, a processor (e.g., the processor 210 of FIG. 2) may determine whether the plurality of first antennas 1810, 1812, 1814, and 1816 are performing an SRS operation. When the plurality of first antennas 1810, 1812, 1814, and 1816 are performing the SRS operation, the processor 210 may proceed to operation 2010. For example, the processor 210 may terminate the operation when the plurality of first antennas 1810, 1812, 1814, and 1816 does not perform the SRS operation.

In operation 2010, the processor 210 may sense the folding status of the electronic device (e.g., the electronic device 200 of FIG. 2) by using at least one sensor (e.g., the at least one sensor 260 of FIG. 2). For example, the processor 210 may sense the change in the intensity of a magnetic field, which results from the change in the relative positions of the first housing 220 and the second housing 230, by using the at least one sensor 260 (e.g., a hall sensor). When the electronic device 200 is folded, the processor 210 may proceed to operation 2020. For example, when the folding of the electronic device 200 is not sensed, the processor 210 may terminate the operation.

In operation 2020, the processor 210 may determine whether a frequency band or a channel of a signal transmitted by the plurality of first antennas 1810, 1812, 1814, and 1816 is adjacent to or partially overlapped with a frequency band or a channel of a signal received by the second antenna 1820. The details thereof will make reference to the description made with reference to FIG. 19. According to an embodiment of the disclosure, when the frequency band or the channel of the signal transmitted by the plurality of first antennas 1810, 1812, 1814, and 1816 is adjacent to or partially overlapped with the frequency band or the channel of the signal received by the second antenna 1820, the signal transmitted by the plurality of first antennas 1810, 1812, 1814, and 1816 may exert an influence on signal receiving performance of the second antenna 1820. In this case, the processor 210 may proceed to operation 2030. In operation 2020, when the frequency band or the channel of the signal transmitted by the plurality of first antennas 1810, 1812, 1814, and 1816 is not adjacent to or not partially overlapped with the frequency band or the channel of the signal received by the second antenna 1820, the processor 210 may terminate the operation.

In operation 2030, the processor 210 may make an antenna (e.g., the (1-1)-th antenna 1810), which is adjacent to the second antenna 1820, of the plurality of first antennas 1810, 1812, 1814, and 1816 disable, and may perform the SRS operation through the remaining antennas (e.g., the (1-2)-th antenna 1812, the (1-3)-th antenna 1814, and the (1-4)-th antenna 1816).

In operation 2040, the processor 210 may sense the unfolding status of the electronic device 200 by using the at least one sensor 260. When the electronic device 200 is maintained in the folding status ("NO" in operation 2040), the processor 210 may return to operation 2040 and may perform operation 2040. For another example, when the electronic device 200 is maintained in the folding status ("NO" in operation 2040), the processor 210 may return to the operation 2020 and may perform the following operations from operation 2020. When the electronic device 200 is unfolded ("YES" in operation 2040), the processor 210 may proceed to operation 2050.

In operation 2050, the processor 210 may activate the disabled antenna (e.g., the (1-1)-th antenna 1810) and may perform the SRS operation by using the plurality of first antennas 1810, 1812, 1814, and 1816.

The description of a reference numeral of reference numerals in FIG. 20B, which is the same as a reference numeral in FIG. 20A, may be understood by making reference to the description made with respect to FIG. 20A.

Referring to FIG. 20B, in operation 2042, the processor 210 may determine whether a frequency band or a channel of a signal used by at least one of the plurality of first antennas 1810, 1812, 1814, or 1816 or the second antenna 1820 is handed over.

When the frequency band or the channel of the signal used by at least one of the plurality of first antennas 1810, 1812, 1814, or 1816 or the second antenna 1820 is not handed over ("NO" in operation 2042), the processor 210 may return to operation 2042 and may repeat operation 2042.

When the frequency band or the channel of the signal used by at least one of the plurality of first antennas 1810, 1812, 1814, or 1816 and the second antenna 1820 is handed over ("YES" in operation 2042), the processor 210 may proceed to operation 2044. In operation 2044, the processor 210 may determine whether a frequency band or a channel of a signal transmitted by the plurality of first antennas 1810, 1812, 1814, and 1816 is adjacent to or partially overlapped with a frequency band or a channel of a signal received by the second antenna 1820.

When the frequency band or the channel of the signal transmitted by the plurality of first antennas 1810, 1812, 1814, and 1816 is adjacent to or partially overlapped with the frequency band or the channel of the signal received by the second antenna 1820 ("YES" in operation 2044), the processor 210 may return to operation 2042 and may perform operation 2042.

When the frequency band or the channel of the signal transmitted by the plurality of first antennas 1810, 1812, 1814, and 1816 is not adjacent to or not partially overlapped with the frequency band or the channel of the signal received by the second antenna 1820 ("NO" in operation 2044), the processor 210 may proceed to operation 2050.

The operations of the antennas in FIGS. 20A and 20B are provided for the illustrative purpose, and the operations of the plurality of first antennas 1810, 1812, 1814, and 1816 may be performed interchangeably with the operation of the second antenna 1820.

Figure 21:
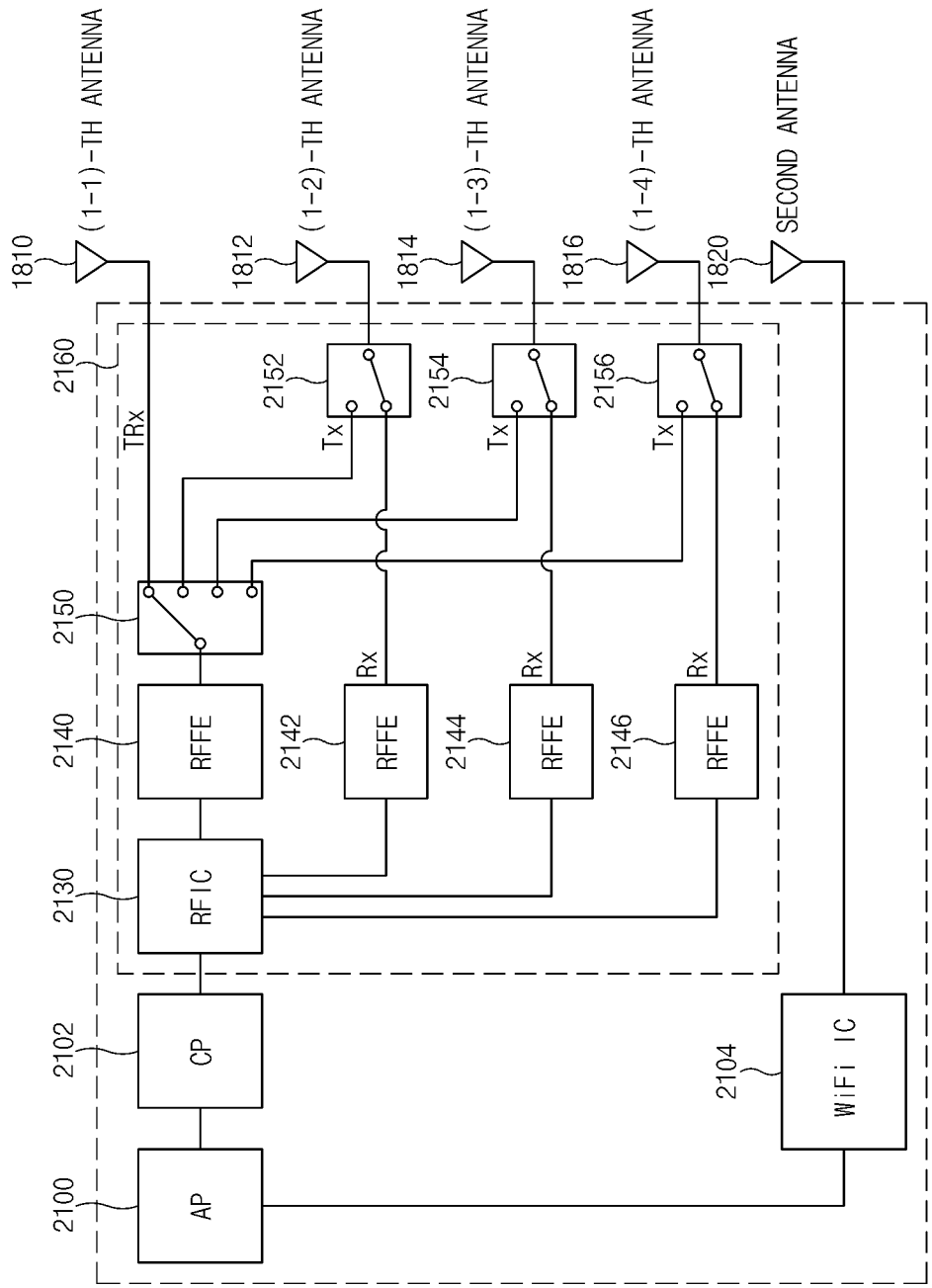
FIG. 21 is a block diagram illustrating a structure of an electronic device of FIG. 18 according to an embodiment of the disclosure.

FIG. 21 is a block diagram illustrating a structure of an electronic device of FIG. 18 according to an embodiment of the disclosure.

Referring to FIG. 21, according to an embodiment of the disclosure, an electronic device (e.g., the electronic device 200 of FIG. 2) may include an application processor (AP) 2100, a communication processor (CP) 2102, a WiFi IC 2104, a wireless communication circuit 2160, the plurality of first antennas 1810, 1812, 1814, and 1816, and/or the second antenna 1820.

According to an embodiment of the disclosure, the AP 2100 (e.g., the main processor 121 of FIG. 1 and the processor 210 of FIG. 2) may execute, for example, software (e.g., the program 140 of FIG. 1) to control at least one different component (e.g., a hardware or software component) of the electronic device 200 linked to the processor 210 and to process or compute various data.

According to an embodiment of the disclosure, the CP 2102 (e.g., the auxiliary processor 123 of FIG. 1) may perform cellular communication in place of the AP 2100 when the AP 2100 is in an inactive status (e.g., sleep), or together with the AP 2100 when the AP 2100 is in an active status (e.g., an application execution). According to an embodiment of the disclosure, the CP 2102 may be implemented as a portion of the wireless communication circuit 2160 operatively associated with the CP 2102. For example, the CP 2102 may be implemented separately from the AP 2100 or as a portion of the AP 2100.

According to an embodiment of the disclosure, the WiFi IC 2104 (e.g., the communication module 190 of FIG. 1) may perform WiFi communication in place of the AP 2100 when the AP 2100 is in an inactive status (e.g., sleep), or together with the AP 2100 when the AP 2100 is in an active status (e.g., an application execution). According to an embodiment of the disclosure, the WiFi IC 2104 may be implemented as a portion of another component (e.g., the communication module 190 of FIG. 1) operatively associated with the WiFi IC 2104. For example, the WiFi IC 2104 may be implemented separately from the AP 2100 or as a portion of the AP 2100.

According to an embodiment of the disclosure, the wireless communication circuit 2160 (e.g., the wireless communication circuit 270 of FIG. 2) may establish a wireless communication channel between the electronic device 200 and an external electronic device (e.g., the electronic device 102, the electronic device 104, or the server 108 of FIG. 1) and may support communication through the established communication channel. According to an embodiment of the disclosure, the wireless communication circuit 2160 may be operated independently from the AP 2100 and may include the CP 2102. The wireless communication circuit 2160 may identify or authenticate the electronic device 200 over a communication network, such as a first network (e.g., the first network 198 of FIG. 1) or a second network (e.g., the second network 199 of FIG. 1) by using subscriber information (IMSI) stored in an SMS subscriber identifying module (e.g., the subscriber identifying module 196 of FIG. 1)

According to an embodiment of the disclosure, the wireless communication circuit 2160 may include an RFIC 2130, a plurality of RFFEs 2140, 2142, 2144, and 2146, and/or a plurality of switches 2150, 2152, 2154, and 2156. According to an embodiment of the disclosure, the RFIC 2130 may be electrically connected with the plurality of first antennas 1810, 1812, 1814, and 1816. The RFIC 2130 may convert (e.g., up-converting) a received frequency signal into a signal having a specified frequency in transmission. The RFIC 2130 may convert (e.g., down-converting) a received frequency signal into a signal having a frequency, which is to be processed by the CP 2102, in reception. According to an embodiment of the disclosure, the plurality of switches 2150, 2152, 2154, and 2156 may link the plurality of first antennas 1810, 1812, 1814, and 1816 to one of a receive path or a transmit path.

The plurality of radio frequency front ends (RFFEs) 2140, 2142, 2144, and 2146 may be configured to process a signal in a radio frequency band (e.g., a B40 band or WiFi 2.4G band). For example, the first RFFE 2140 may include at least one of a duplexer, an amplifier, a low noise amplifier (LNA), or a switch.

According to an embodiment of the disclosure, the plurality of first antennas 1810, 1812, 1814, and 1816 (e.g., the first antenna 240 of FIG. 2) and/or the second antenna 1820 (e.g., the second antenna 250 of FIG. 2) may transmit a signal or power to the outside (e.g., the external electronic device) or may receive the signal or the power from the outside. According to an embodiment of the disclosure, the plurality of first antennas 1810, 1812, 1814, and 1816 may support a communication protocol for cellular communication. The second antenna 1820 may support a communication protocol for WiFi communication.

According to an embodiment of the disclosure, the CP 2102 may perform a sounding reference signal (SRS) operation by using the plurality of first antennas 1810, 1812, 1814, and 1816. According to an embodiment of the disclosure, the CP 2102 may sequentially transmit a signal in the first band (e.g., the first band 1910 of FIG. 19) by using the plurality of first antennas 1810, 1812, 1814, and 1816. For example, the CP 2102 may transmit the signal in the first band 1910 using the (1-1)-th antenna 1810. In this case, the first switch 2150 may link the (1-1)-th antenna 1810 to the transmit path to the (1-1)-th antenna 1810. The transmit path to the (1-1)-th antenna 1810 may include the RFIC 2130, the first RFFE 2140, the first switch 2150 and/or the (1-1)-th antenna 1810. In this case, the transmit paths between the RFIC 2130, and the (1-2)-th antenna 1812, the (1-3)-th antenna 1814, and the (1-4)-th antenna 1816 are blocked by the second switch 2152, the third switch 2154, and the fourth switch 2156, and the receive path between the RFIC 2130, and the (1-2)-th antenna 1812, the (1-3)-th antenna 1814, and the (1-4)-th antenna 1816 may be connected by the second switch 2152, the third switch 2154, and the fourth switch 2156. For example, the transmit path between the RFIC 2130 and the (1-2)-th antenna 1812 may include the RFIC 2130, the first RFFE 2140, the first switch 2150, the second switch 2152, and/or the (1-2)-th antenna 1812, the transmit path between the RFIC 2130 and the (1-3)-th antenna 1814 may include the RFIC 2130, the first RFFE 2140, the first switch 2150, the third switch 2154, and/or the (1-3)-th antenna 1814, the transmit path between the RFIC 2130 and the (1-4)-th antenna 1816 may include the RFIC 2130, the first RFFE 2140, the first switch 2150, the fourth switch 2156, and/or the (1-4)-th antenna 1816. According to an embodiment of the disclosure, the CP 2102 may transmit the signal in the first band 1910 by sequentially using the (1-2)-th antenna 1812, the (1-3)-th antenna 1814, and the (1-4)-th antenna 1816 as described above. According to an embodiment of the disclosure, the CP 2102 may receive mutually different signals by using the plurality of first antennas 1810, 1812, 1814, and 1816. According to an embodiment of the disclosure, the CP 2102 may make cellular communication by using an antenna, which represents the strongest transmit signal power, of the plurality of first antennas 1810, 1812, 1814, and 1816. Accordingly, when the electronic device 200 is in the folding status (see reference numeral 1850), at least one (e.g., the (1-1)-th antenna 1810) of the plurality of first antennas 1810, 1812, 1814, or 1816 may be disposed adjacent to the second antenna 1820. In this case, a signal received by the second antenna 1820 may be influenced (may interfere with) by, for example, a signal transmitted by the (1-1)-th antenna 1810. In this case, the CP 2102 may make the (1-1)-th antenna 1810 disable and may perform the SRS operation by using the (1-2)-th antenna 1812, the (1-3)-th antenna 1814, and the (1-4)-th antenna 1816.

Figure 22:
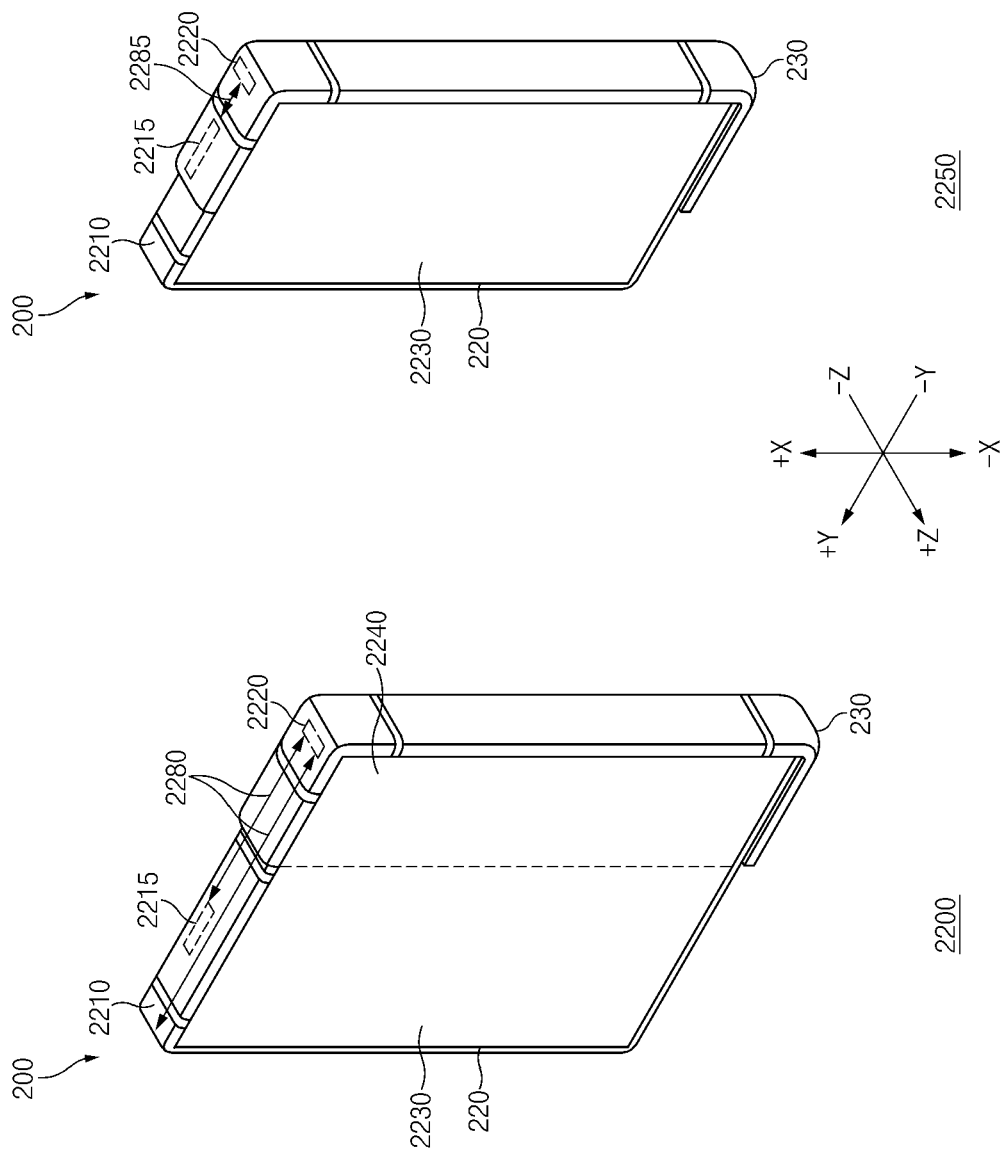
FIG. 22 illustrates an antenna operation by a rollable electronic device according to an embodiment of the disclosure.

FIG. 22 illustrates an antenna operation by a rollable electronic device according to an embodiment of the disclosure.

Referring to FIG. 22, the electronic device 200 (e.g., the electronic device 200 of FIG. 2) may be a rollable electronic device (e.g., the electronic device 101E of FIG. 4), which is different from those of FIGS. 5 to 21. The electronic device 200 may further include a display (e.g., the display 160E of FIG. 4). The display 160E may include a first display area 2230 and a second display area 2240. Reference numeral 2200 illustrates the electronic device 200 extended (extending status) and reference numeral 2250 illustrates the electronic device 200 retracted (retracting status).

According to an embodiment of the disclosure, the electronic device 200 may include the first housing 220 (e.g., the first housing 220 of FIG. 2) and the second housing 230 (e.g., the second housing 230 of FIG. 2). The form of the electronic device 200 may be changed, as the second housing 230 is slid. According to an embodiment of the disclosure, when the second housing 230 is slid in the +Y axis direction, the overlap portion between the first housing 220 and the second housing 230 may be increased. For example, at least a portion of the second display area 2240 may move into the second housing 230. For example, only at least a portion of the second display area 2240 may be visually exposed to the front surface (+Z axis direction) of the electronic device 200. When the overlap portion between the first housing 220 and the second housing 230 is maximum, as the second housing 230 is slid to the maximum extent in the +Y axis direction, the second display area 2240 may not be visually exposed to the front surface (+Z axis direction) of the electronic device 200.

According to an embodiment of the disclosure, a plurality of first antennas 2210 and 2215 (e.g., the first antenna 240 of FIG. 2) may be disposed in at least a portion of the first housing 220, and the second antenna 2220 (e.g., the second antenna 250 of FIG. 2) may be disposed in at least a portion of the second housing 230. For example, the plurality of first antennas 2210 and 2215 may include the (1-1)-th antenna 2210 or the (1-2)-th antenna 2215. According to an embodiment of the disclosure, the plurality of first antennas 2210 and 2215 may transmit and receive a signal in a second band (e.g., the second band 620 of FIG. 6). For example, the second band may include a WiFi 2.4G band. The processor (e.g., the processor 210 of FIG. 2) may perform a multiple input multiple output (MIMO) operation by using the plurality of first antennas 2210 and 2215. According to an embodiment of the disclosure, the second antenna 2220 may transmit and receive a signal in a first band (e.g., the first band 610 in FIG. 6). For example, the first band may include a B40 band.

According to an embodiment of the disclosure, when the electronic device 200 is in the extending status (see reference numeral 2200), the plurality of first antennas 2210 and 2215 and the second antenna 2220 may be spaced apart from each other by a first distance 2280. For example, the first distance 2280 may be referred to as a distance between each of the plurality of first antennas 2210 and 2215, and the second antenna 2220. For example, the first distance 2280 may be understood as a distance allowing the processor 210 to stably receive a signal through the second antenna 2220, as the plurality of first antennas 2210 and 2215 are spaced apart from the second antenna 2220 by a sufficiently long distance. For example, when the plurality of first antennas 2210 and 2215 and the second antenna 2220 are spaced apart from each other by the first distance 2280, the interference between a signal transmitted by the plurality of first antennas 2210 and 2215 and a signal received by the second antenna 2220 may be reduced.

According to an embodiment of the disclosure, a frequency band or a channel of a signal transmitted by the plurality of first antennas 2210 and 2215 may be adjacent to or partially overlapped with a frequency band or a channel of a signal received by the second antenna 2220. The details thereof will make reference to the description made with reference to FIG. 6.

According to an embodiment of the disclosure, when the electronic device 200 is in the retracting status (see reference numeral 2250), at least one (e.g., the (1-2)-th antenna 2215) of the plurality of first antennas 2210 and 2215 and the second antenna 2220 may be spaced apart from each other by a second distance 2285. The contact area between the first housing 220 and the second housing 230 is more increased when the electronic device 200 is in the retracting status (see reference numeral 2250), as compared to when the electronic device 200 is in the extending status. Accordingly, the second distance 2285 may be shorter than the first distance 2280. Accordingly, when the electronic device 200 is in the retracting status (see reference numeral 2250), at least one (e.g., the (1-2)-th antenna 2215) of the plurality of first antennas 2210 and 2215 may be disposed adjacent to the second antenna 2220. For another example, at least one (e.g., the (1-2)-th antenna 2215) of the plurality of first antennas 2210 and 2215 may be overlapped with the second antenna 2220 in the X axis direction. In this case, the second distance 2285 may be understood as being a distance in which the second antenna 2220 is spaced apart from at least one of the plurality of first antennas 2210 and 2215 (e.g., the (1-2)-th antenna 2215) in the +Y axis direction. According to an embodiment of the disclosure, when a frequency band or a channel of a signal transmitted by at least one (e.g., the (1-2)-th antenna 2215) of the plurality of first antennas 2210 and 2215 is adjacent to or partially overlapped with a frequency band or a channel of a signal received by the second antenna 2220 in the retracting status (see reference numeral 2250), the signal receiving performance of the second antenna 2220 may be deteriorated. The details thereof will make reference to the description made with reference to FIG. 6.

According to an embodiment of the disclosure, for example, when the electronic device 200 is in the retracting status (see reference numeral 2250) and when the signal receiving performance of the second antenna 2220 is deteriorated, the processor 210 may make the (1-2)-th antenna 2215, which is adjacent to the second antenna 2220, of the plurality of first antennas 2210 and 2215, disable. The processor 210 may perform a single input single output (SISO) operation by using another antenna (e.g., the (1-1)-th antenna 2210) of the plurality of first antennas 2210 and 2215.

As described above, according to embodiments of the disclosure, the electronic device may sense the change in the form of the electronic device and may control a plurality of antennas based on the form of the electronic device, thereby reducing the signal interference between the plurality of antennas.

According to embodiments of the disclosure, the electronic device may reduce performance deterioration of the plurality of antennas to support heterogeneous communication.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing including a first housing and a second housing;
at least one first antenna disposed in the first housing;
at least one second antenna disposed in the second housing;
at least one sensor; and
at least one processor,
wherein the at least one processor is configured to:
perform communication by using the at least one first antenna and the at least one second antenna in a first status of the electronic device,
detect, through the at least one sensor, that the electronic device in the first status is changed to be in a second status, by folding or sliding of at least one of the first housing or the second housing, and
back-off a power of a signal transmitted by at least one first antenna adjacent to the at least one second antenna, when a frequency band or a channel of the signal transmitted by the at least one first antenna is adjacent to or at least partially overlapped with a frequency band or a channel of a signal received by the at least one second antenna,
wherein the at least one first antenna is spaced apart from the at least one second antenna by a first distance, in the first status, and
wherein the at least one first antenna adjacent to the at least one second antenna is spaced apart from the at least one second antenna by a second distance shorter than the first distance, in the second status.

2. The electronic device of claim 1, wherein the at least one processor is further configured to:
when the electronic device is in the second status, and when the frequency band or the channel of the signal transmitted by the at least one first antenna is adjacent to or at least partially overlapped with the frequency band or the channel of the signal received by the at least one second antenna, hand over the frequency band or the channel of the signal transmitted by the at least one first antenna to another frequency band or another channel which is not adjacent to the frequency band or the channel of the signal received by the at least one second antenna, and
restrict use of the at least one first antenna for the frequency band or the channel which is adjacent to the frequency band or the channel of the signal received by the at least one second antenna.

3. The electronic device of claim 1,
wherein the at least one first antenna supports a first communication protocol, and
wherein the at least one second antenna supports a second communication protocol different from the first communication protocol.

4. The electronic device of claim 1,
wherein the first housing is a foldable housing which is folded along at least one axis, and
wherein, when the electronic device is folded, a relative distance between the first housing and the second housing is changed.

5. The electronic device of claim 1, further comprising:
a flexible display including a first display area and a second display area visually exposed to correspond to a sliding of the second housing,
wherein the second housing is sliding while being coupled with the first housing.

6. The electronic device of claim 1, wherein the at least one processor is further configured to restore power of the signal transmitted by the at least one first antenna, when detecting, through the at least one sensor, that the electronic device in the first status is changed to be in the second status, by unfolding or sliding of at least one of the first housing or the second housing.

7. The electronic device of claim 1,
wherein the at least one processor is further configured to:
when the electronic device is in the second status and a multiple component of the signal transmitted by the at least one first antenna is adjacent to or at least partially overlapped with the frequency band or the channel of the signal received by the at least one second antenna, back-off the power of the signal transmitted by the at least one first antenna adjacent to the at least one second antenna, and
hand over the frequency band or the channel, which is used by the at least one first antenna, to another frequency band or another channel, and
wherein the another frequency band or the another channel is a frequency band or a channel to prevent the multiple component of the signal transmitted by the at least one first antenna from being adjacent to or being partially overlapped with the frequency band or the channel of the signal received by the at least one second antenna.

8. The electronic device of claim 1, wherein the at least one processor is further configured to:
perform a MIMO operation by using the at least one first antenna and the at least one second antenna when the electronic device is in the first status,
when the electronic device is in the second status, and when the frequency band or the channel of the signal transmitted by the at least one first antenna is adjacent to or at least partially overlapped with the frequency band or the channel of the signal received by the at least one second antenna, disable an antenna, which represents weaker signal power, by comparing power of the signal transmitted by the at least one first antenna with power of a signal transmitted by the at least one second antenna, and
perform a single input single output (SISO) operation by using an antenna representing strong signal power.

9. The electronic device of claim 1, wherein the at least one processor is further configured to:
perform a sound reference surrounding (SRS) operation by using the at least one first antenna, when the electronic device is in the first status,
disable a part of the at least one first antenna, which is adjacent to the at least one second antenna, and
perform the SRS operation by using a remaining of the at least one first antenna, when the electronic device is in the second status, and when the frequency band or the channel of the signal transmitted by the at least one first antenna is adjacent to or at least partially overlapped with the frequency band or the channel of the signal received by the at least one second antenna.

10. The electronic device of claim 1, wherein the at least one processor is further configured to:
perform a MIMO operation by using the at least one first antennas in the first status of the electronic device,
when the electronic device is in the second status, and when the frequency band or the channel of a signal transmitted by the at least one first antennas is adjacent to or partially overlapped with the frequency band or the channel of a signal received by the at least one second antenna, disable at least one, which is adjacent to the at least one second antenna, of the at least one first antennas, and
perform a SISO operation by using remaining antennas of the at least one first antennas.

11. The electronic device of claim 10, wherein the at least one processor is further configured to:
when detecting, through the at least one sensor, that the electronic device in the second status is changed to be in the first status, by unfolding or sliding of at least one of the first housing or the second housing, activate the disabled antenna, and
perform the MIMO operation by using the at least one first antennas.

12. The electronic device of claim 10, wherein the at least one processor is further configured to:
when the frequency band or the channel of the signal transmitted by the at least one first antennas is handed over to another frequency band or another channel which is not adjacent to the frequency band or the channel of the signal received by the at least one second antenna, activate the disabled antenna, and
perform the MIMO operation by using the at least one first antennas.

13. The electronic device of claim 10, wherein the at least one processor is further configured to:
perform a carrier aggregation (CA) operation by using the at least one first antennas in a first status of the electronic device, and
when the electronic device is in the second status, and when the frequency band or the channel of a signal transmitted by the at least one first antennas is adjacent to or partially overlapped with the frequency band or the channel of a signal received by the at least one second antenna, disable at least one, which is adjacent to the at least one second antenna, of the at least one first antennas to deactivate the CA operation.

14. The electronic device of claim 13, wherein the at least one processor is further configured to:
   when detecting, through the at least one sensor, that the electronic device in the second status is changed to be in the first status, by unfolding or sliding of at least one of the first housing or the second housing, activate the disabled antenna, and
   perform the CA operation by using the at least one first antennas.

15. The electronic device of claim 13, wherein the at least one processor is further configured to:
   when the frequency band or the channel of the signal transmitted by the at least one first antennas is handed over to another frequency band or another channel which is not adjacent to the frequency band or the channel of the signal received by the at least one second antenna, activate the disabled antenna, and
   perform the CA operation by using the at least one first antennas.

* * * * *